United States Patent
Zhodzishsky et al.

(10) Patent No.: US 6,493,378 B1
(45) Date of Patent: Dec. 10, 2002

(54) METHODS AND APPARATUSES FOR REDUCING MULTIPATH ERRORS IN THE DEMODULATION OF PSEUDO-RANDOM CODED SIGNALS

(75) Inventors: Mark Isaakovich Zhodzishsky, Moscow (RU); Victor Abramovich Veitsel, Moscow (RU); Javad Ashjaee, Saratoga, CA (US)

(73) Assignee: Topcon GPS LLC, Pleasanton, CA (US)

( * ) Notice: Subject to any disclaimer, the term of this patent is extended or adjusted under 35 U.S.C. 154(b) by 0 days.

(21) Appl. No.: 09/226,774

(22) Filed: Jan. 6, 1999

Related U.S. Application Data

(60) Provisional application No. 60/070,604, filed on Jan. 6, 1998.

(51) Int. Cl.[7] ............................................. H04L 7/10
(52) U.S. Cl. ........................................ 375/149; 375/373
(58) Field of Search .................................. 375/149, 150, 375/362, 368, 371, 373, 343

(56) References Cited

U.S. PATENT DOCUMENTS

| | | | |
|---|---|---|---|
| 4,649,549 A | 3/1987 | Halpern et al. ............... 380/32 |
| 4,754,465 A | 6/1988 | Trimble ....................... 375/376 |
| 4,807,256 A | 2/1989 | Holmes et al. ............. 375/344 |
| 4,809,005 A | 2/1989 | Counselman, III .......... 342/352 |
| 4,821,294 A | 4/1989 | Thomas, Jr. ................. 375/343 |
| 4,894,662 A | 1/1990 | Counselman, III ..... 342/357.12 |
| 4,894,842 A | 1/1990 | Broekhoven et al. ....... 375/150 |
| 4,928,106 A | 5/1990 | Ashjaee et al. ............. 342/352 |
| 4,972,431 A | 11/1990 | Keegan ....................... 375/150 |
| 5,101,416 A | 3/1992 | Fenton et al. ............... 375/150 |
| 5,347,536 A | 9/1994 | Meehan .......................... 375/1 |
| 5,390,207 A | 2/1995 | Fenton et al. ................... 375/1 |
| 5,414,729 A | 5/1995 | Fenton ......................... 375/209 |
| 5,438,589 A | 8/1995 | Nakamura .................. 375/145 |
| 5,450,448 A | 9/1995 | Sheynblat ................... 375/346 |
| 5,493,588 A | 2/1996 | Lennen ....................... 375/343 |
| 5,495,499 A | 2/1996 | Fenton et al. ............... 375/205 |
| 5,537,121 A | 7/1996 | Lennen ....................... 342/357 |
| 5,579,345 A | 11/1996 | Kroeger et al. ............. 375/344 |
| 5,600,670 A | 2/1997 | Turney ........................ 375/208 |
| 5,729,571 A | 4/1998 | Park et al. ................... 375/206 |
| 5,781,152 A * | 7/1998 | Renard et al. ......... 342/357.08 |
| 5,808,582 A | 9/1998 | Woo ........................ 342/357.12 |

(List continued on next page.)

FOREIGN PATENT DOCUMENTS

| | | | |
|---|---|---|---|
| RU | 1367815 A1 | 12/1985 | ............. H04L/7/02 |
| WO | WO 97/06446 | 2/1997 | ............. G01S/1/04 |
| WO | WO 98/13947 | 4/1998 | ........... H04B/1/707 |

OTHER PUBLICATIONS

M.I. Zhodzishsky, "Digital PLL Systems for Video Signal Processing," Radio and Electronics, Moscow, Dec. 1978, No. 12. (English translation of relevant portions attached).

(List continued on next page.)

*Primary Examiner*—Stephen Chin
*Assistant Examiner*—Kevin Kim
(74) *Attorney, Agent, or Firm*—Coudert Brothers LLP

(57) ABSTRACT

The present application is applicable to receivers for Global Positions (GP) systems which use delay-lock loops (DLLs) and, optionally, phase-lock loops (PLLs). The application discloses multipath error reduction techniques which enable the multipath errors in DLL systems to be made much less than the error present in known narrow "early-late" correlators, or their corresponding implementations which use strobe representations of the PR-code. Also disclosed are multipath error reduction techniques that enable multipath errors in the PLL systems to be reduced. The techniques, when applied to both the DLL and PLL systems work synergistically to further reduce multipath errors.

70 Claims, 16 Drawing Sheets

U.S. PATENT DOCUMENTS

| | | | | |
|---|---|---|---|---|
| 5,864,315 | A | | 1/1999 | Welles .................... 342/357.12 |
| 5,901,183 | A | | 5/1999 | Garin et al. ................. 375/343 |
| 5,949,815 | A | | 9/1999 | Pon ............................ 375/150 |
| 5,953,367 | A | * | 9/1999 | Zhodzicshsky et al. ...... 375/147 |
| 5,963,582 | A | | 10/1999 | Stansell, Jr. ................ 375/130 |
| 5,966,403 | A | | 10/1999 | Pon ............................ 375/148 |
| 6,023,489 | A | | 2/2000 | Hatch ......................... 375/150 |
| 6,205,167 | B1 | * | 3/2001 | Kamgar et al. ............. 375/133 |
| 6,236,673 | B1 | * | 5/2001 | Julg ............................ 375/150 |
| 6,243,409 | B1 | | 6/2001 | Fenton et al. ............... 375/137 |

OTHER PUBLICATIONS

A.J.Van Dierendonck, et al., "Theory and Performance of Narrow Correlator Spacing ina GPS Receiver," Proceedings of the ION–GPS 1992 National Technical Meeting, San Diego, Jan. 27, 1992.

Lionel Garin, et al., "Strobe & Edge Correlator Multipath Mitigation for Code," Proceedings of the ION–GPS–96 International Technical Meeting, Kansas City, MO, Sep. 17, 1996.

Philip G. Mattos, "Multipath elimination for the low–cost consumer GPS," Proceedings of the ION–GPS–96 $9^{th}$ International Technical Meeting, Sep. 17, 1996.

Veitsel, et al., "Strobe Correlators in Navigation Receivers With Psuedo–Random Noise Signals," Radiotekhnita, No. 8, pp. 11–19, Aug. 1997. (English translation attached).

Veitsel, et al., "The Mitigation of Multipath Errors by Strobe Correlators in GPS/GLONASS Receivers," GPS Solutions, vol. 2, pp. 38–45 (1998), 1998 John Wiley & Sons, Inc.

* cited by examiner

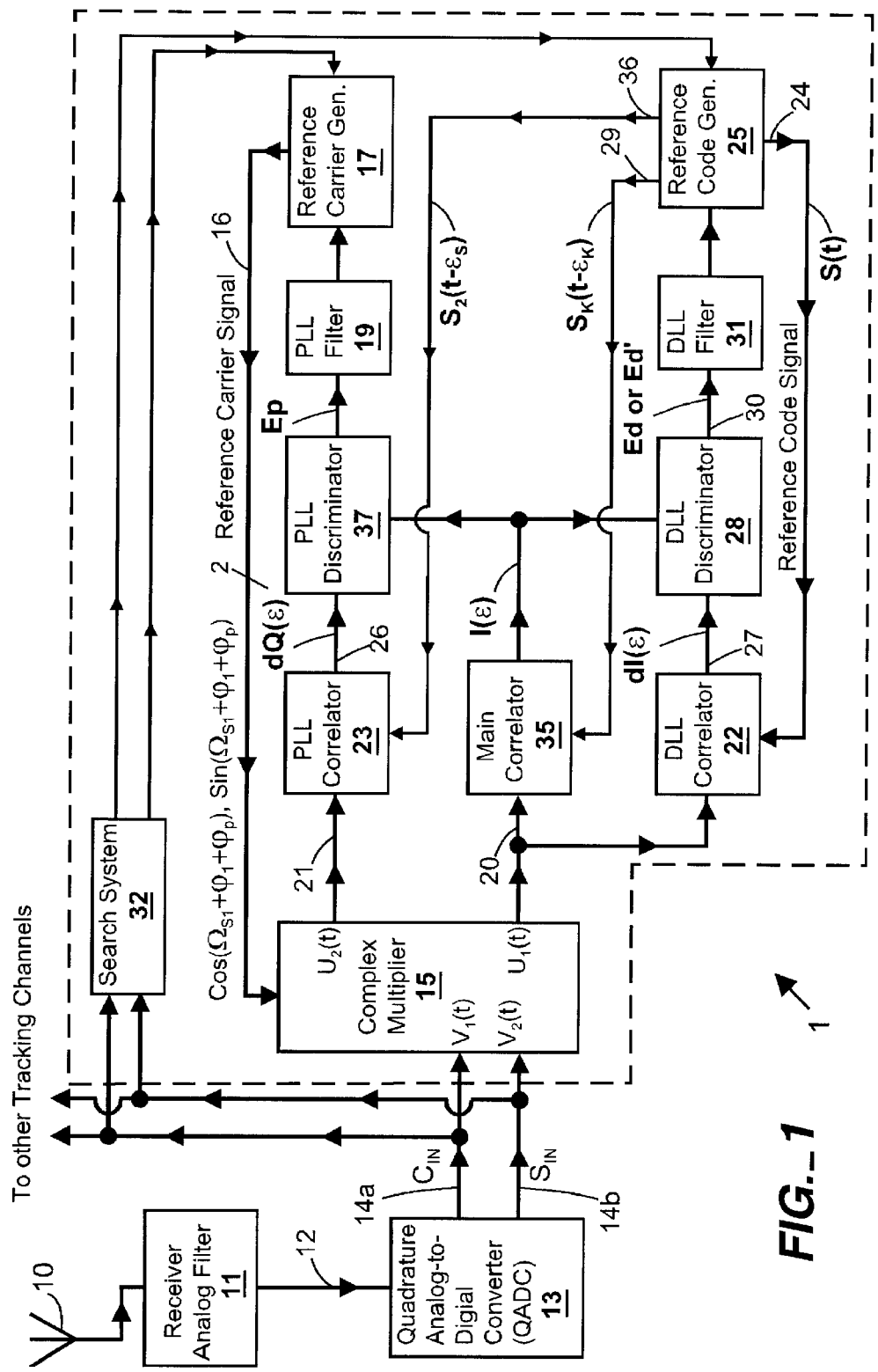
FIG._1

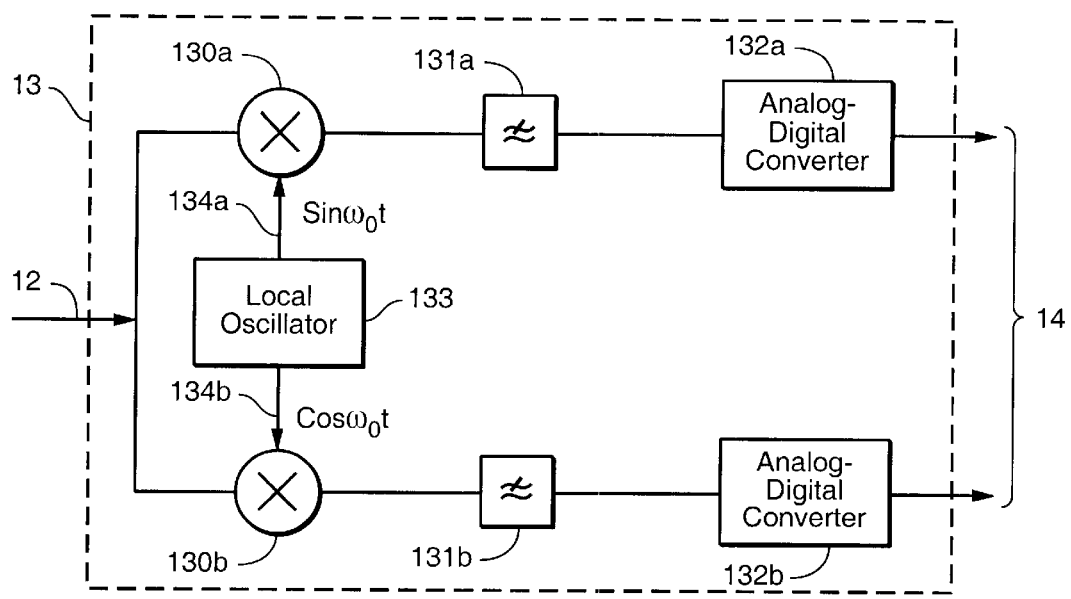
*FIG._2*
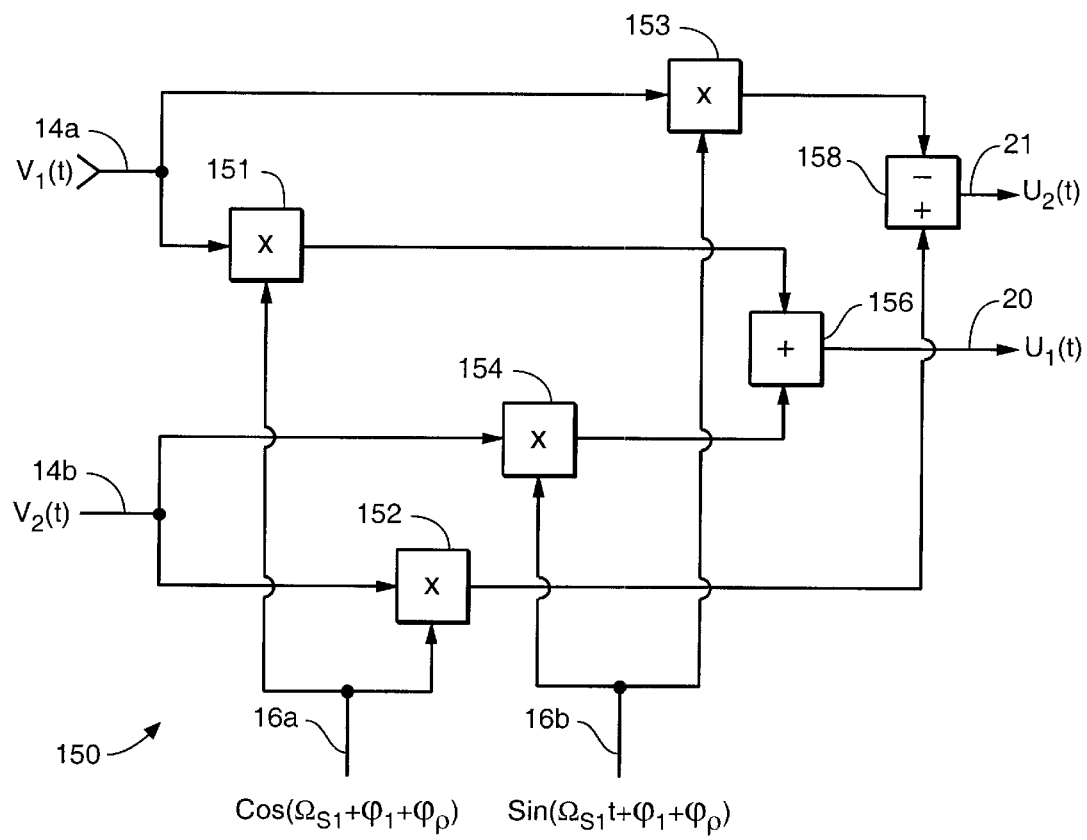
*FIG._3*

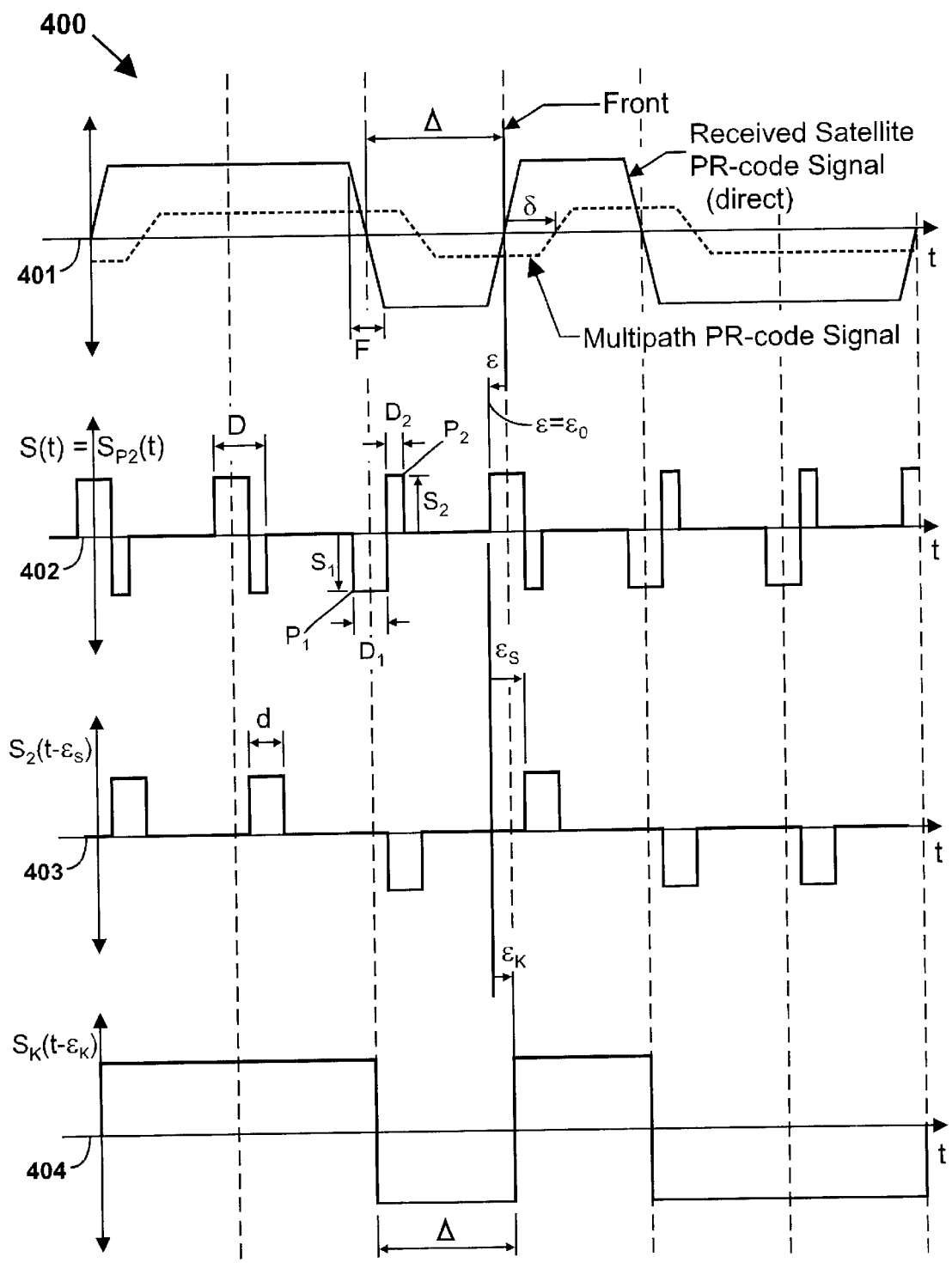
FIG._4

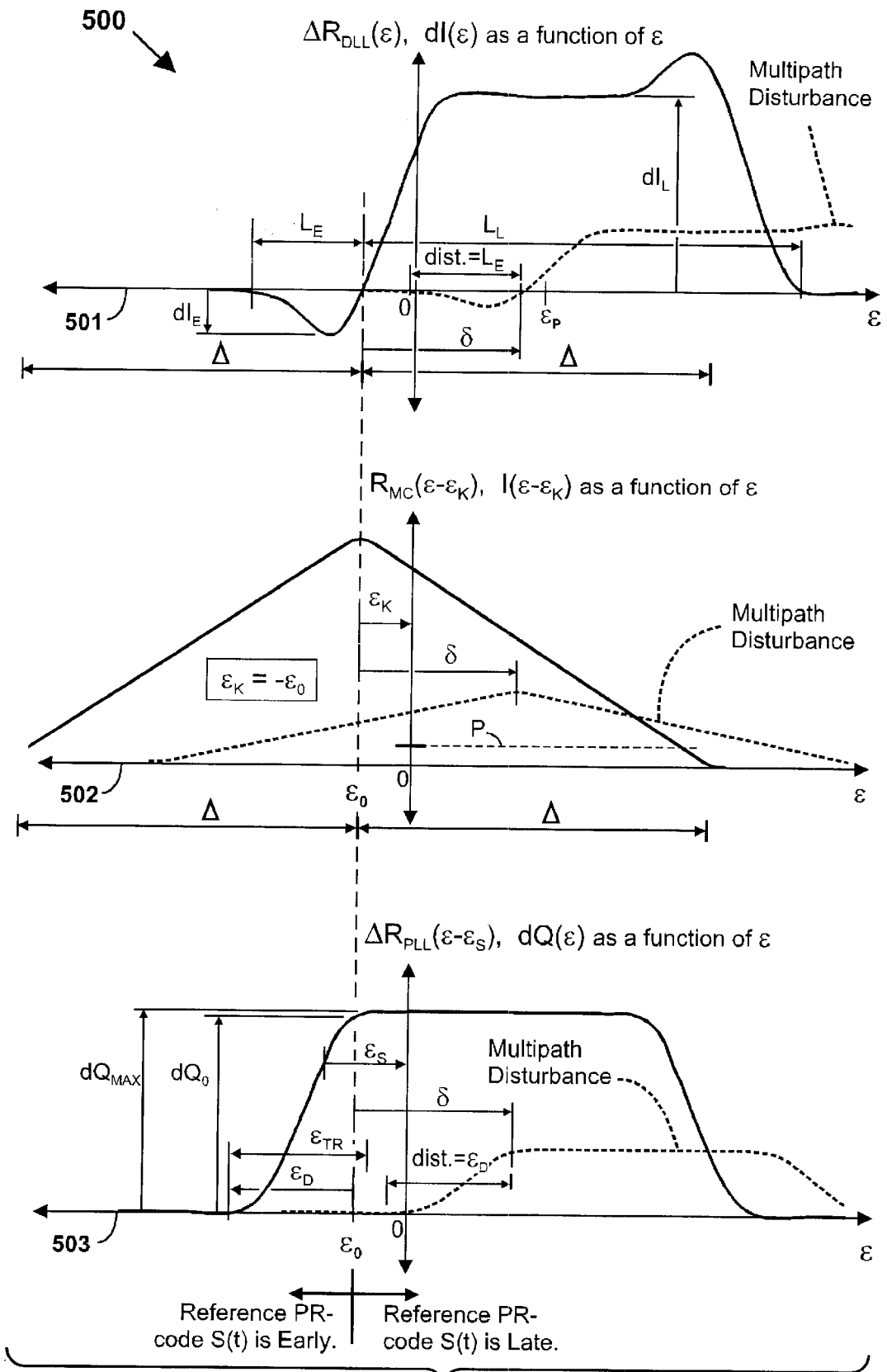
FIG._5

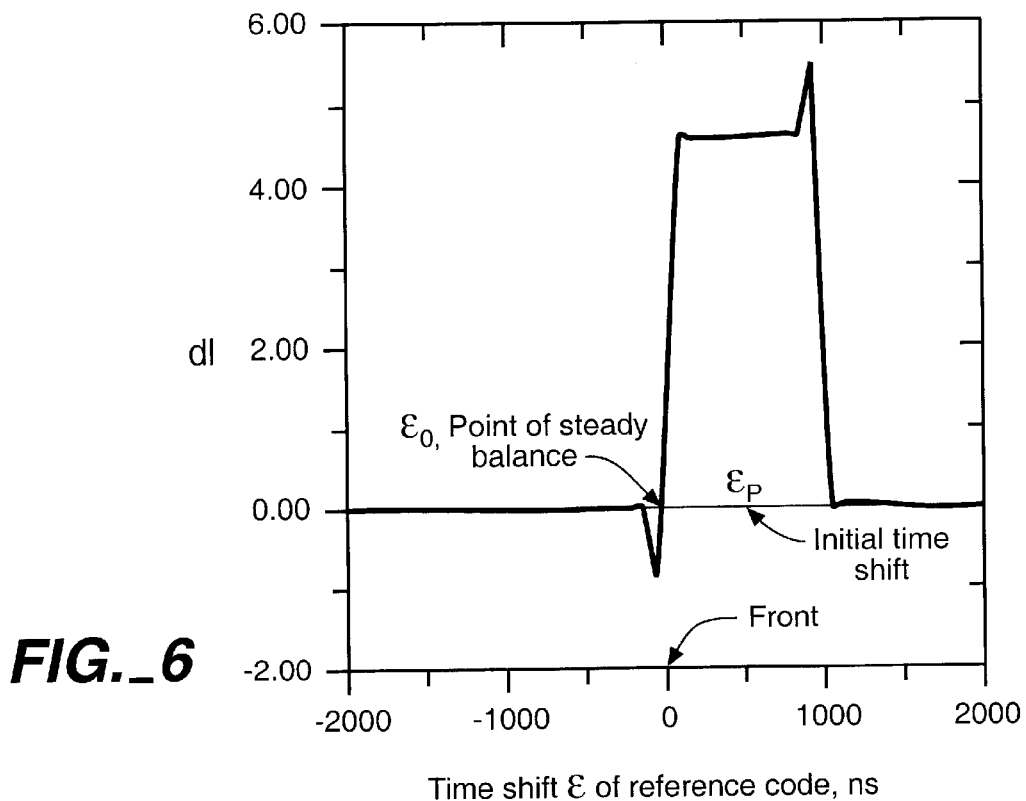
FIG._6
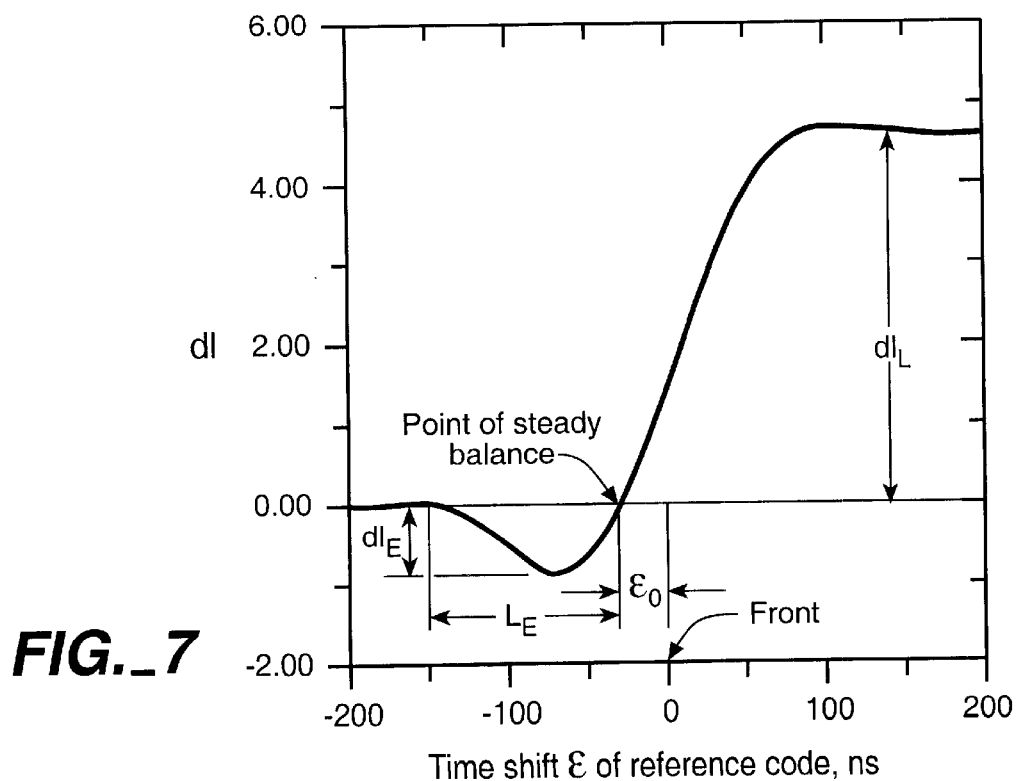
FIG._7

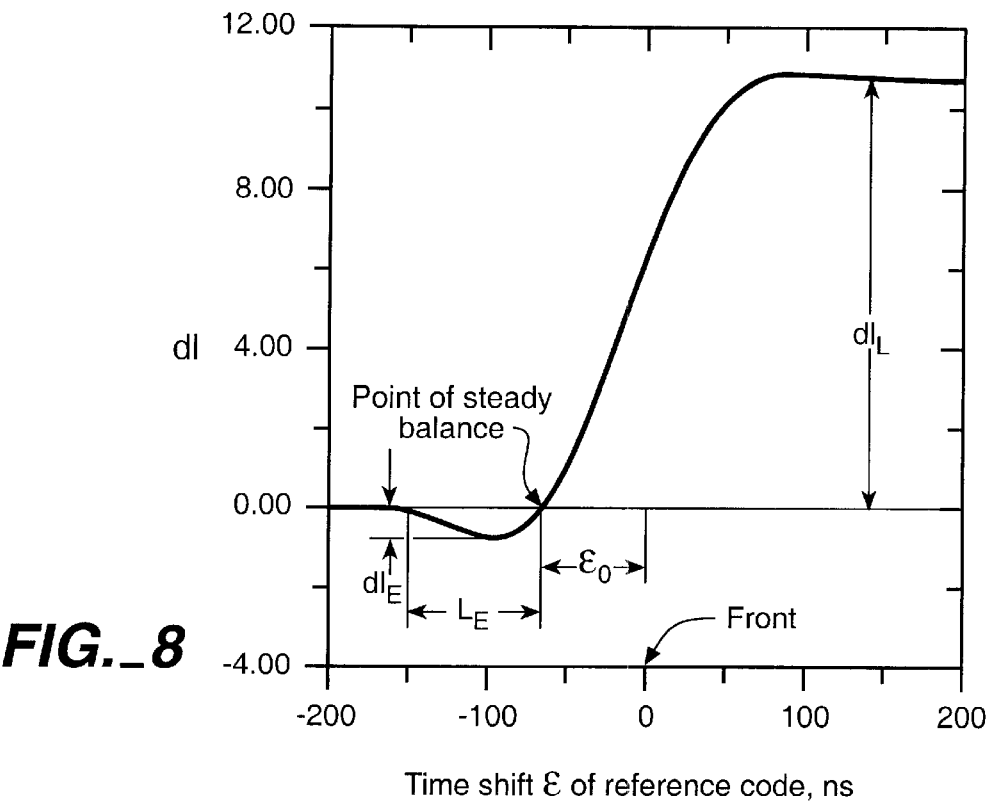
FIG._8
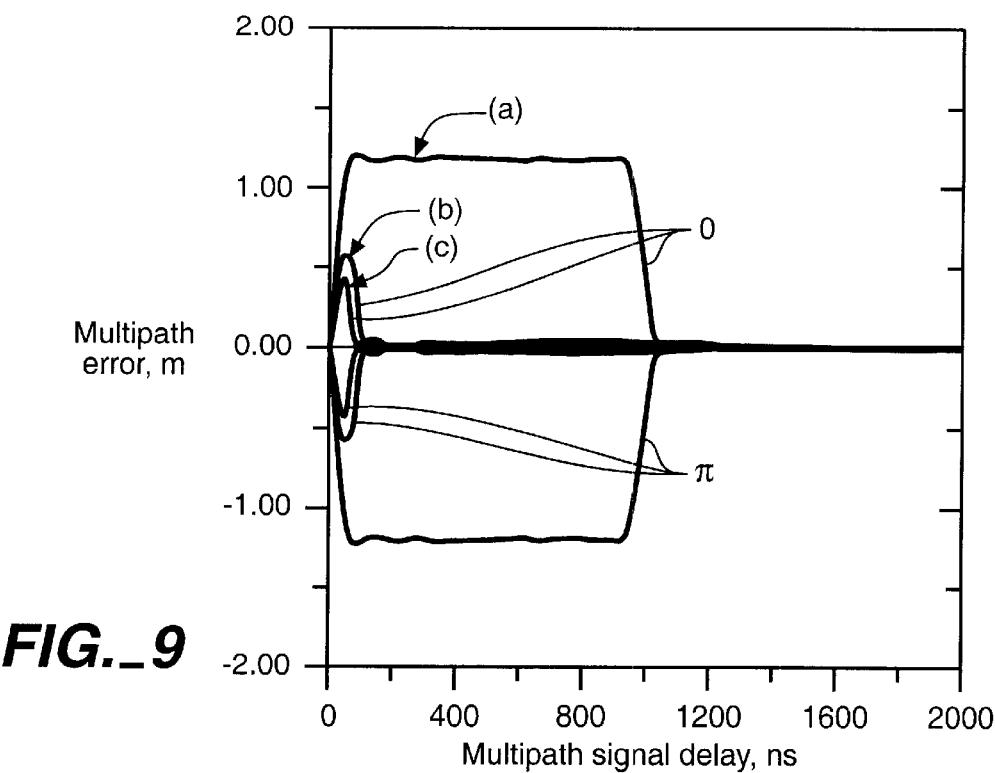
FIG._9

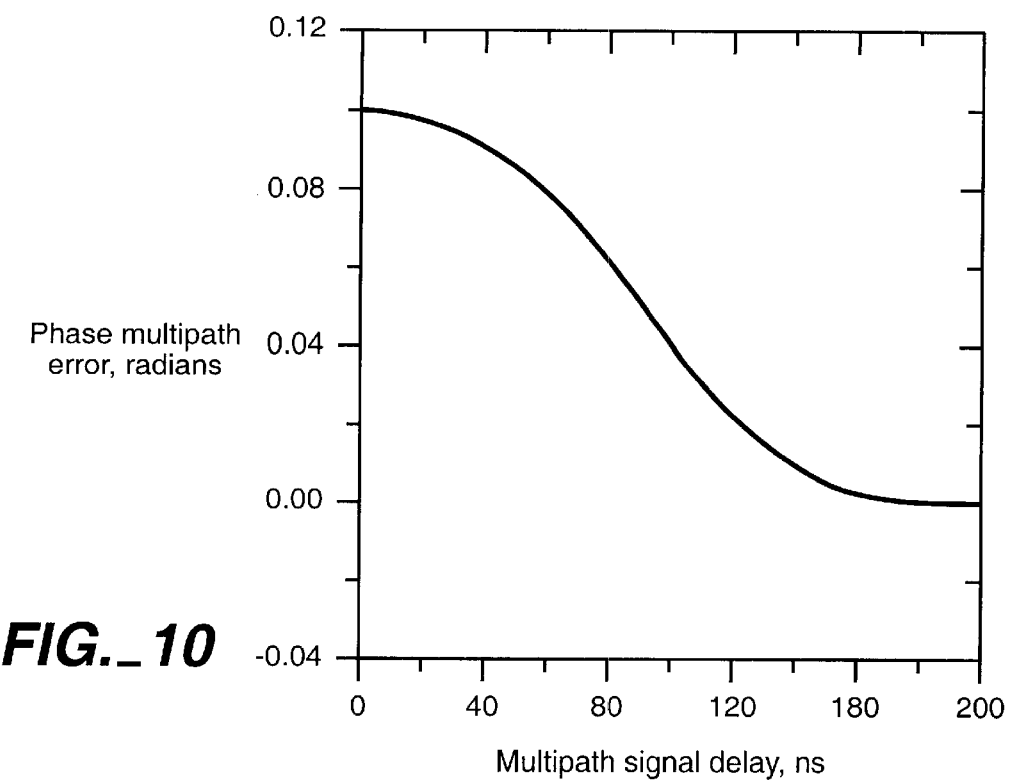
FIG._10

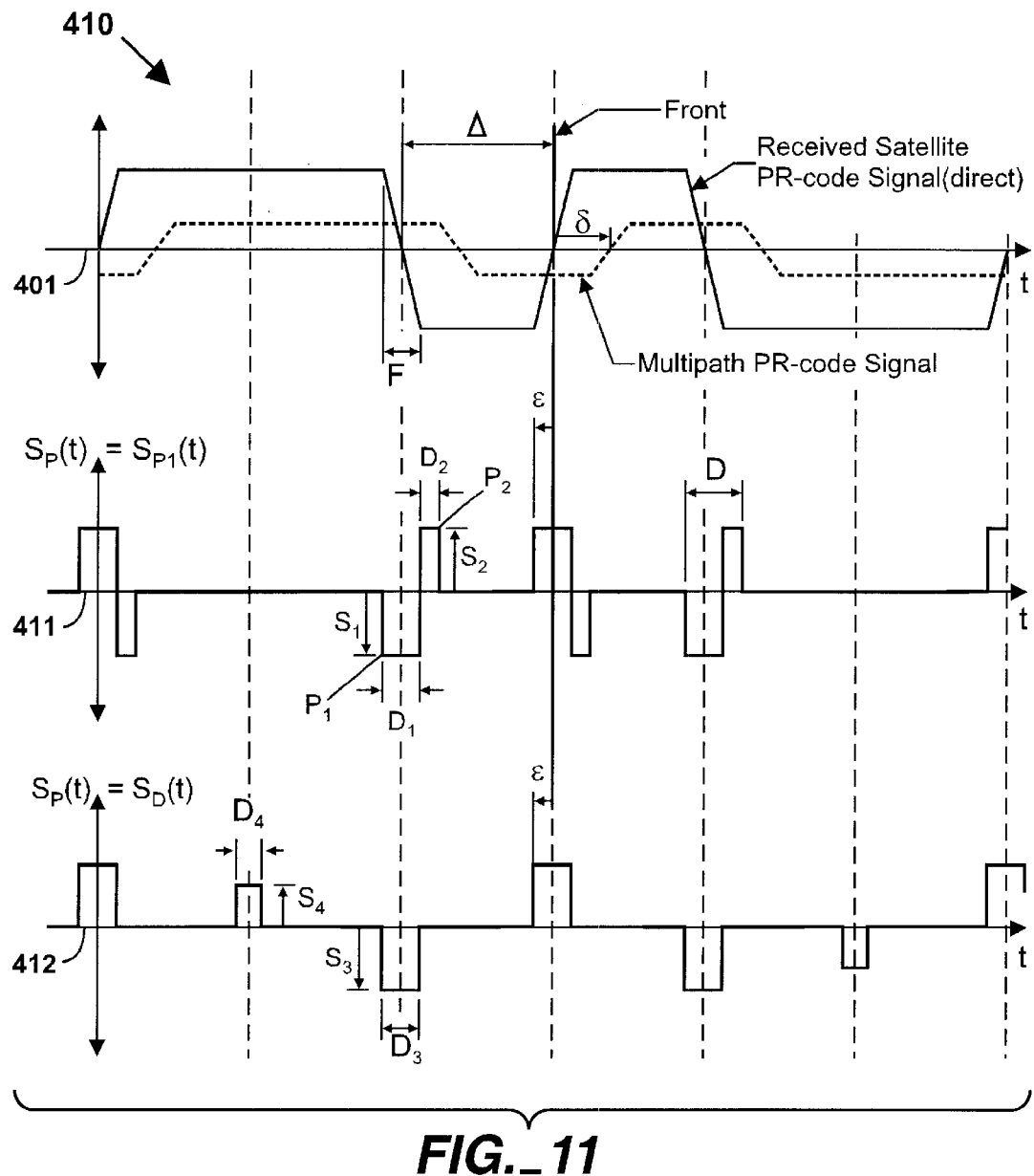
FIG._11

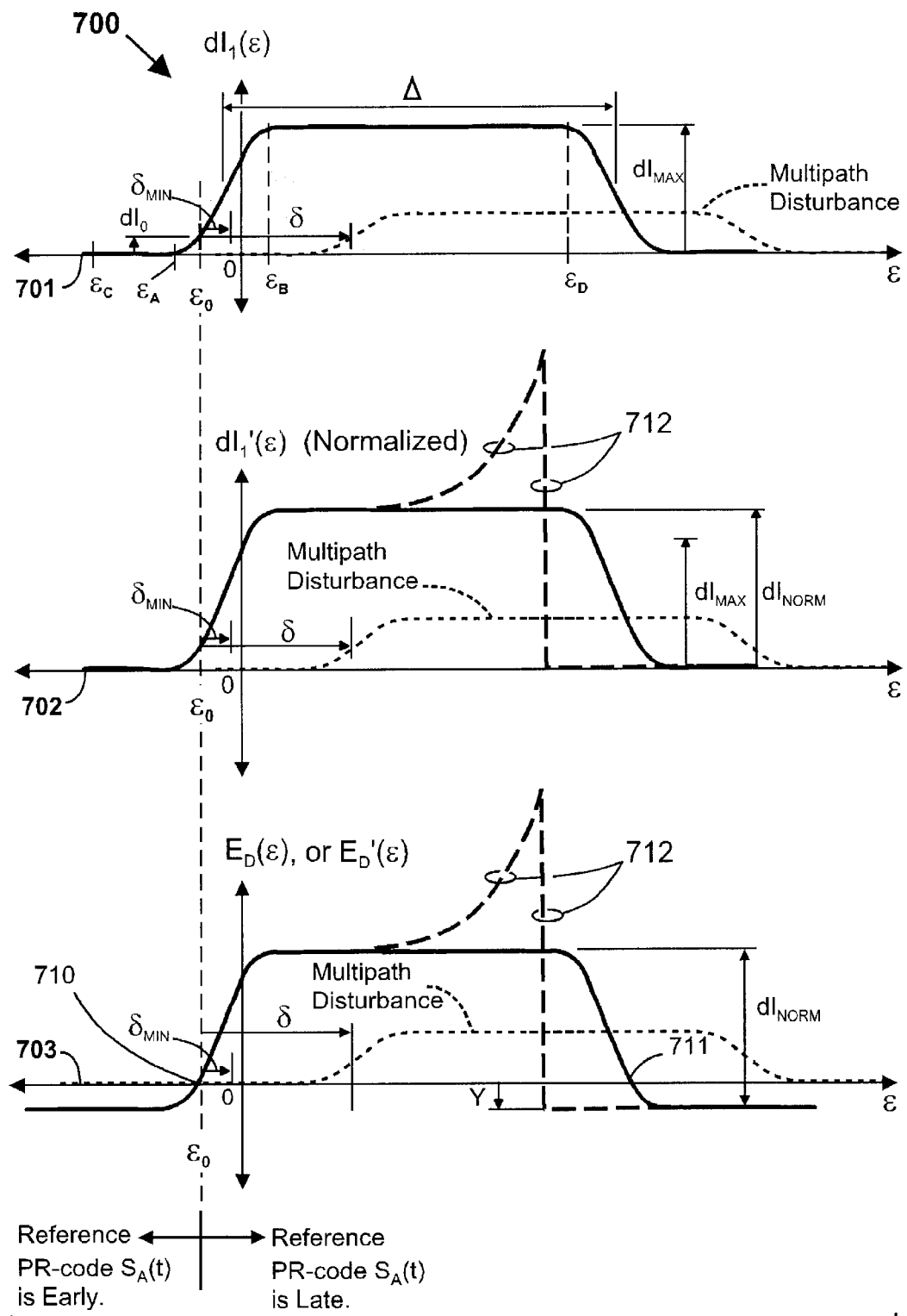
FIG._12

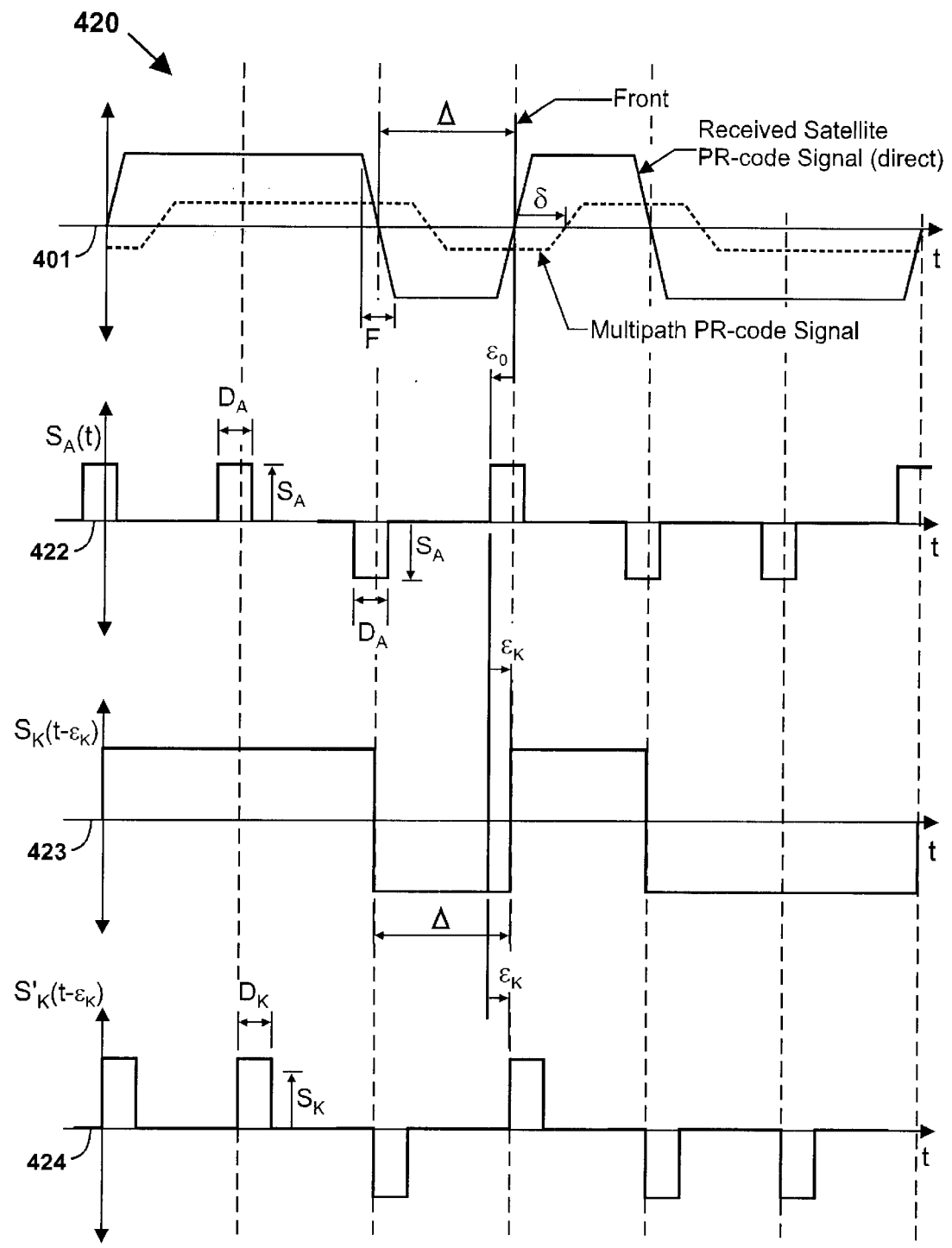
FIG._13

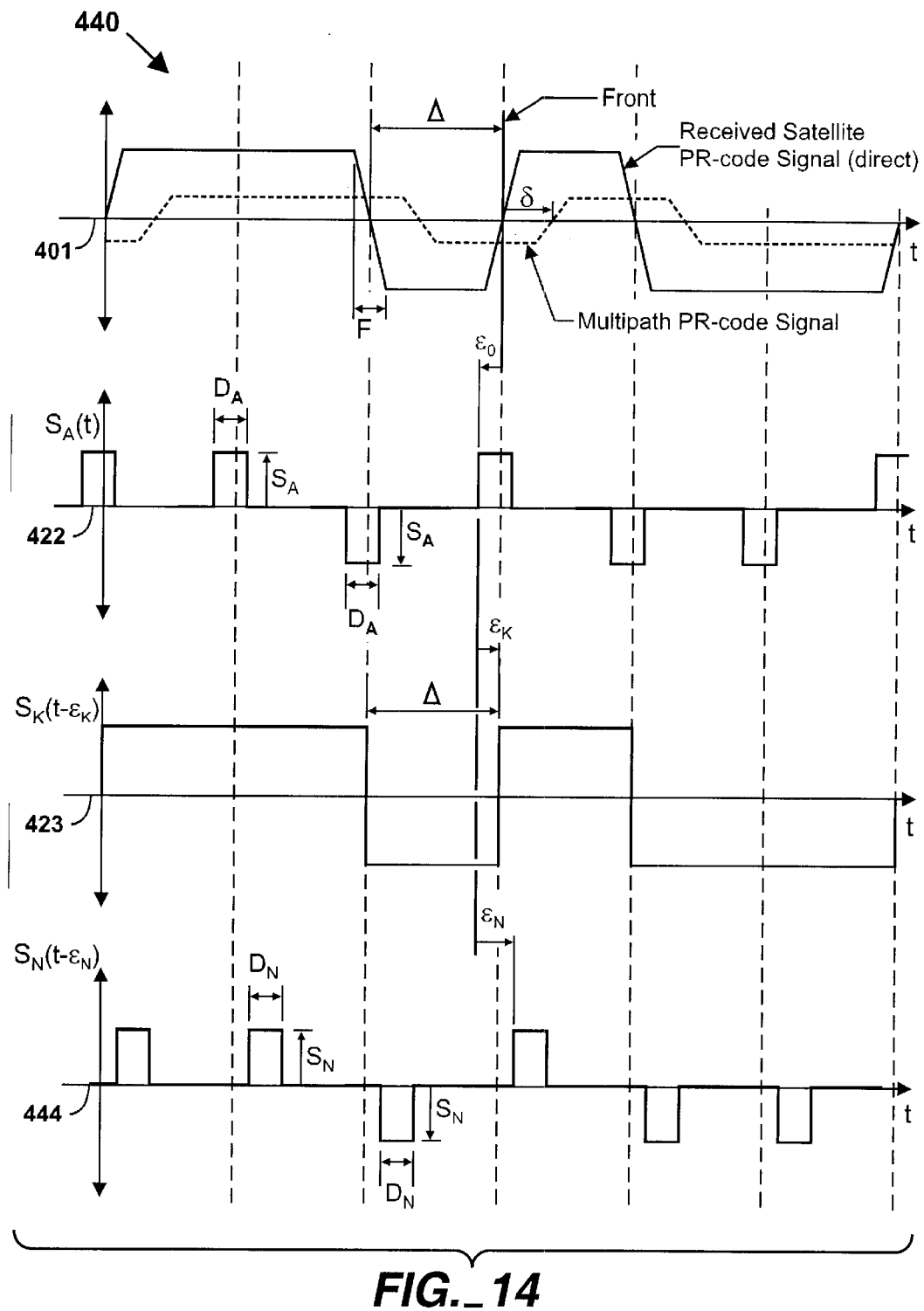
FIG._14

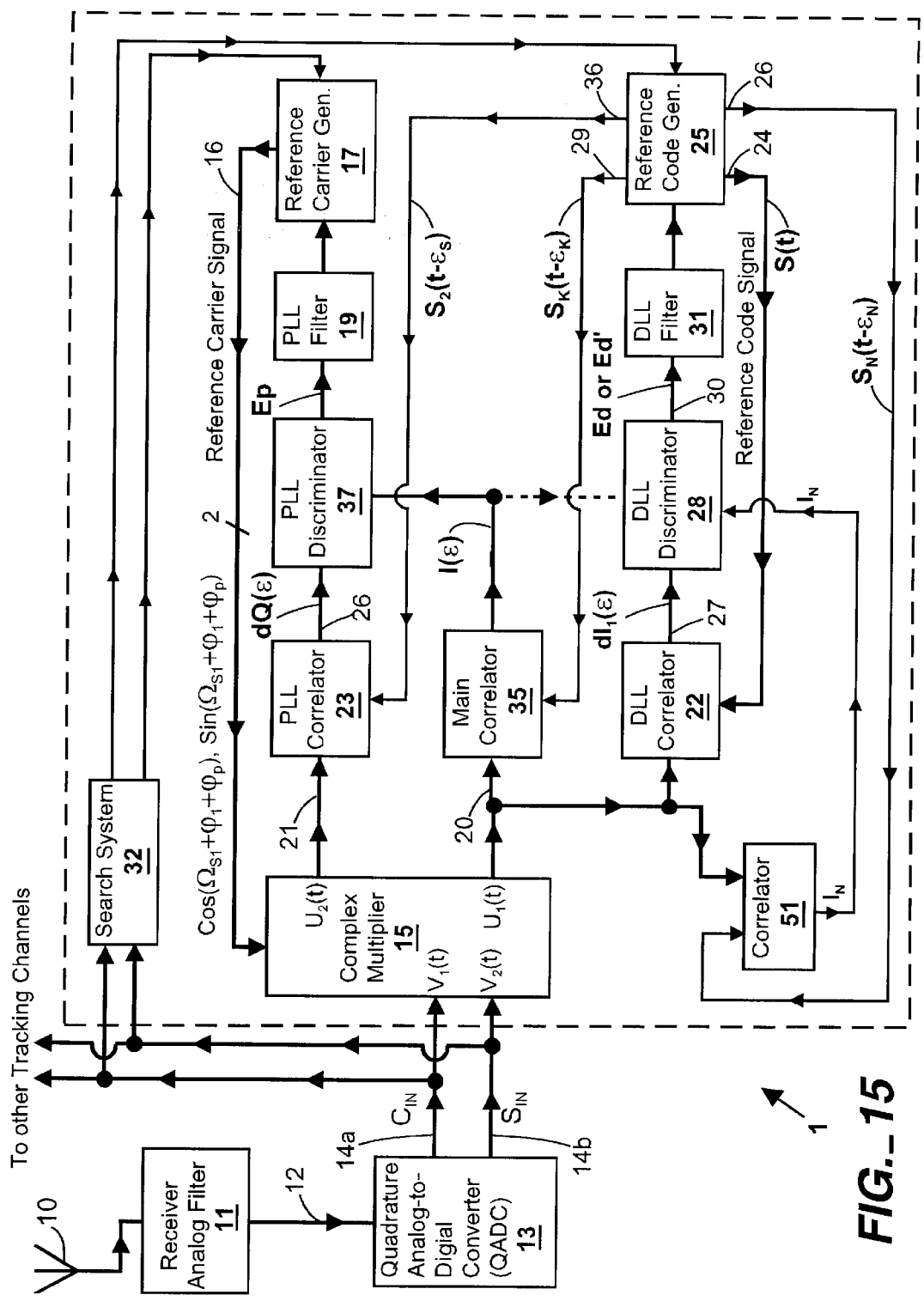
FIG._15

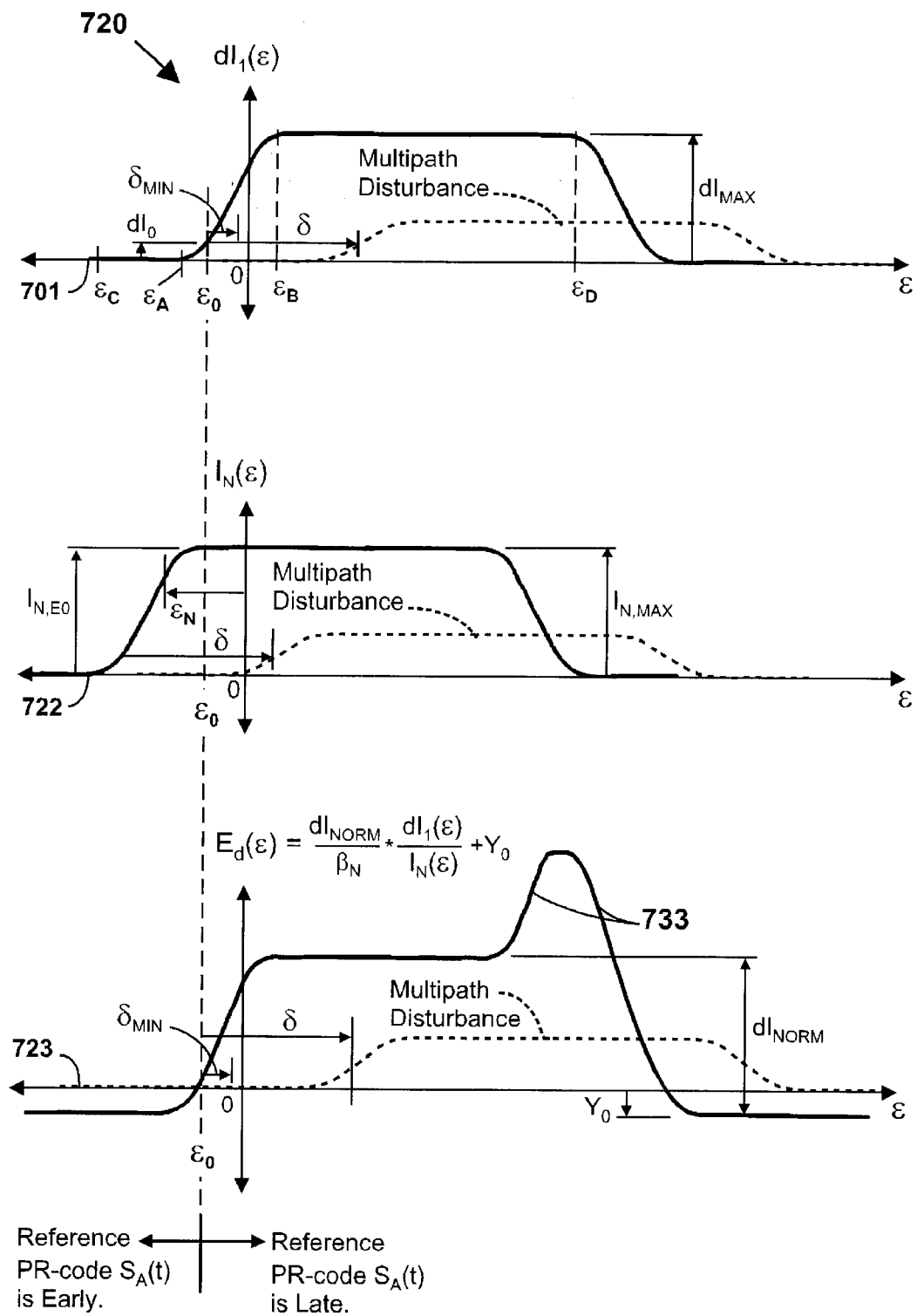
FIG._16

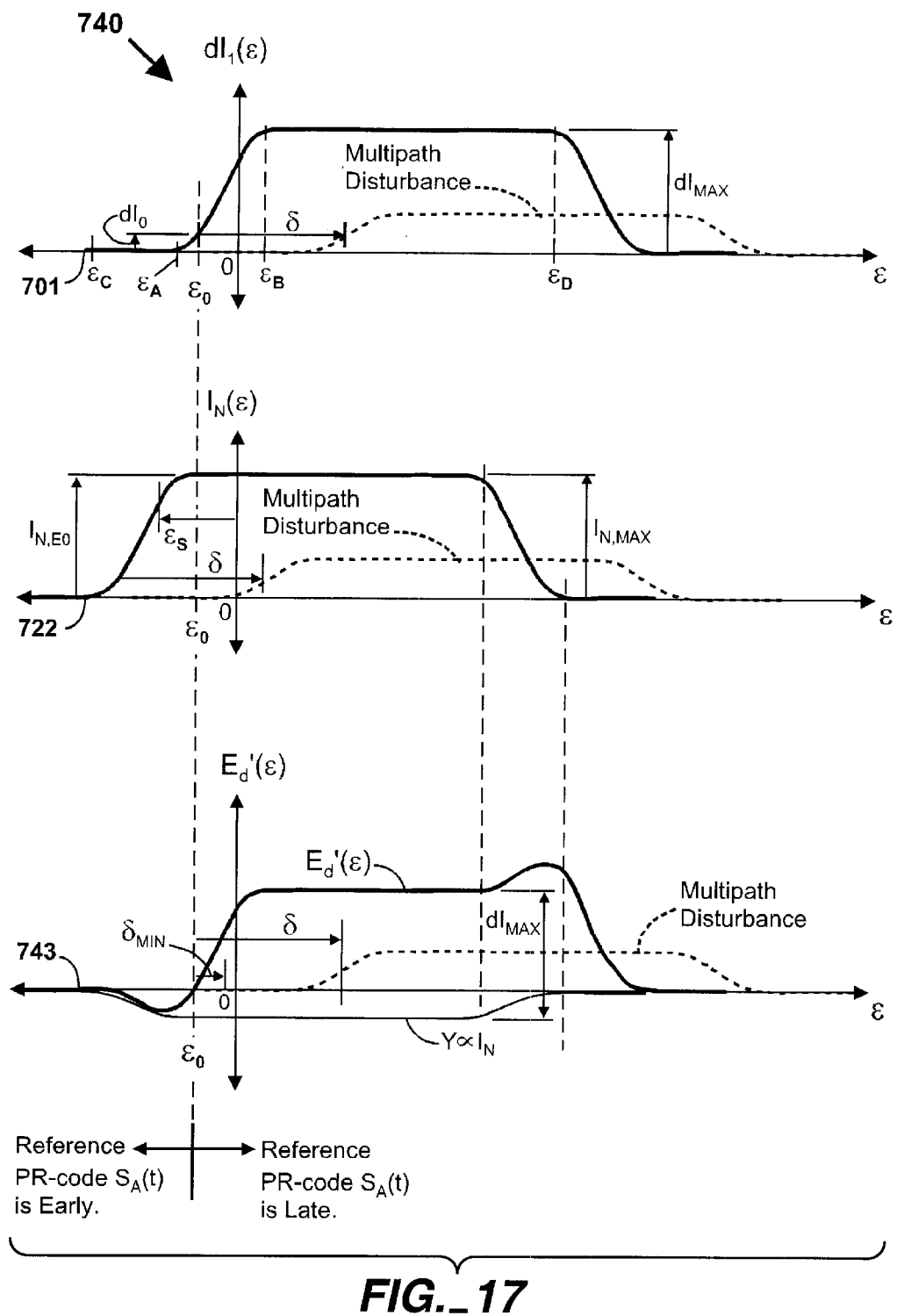
FIG._17

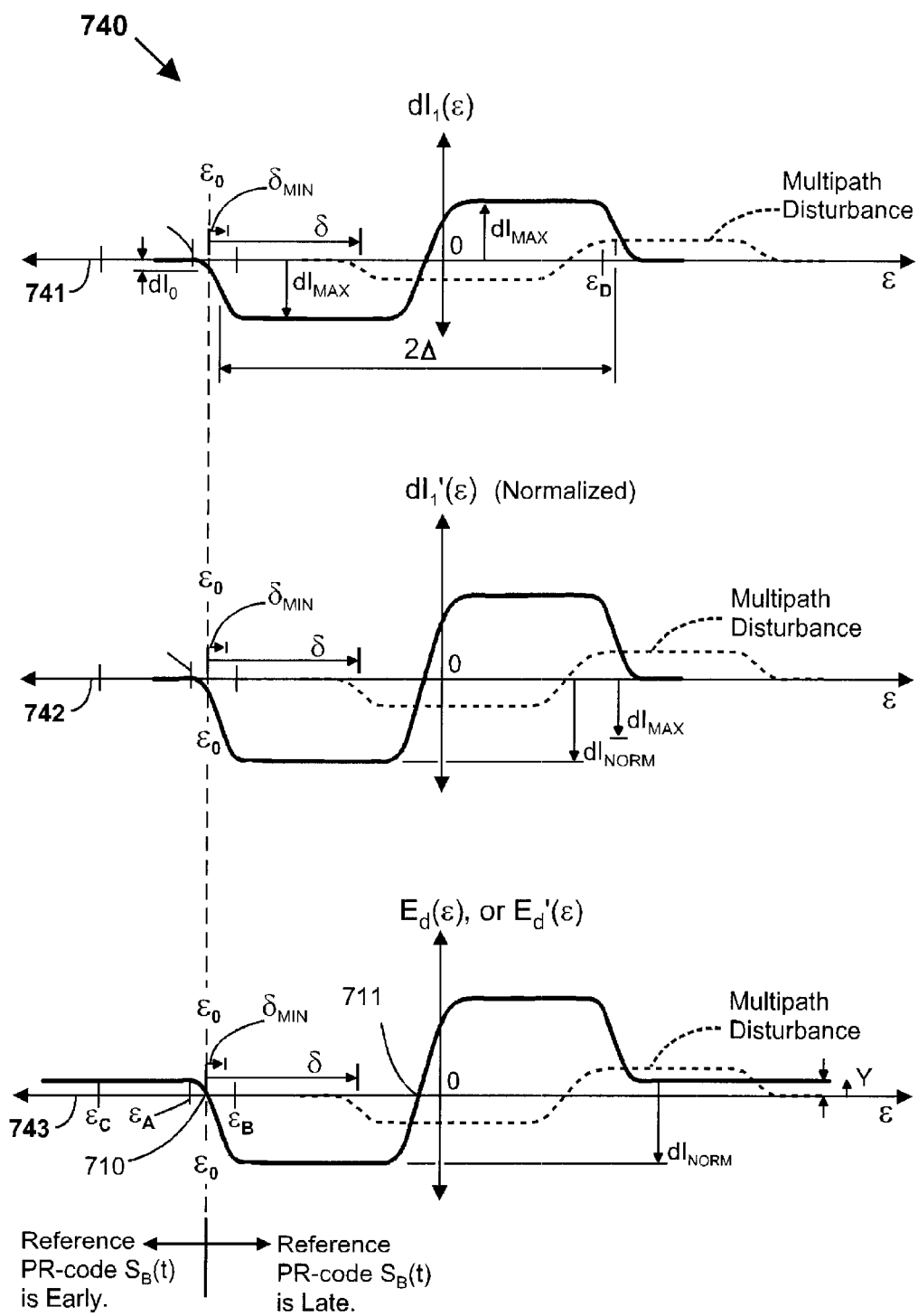
FIG._18

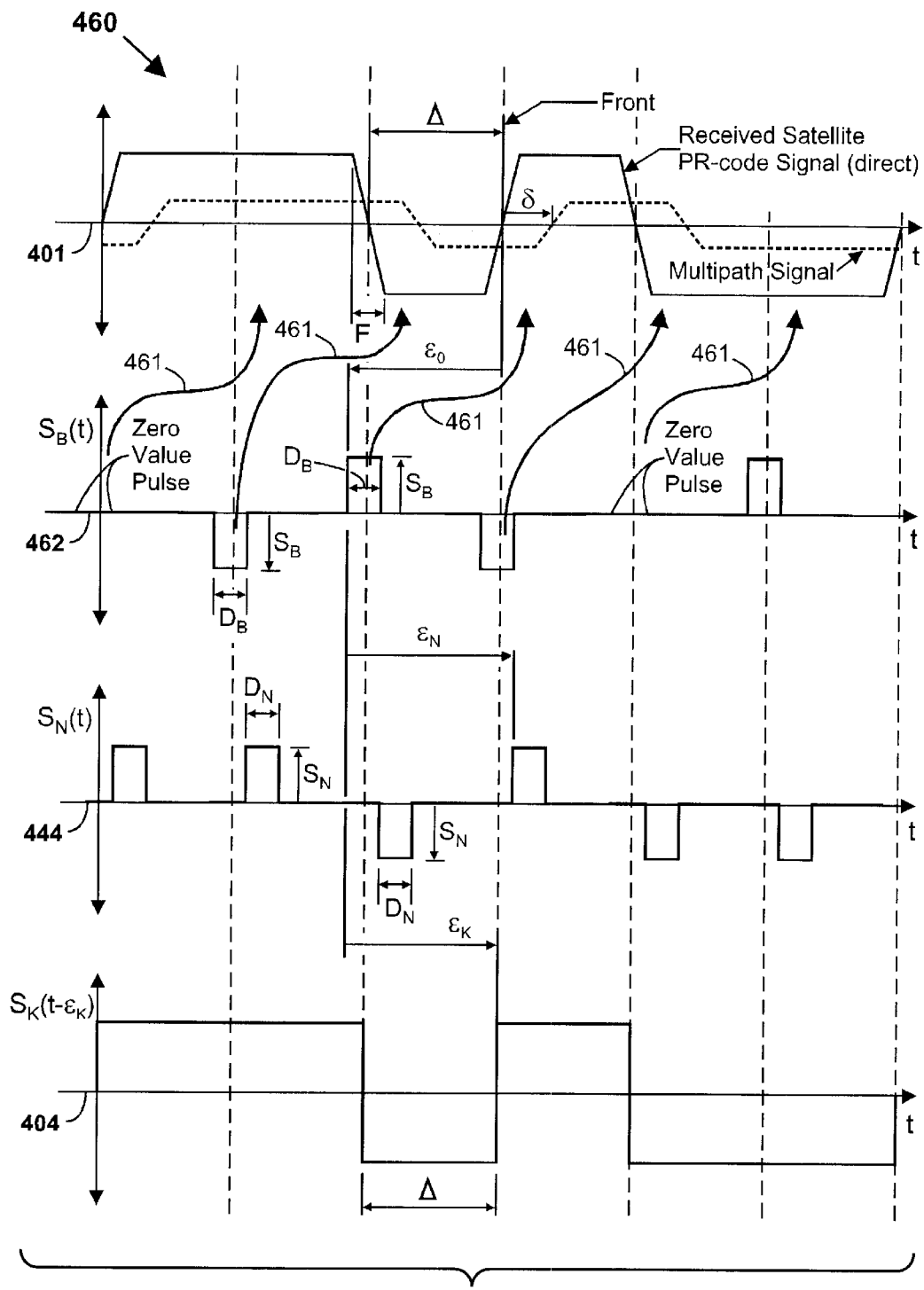
FIG._19

METHODS AND APPARATUSES FOR REDUCING MULTIPATH ERRORS IN THE DEMODULATION OF PSEUDO-RANDOM CODED SIGNALS

CROSS-REFERENCE TO RELATED APPLICATIONS

This application claims benefit of U.S. Provisional No. 60/070,674 filed on Jan. 6, 1998.

FIELD OF THE INVENTION

The present invention relates to receivers employed for range measurements using radio-signals encoded by a pseudo-random code, and more particularly to such receivers which reduce the reception errors caused by reflected versions of the directly received signal (i.e., multipath error reduction).

BACKGROUND OF THE INVENTION

Multichannel receivers for receiving broadcasted radio-signals encoded by repeating pseudo-random (PR) codes are employed by consumers using the global satellite navigation systems GPS ("NAVSTAR") and GLN ("GLONASS"). These systems enable one to determine the receiver's location and its velocity vector, and also to determine the time of day. The present invention is applicable to these types of receivers, and to other types of receivers and demodulators which receive signals which are encoded by repeating PR-codes. The signals to be demodulated may be broadcast by antenna, may be transmitted through wire or optical fiber, or may otherwise be transmitted by known transmission means.

In the GPS and GLN systems, the receiver simultaneously receives several broadcasted signals from several corresponding satellites which are "visible" to the receiver (as used herein, the term "visible" means that the satellite broadcast signal is not blocked from the receiver by a physical object, such as a building or the Earth). At any one time, 5 to 11 of the 24 GPS satellites are visible to the receiver. Every GPS satellite broadcasts signals in two frequency bands: the L1 band and the L2 band. In the L1 band, two radio-signal carriers are simultaneously broadcasted, each carrier having the same frequency but being phase shifted in time with respect to one another by π/2 (90°), which is one-quarter (¼) of the carrier wavelength. One of these carriers is modulated by a clear acquisition code (C/A-code) and the other carrier is modulated by a precision code (P-code). Both of these codes are pseudo-random sequences of +1 and −1 values, each sequence having a predetermined length and being continuously repeated. In the L2 band, a single radio-signal carrier is modulated by the above-described P-code, but the frequency of the L2-carrier is substantially lower than that of the L1-carrier. This frequency difference enables one to account for the changing transmission characteristics of the ionosphere. The present invention is applicable to the reception of either or both of the C/A-code and the P-code (in either band). The reception of the C/A-code will be used herein to illustrate the present invention.

In the GPS system, each satellite is assigned its own unique C/A-code, which enables the receiver to distinguish between the satellites even though all the C/A-codes are being modulated onto carriers having substantially the same frequency. Each repeating sequence of a C/A-code is quantized into 1,023 segments, or "chips", where each chip is of a predetermined time period ($\Delta$) and has pre-selected value, which is either +1 or −1. The sequence repeats itself every millisecond. When the C/A code is modulated onto the carrier, it is often called the C/A-signal. The particular set of chip values for each sequence is unique to the satellite, and the cross-correlation of each C/A-code sequence with those of the other satellites is substantially zero in comparison with the cross-correlation of the signal with itself (auto-correlation). This last feature applies as well to the corresponding C/A-signals and it enables a GPS receiver to isolate any one of the C/A-signals from the others being received by correlating the input signal (after appropriate down-conversion) with the C/A-signal to be isolated.

In order to provide useful timing and positional information, the C/A-signals in some of the satellite-broadcast bands are modulated by a low-frequency (50 Hz), binary-coded information signal A(t) which is transmitted as a repeating sequence of 1,500 bits. Each bit of A(t) has a value of −1 or +1, is synchronized to start with the beginning of a C/A-code sequence in the C/A-signal, and spans 20 sequences of the C/A-code. The C/A-signal is so modulated by multiplying its C/A-code sequence values by either −1 or +1, depending upon the current bit value of the information signal A(t). In the receiver, the information signal A(t) can be demodulated by correlating the broadcasted C/A-signal with an internally generated version of the C/A-code to provide a correlation signal I(t), and by noting the sign changes in the correlation signal I(t) (assuming that both C/A-signals are substantially synchronized). As a fine technical point, we note that correlation signals in the GPS art, such as I(t), are usually not continuous functions of time since they are often generated by accumulating multiplication products over fixed time durations ($T_A$), with these time durations following one another consecutively. As a result, typical correlation functions are discrete time signals (with update frequency of $f_A=1/T_A$). To denote such a discrete time signal, we will use the time indicator symbol "$t_K$" as the signal's time argument, where the subscript "K" indicate the discrete nature of the time, such as in the form: $I(t_K)$.

For the general benefit of the reader, the following differences between the GPS and GLN systems are noted:

1) In the GPS system, the signals from all the GPS satellites are transmitted on the same carrier frequency (1575.42 MHz in the L1 band, 1227.60 MHz in the L2 band), but each has its own unique PR-code. In the GLN system, the signals from different satellites have different carrier frequencies, but have the same C/A-codes and P-codes.

2) In the GPS system, the "chips" in the C/A-codes are clocked out at a rate of 1.023 MHz (for a chip period $\Delta=977.52$ ns), whereas the chips for the C/A-code in the GLN system are clocked out at one-half that rate, which is 0.511 MHz (for a chip period $\Delta=1956.95$ ns).

3) In both systems, the chips for the P-codes are clocked out at a rate which is ten-times that for the clocking rate of their C/A-codes. Specifically, the P-code clocking rate is 10.23 MHz ($\Delta=97.75$ ns) in the GPS system and 5.110 MHz ($\Delta=195.69$ ns) in the GLN system.

4) In the GPS system, the P-code is additionally modulated by W-code whose sequence structure is unknown to civilian users. The GLN system has no similar modulation.

In conventional receivers, the broadcast signal from the satellites are received, and down-converted by an appropriate means to provide the desired C/A-codes (or P-codes), usually in a digital form. The down-converted signal bearing all of the received C/A-codes is then provided to one or more individual tracking channels, each of which is intended to isolate one of the satellite C/A-codes from the others and track it. The C/A-code to be tracked by a specific tracking channel is not only obscured by the C/A-codes of other satellites, but by noise signals received by the receiver and noise generated within the electronics of the receiver. In order to isolate the desired C/A-code for the others and from the noise, the down-converted signal is correlated against a replica of the desired C/A-code as indicated above. The reference replica is phase-shifted in time to a point where the correlation of the two signals is at a maximum. The correlation may be performed by multiplying the values of the two signals together at periodic intervals, and then accumulating multiplication products to form the correlation signal $I(t_K)$. Devices which perform this operation are called correlators, and may be implemented by hardware, software (i.e., DSP processor) or a combination of both. In typical implementations, the correlator accumulates the multiplication products for a fixed period of time, which is sometimes referred to as the accumulation period or accumulation window. After each accumulation period, the correlator is reset to a value of zero. Typical accumulation periods for GPS/GLN applications are 1-ms, 5-ms, and 10-ms.

Within a period of one C/A-code sequence (e.g., 1,023 chips), the accumulation of the multiplication products of the tracking channel's replica reference code with the C/A codes of satellites not being tracked by the channel will sum to substantially zero. However, the accumulation of the multiplication products of the reference code and the C/A-code to be tracked by the channel will rise to a non-zero peak value ($+M_{AC}$ or $-M_{AC}$) when the two signals are synchronized. This value will be provided in the correlation signal $I(t_K)$. Whether the output value from the correlator is $+M_{AC}$ or $-M_{AC}$ depends upon the current bit value of the low-frequency information signal A(t), if present, and any polarity difference between the satellite C/A-code and the channel's reference C/A-code. These dependencies are well known to the GPS/GLN art. (If (A(t) is present, $I(t_K)$ will alternate between $+M_{AC}$ and $-M_{AC}$ as a function of A(t)'s value.) As these signals lose synchronization, the accumulation of the multiplication products, which is the correlator output, will move from $+M_{AC}$ or $-M_{AC}$ toward a value of zero, and will settle to a value of zero if the two are out of synchronization by more than one chip period ($\Delta$).

The correlator whose output demodulates the information signal A(t) is often called the Main Correlator. The correlation of a received PR-code signal with an idealized-version of the same PR-code signal, as generated locally by the receiver with the same sign orientation but out of sync by a time delay "$\epsilon$", is is defined herein as the inter-correlation function: $R_0(\epsilon)$. $R_0(\epsilon)$ is more simply referred to as the correlation function $R_0(\epsilon)$. When $\epsilon=0$, which means the two versions are in sync, $R_0(\epsilon=0)$ is at its peak magnitude value ($+M_{R0}$). When e is greater than +1 chip duration ($+\Delta$) or less then $-1$ chip duration ($-\Delta$), $R_0(\epsilon)$ is substantially zero. As $\epsilon$ moves from 0 to +1 chip of delay, $R_0(\epsilon)$ decreases substantially monotonically with $\epsilon$ from its peak value ($+M_{R0}$) to zero. Likewise, as $\epsilon$ moves from 0 to $-1$ chip of delay, $R_0(\epsilon)$ decreases substantially monotonically with s from its peak value ($+M_{R0}$) to zero. The output of the Main Correlator will be proportional to $R_0(\epsilon)$, as well as A(t) if A(t) is present. The output $I(t_K)$ of the Main Correlator is often used to provide a measure of the satellite's signal strength.

It should be pointed out that a reference code for a tracking channel need not be a scaled replica of the broadcast C/A-code being tracked. Oftentimes, pulsed versions of the replica are used, as well as strobed versions which each strobe has a grouping of pulses for each chip of the broadcast C/A code. Each of the pulses and strobes is less than the chip duration $\Delta$. Each pulsed version and each strobed version may have pulses or strobes omitted for selected chips of the code (usually when the chip value does not change from the value of the previous chip). The correlation function of a pulsed version or a strobed version of the C/A code with the received C/A code will be different from the correlation function described above. The conventional notation for representing the correlation function of a pulsed or strobed version with the input code is "$\Delta R$" rather than "R". In this case, the "$\Delta$" symbol does not represent the chip duration $\Delta$, and "$\Delta R$" should not be read as multiplying the correlation function "R" by the chip duration ($\Delta$).

In the case where the broadcast signal comes from a GPS or GLONASS satellite, the information signal A(t) carries a reading of the current time of a master clock, the time information being accurate to within several milliseconds, assuming that one computes the rough transmission delay from the satellite. Additionally, the start of each C/A-code sequence is precisely timed with respect to the master clock, so precisely synchronizing the replica signal with the C/A-code of the broadcast signal could bring the timing accuracy to within less than a one chip duration $\Delta$ (about one microsecond), assuming that one knows the transmission delay from the satellite. The transmission delay may be determined by comparing information from the L2 band from the same satellite and information from the broadcast signals from other satellites, as is known in the GPS/GLN art. The timing information from four or more satellites can then be used to determine the global position of the receiver on the Earth, and many receivers have four or more Main Correlators for this purpose.

In order to accomplish proper extraction of the timing information and the demodulation of the information signal A(t), if present, the a receiver's tracking channel has a means of keeping the replica signal in synchronization with the C/A-code of broadcast signal. This means is usually called a delayed-lock loop (DLL) system. The DLL system may use the Main Correlator for maintaining synchronization, but more typically it has one or more of its own correlators for this purpose, each of these correlators using a pulsed or strobed version of the C/A-code, or a replica of the C/A code which are offset in time from that used by the Main Correlator. Also, the tracking channel usually has a means of generating a local carrier for the down-converter whose frequency is continuously adjusted to be in close synchronization with the carrier frequency from the satellite (the C/A-code modulates this carrier frequency). This means is usually called a phase-lock loop (PLL) system, and the tracking channel is said to use the "coherent demodulation" method, and the receiver is often called a "coherent receiver." Like the DLL system, the PLL system usually has one or more of its own correlators to aid it in isolating the carrier phase of the satellite signal being tracked by the tracking channel. Thus, a typical coherent receiver tracking channel has a Main $-15$ Correlator, a DLL system, and a PLL system, each of which processes the input signal in individual signal-processing correlators, for a total of three such correlators. For this reason, a coherent tracking channel is sometimes called a three-correlator channel (or sometimes a three-path channel).

In the typical coherent tracking channel, the proper operation of the Main Correlator, the DLL system, and the PLL system are each dependent on the proper operation of the other. For example, each of the DLL and PLL systems uses the demodulated information from the Main Correlator to remove the modulation effects of the low-frequency information signal A(t). In turn, all of the three components use the replica signal, as synchronized by the DLL system, to isolate the desired C/A-code from all of the other C/A-codes and the various source of noise. In turn, the DLL system relies on the PLL system to adjust the carrier phase to provide a maximum signal to noise ratio and to prevent carrier cycle-slips. The operation of each of three components can be disturbed by the presence of multipath signals (i.e., reflected and delayed versions of the broadcast signal).

The PLL system may be replaced with the well-known incoherent demodulator system. In this system, the input signal is down-converted using an independent carrier reference signal which does not have its phase adjusted to follow that of the input signal. Also in this system, the correlation signals for the DLL system and Main Correlator are generated such that they do not depend upon phase synchronization of the independent reference carrier and the input signal. However, this system requires the formation of four signal-processing correlators rather than three, and loses the timing information that may be extracted from the PLL synchronizing the reference carrier with the input carrier (which is a coherent method). The latter information may be extracted by other means, but such means requires additional components. Nonetheless, as the present invention pertains to both DLL and PLL systems, the performance of DLL systems of incoherent tracking channels can benefit from the present invention.

As is well known in the art, an initial-locking control system, or "search" system, is used to bring the DLL and PLL systems into rough alignment with the C/A-code and the carrier of the broadcast signal before these systems begin full tracking operation based upon the interdependence of their output signals. The initial lock control system generally varies the frequency of the local carrier and the phase of the replica code in a predetermined search pattern until a substantial correlation is detected, and thereafter enables full tracking operation. The initial-locking control systems are well known in the art, and are not part of the present invention. Many of the well known initial-locking systems may be used with the present invention. Accordingly, a description of such a system herein is not needed for one of ordinary skill in the art to make, use, and practice the present invention. For the benefit of the reader who is untrained in the field of code searching and tracking, the book entitled "Digital Communications and Spread Spectrum Systems," by Ziemer and Petersen, Macmillian Publishing Company, New York (1985) (ISBN 0-02-431670-9) (Chapters 10 and 11) is a good tutorial reference on these subjects, and the book entitled "Guide to GPS Positioning," by Wells, et al., Canadian GPS Associates, Fredericton, N. B. Canada (1986) (ISBN 0-920-114-73-3) is a good tutorial on GPS systems. The latter reference may be purchased from the Canadian Institute of Surveying and Mapping, Box 5378, Postal Station F, Ottawa, Ontario, Canada, K2C 3J1, telephone (613) 224-9851.

Under real operating conditions, the PLL and DLL systems operate with errors caused by outside disturbances. Exemplary disturbances are additive interferences (including the receiver's own noise sources), multiplicative interferences (e.g., fluctuations occurring when the radio-waves undergo expansion, generator frequency instability), dynamic disturbances because of the receiver's physical movement, and so on. In critical cases, these disturbances can lead to the tracking breakdown or to single-cycle slips in the PLL.

One of the most substantial causes of errors is the reflection of the broadcast signal from the ground or nearby physical objects, such as buildings, large boulders, and hills. These errors are often referred to as multipath errors, and can substantially reduce the precision of both the code measurements and the carrier phase measurements.

A number of general methods for dealing with multipath errors are known. One general set of methods derives corrections which are to be applied to the received GPS signals in order to subtract out the effects of the multipath signals. These methods construct a model of the environment surrounding the receiver and compute the magnitudes and phases of the reflected signals. These methods are usually not preferred since a new model for each new environment is required, and is therefore not generally applicable to all situations in which the receiver may be placed.

Another method for dealing with multipath errors is the so called MET technique. In this method, the curve of the correlation function $R_0(\epsilon)$ is traced out as a function of the delay parameter E to find the peak value of $R_0(\epsilon)$ and the slope of the curve on each side of the peak. From the peak value and the slopes, an estimation of the reflected signal can be made, and a correction for the multipath signal can be made. Several correlators are typically used in this method, which has the disadvantage of increasing the cost and complexity of the receiver.

Another general set of methods includes special circuitry or signal processing of the received signal which act to reject, or discriminate against, multipath signals. In a conventional receiver which does not have multipath rejection, the received broadcast signal is simultaneously correlated against two versions of the C/A-code by two separate correlators. The second version of the C/A-code is delayed in time from the first version by one-chip duration ($\Delta$), and the resulting correlations of these versions with the broadcast signal are subtracted from one another to provide the control signal to the DLL. When these two versions are synchronized to the broadcast signal, the control signal has a value of zero, and the chip edges (fronts) of the broadcast signal occur midway between the corresponding chip edges of the two versions (which are often called the "early" and "late" versions). In these receivers, multipath signals which are delayed by less than 1.5 chip durations ($1.5\Delta$) from the directly received broadcast signal will be correlated into one or both correlations, and will thereby disturb the computation of the control signal. The receivers which include multipath rejection use strobed representations of the early and late C/A-code versions, and use a shorter phase delay between the strobed representations. The strobed representations are normally at a zero value except for small time windows around the start of all of the chip edges (or at selected ones of the chips edges), where the representation has one or more pulses. If there is more than one pulse in such a time window, the pulses are arranged to have a total area of zero (in other words, equal positive and negative areas), and are usually symmetric about a line (or plane) or rotation point. (These features lead to a symmetric discriminator curve.) The basic idea behind these strobe receivers is to only perform the correlations in small sample windows near the points where the directly received signal changes its value so that the value or changes in values of the reflected signals are not sampled or correlated.

Although the strobed receivers provide a great reduction in errors caused by multipath signals, they do have some disadvantages. As one disadvantage, the output signal of the DLL discriminator is zero not only at the point of desired synchronization with the directly-received broadcast signal, but the control signal is zero over much of its range from +1 chip duration (+Δ) from synchronization to −1 chip duration (−Δ) from synchronization. Thus, an external means, such as a conventional early-late receiver, must be used to bring the receiver close enough to the point of synchronization where the strobe-receiver can function. This has the disadvantage of requiring additional circuitry and/or additional signal processing power. As a corollary to this, the locking range of the strobed receivers is much smaller than that of the conventional early-late correlation receiver. As a second disadvantage, each multipath signal of substantial value will create perturbations in the zero regions of the DLL control signal, and these perturbations have a zero-crossing point which the DLL can falsely lock onto. Therefore, the strobe correlators require means for distinguishing the true point of synchronization from these false-locking points.

While the strobed methods have been described in the context of the DLL system, they may also be used in the PLL system. As in the DLL system, the strobe pulses reduce the effects of multipath signals in the PLL system. However, the strobe pulses increase the noise errors in the PLL system, which is a disadvantage.

Another approach for addressing multipath signals is described by Philip G. Mattos in a paper entitled "Multipath Elimination for the Low-Cost Consumer GPS," from the Proceedings of the $9^{th}$ International Technical Meeting of the Satellite Division of the Institute of Navigation (Kansas City, Mo. U.S.A.), 1996. Instead of using an "early" corr- elator and a "late" correlator, this approach uses two "early" correlators, the output signals of which are called "e1" and "e2", respectively. Each correlator correlates the input signal with a replica of the PR-code being tracked, but the replica code signals are offset in time from one another by $\frac{1}{8}$ of a chip to $\frac{1}{2}$ of a chip. The signal e1 comes from the replica which is earlier in time. The time offset of these replica code signals with respect to the satellite PR-code is adjusted such that the ratio of the e1 signal (the earlier one) to the e2 signal (i.e., e1/e2) is equal to a predetermined fractional amount, such as 0.95 for an $\frac{1}{8}$ chip separation in replica codes. The ratio is determined by simulations given certain assumption about the characteristics of the receiver, and a control loop may be set up to minimize the quantity: (e1/e2)−0.95. Because the output e1 appears as the numerator in the ratio, and because the ratio is being controlled to a value less than 1, the operating points of both earlier correlators will be positioned on the early edge of the correlation function, where the effects of multipath signals are minimized (by their very nature, reflected multipath signals are received after the main signal). A disadvantage of this method is that susceptible to noise.

When attempting to find ways of reducing the effects of multipath errors, one finds that actions taken to improve the rejection of multipath signals leads to adverse impacts on important characteristics of the receiver, and one is often forced to accept less improvement in multipath rejection for the sake of maintaining other characteristics within accept- able ranges. For example, known correlators that reduce multipath errors have worse indexes of lock. Other actions aimed at reducing multipath errors lead to increases in the noise error or the processor load on the signal processing circuitry.

The developer of such receivers is always faced with the problem of compromising solution choices when taking into account all of the factors and real conditions of the receiver's operation.

The aim of the present invention is to provide multipath error reduction in PLL and DLL systems while not consid- erably worsening their lock characteristics or increasing the cost and complexity of the receiver's hardware.

SUMMARY OF THE INVENTION

The present invention encompasses multipath error reduc- tion techniques which enable this error in the DLL systems to be made much less than the error present in known narrow "early-late" correlators, or their corresponding implementa- tions which use strobe representations of the PR-code. The present invention also encompasses multipath error reduc- tion techniques that enable multipath errors in the PLL systems to be reduced. The techniques, when applied to both the DLL and PLL systems work synergistically to further reduce multi-path errors.

Broadly stated, the present invention comprises DLL and/or PLL systems having control signals (Ed and Ep, respectively) which vary with the time delay shift parameter $\epsilon$, which is the difference in time between a chip edge of the PR-code of the broadcast signal and the corresponding edge of the reference PR-code signal (generated by the receiver). The present invention further comprises an asymmetric relationship in one or both of these control signals, such that variation in the control signal is asymmetric about the point steady-state operation ($\epsilon = \epsilon_0$).

In preferred DLL embodiments according to the present invention, the control signal Ed of the DLL system is relatively small and of a first polarity when the receiver's reference PR-code leads the PR-code of the broadcast signal ($\epsilon < \epsilon_0$), and is relatively large and of the opposite polarity when it lags the PR-code of the broadcast signal ($\epsilon > \epsilon_0$). The asymmetric feature enables substantial reduction of multi- path errors in the DLL system without degrading the code- locking bandwidth of the DLL system in the range $\frac{1}{2}\Delta < \epsilon < \frac{1}{2}\Delta$ (Δ=one chip period), which has been the case with prior art multipath reduction techniques. Moreover, the asymmetric feature also enables a reduction in probability of the DLL system falsely locking on to a lagging multipath signal.

BRIEF DESCRIPTION OF THE DRAWINGS

FIG. 1 shows a block schematic diagram of an exemplary receiver channel according to the present invention, showing in particular an exemplary main correlator, delay-lock loop (DLL) system, and carrier phase lock loop (PLL) system according to the present invention.

FIG. 2 shows a block diagram of an exemplary quadrature analog-to-digital converter of the exemplary receiver chan- nel shown in FIG. 1.

FIG. 3 shows a block diagram of an exemplary complex multiplier of the exemplary receiver channel shown in FIG. 1.

FIG. 4 shows timing diagrams of exemplary signal wave- forms of the exemplary receiver channel shown in FIG. 1.

FIG. 5 shows graphs of exemplary correlation functions provided by the exemplary DLL system, main correlator, and PLL system, respectively, of FIG. 1; each correlation function is the correlation of broadcast PR-code signal with a code signal specific to the respective system, and is graphed as a function of the time-delay $\epsilon$ between the system specific signal and the broadcast PR-code signal.

FIGS. 6–8 show graphs of exemplary correlation func- tions from the DLL system of the receiver channel shown in FIG. 1; the correlation is between the received satellite broadcast signal and various correlation code functions having the general form shown by FIG. 4.

FIG. 9 shows a graph of the multipath error in the DLL system, as measured in meters from the true location, as a function of the time delay of the multipath signal from the directly received signal, assuming that the magnitude of the reflected signal is 10% of the directly received signal.

FIG. 10 shows a graph of the multipath error in the PLL system, as measured in radians, as a function of the time delay of the multipath signal from the directly received signal, assuming that the magnitude of the reflected signal is 10% of the directly received signal.

FIG. 11 shows graphs of additional reference code signals according to the present invention.

FIG. 12 shows graphs of general exemplary correlations signals and control signals for Y-displacement embodiments according to the present invention.

FIGS. 13 and 14 show graphs of exemplary reference code signals for the Y-displacement embodiments according to the present invention.

FIG. 15 shows a block schematic diagram of an exemplary receiver channel for the Y-displacement embodiments according to the present invention.

FIGS. 16–18 show graphs of exemplary correlation signals and control signals of the Y-displacement embodiments according to the present invention.

FIG. 19 shows a graph of yet another exemplary reference code signal for the Y-displacement embodiments according to the present invention.

DETAILED DESCRIPTION OF THE PRESENT INVENTION

A block schematic diagram of a first exemplary embodiment of receiver channel according to the present invention is shown in FIG. 1. A composite radio signal consisting of the broadcast signals from all the GPS and GLN satellites visible to the receiver is received by an antenna 10. Each satellite broadcast signal comprises a carrier signal $\omega_s$ modulated by respective pseudo-random C/A-code. Because each satellite is moving with respect to the receiver, the carrier frequency $\omega_S$ of each satellite as received will be slightly shifted from the transmitted value by the Doppler effect, as is well known in the global positioning art. The maximum Doppler shift for the GPS system is approximately 5 kHz. Nonetheless, the broadcast signals remain in their designated band (e.g., L1 or L2 for GPS receivers), and each broadcast signal has a bandwidth $\Delta\omega_S$ of around 20 MHz centered around its carrier frequency $\omega_S$ due to the modulation of the C/A-code and the P-code (20 MHz bandwidth=2 sidebands of 10 MHz). The broadcast signals are filtered by a filter 11 to filter out all other signals which are not in the desired band of interest (e.g., L1 and/or L2 for GPS). The filtered signal is indicated at 12 in FIG. 1. Oftentimes, filter 11 will have a filter bandwidth a somewhat less than 20 MHz, such as for example 15 MHz to 16 MHz, leaving filtered signal 12 with a bandwidth of 15 MHz to 16 MHz, (15 MHz bandwidth=2 sidebands of ±7.5 MHz).

The filtered broadcast signal 12 is then provided to the input of a quadrature analog-digital converter (QADC) 13, an exemplary embodiment thereof being illustrated in FIG. 2. QADC 13 down-converts the signal provided to its input, and places the signal in quadrature format by generating two output signals which are orthogonal to one another. QADC 13 comprises two multipliers 130a and 130b, a local oscillator 133, two low-pass filters 131a and 131b, and two analog-to-digital converters (ADC) 132a and 132b. Local oscillator 133 generates two signals 134a and 134b having the same frequency $\omega_0$ but 90° out of phase. For the purposes of discussion, and without loss of generality, signal 134a will be designated as $\sin(\omega_0 t)$ and signal 134b will be designated as $\cos(\omega_0 t)$. Signal 134a and the filtered input signal 12 are provided to multiplier 130a as inputs which are multiplied together. Likewise, signal 134b and filtered input signal 12 are provided to multiplier 130b as inputs which are multiplied together. As a result of the multiplication process, each multiplier produces a signal at its output which is essentially the broadcast signal of the satellite down-converted so that its bandwidth $\Delta\omega_S$ is centered about a lower frequency carrier signal $\Omega_S$ which is equal to the difference between the original carrier $\omega_S$ and the local oscillator frequency $\omega_0$ ($\Omega_S = \omega_S - \omega_0$). $\Omega_S$ is referred to herein as the intermediate frequency (I-F) broadcast carrier, and is often referred to as the "beat frequency" or "difference frequency" in the art. In the GPS system, the frequencies ($\omega_S$) of the satellite carriers, as received by the receiver's antenna, are very close to one another, but are slightly different due to the Doppler effect. Correspondingly, the I-F carriers frequencies ($\Omega_S$) for the satellites are close to one another but have slight variations. When we refer to the carrier frequency of a specific satellite and the corresponding the I-F frequency, we will add a numeric subscript to the "S" subscript to distinguish it from the others. For example, we will denote the carrier frequency and I-F frequency of satellite #1 as being $\omega_{S1}$ and $\Omega_{S1}$, respectively. Typical values for the intermediate frequency (I-F) carrier in the exemplary receiver illustrated in FIG. 1 range between 1 kHz and 10 MHz. For the L1 band ($\omega_S$=1,575 Mhz), the local oscillator frequency $\omega_0$ will be between 1,565 MHz and 1,574.999 MHz. For the L2 band ($\omega_S$=1,227MHz), the local oscillator frequency co will be between 1,217 MHz and 1,226.999 MHz. The local oscillator frequency $\omega_0$ may be generated in a number of ways well known to the art. For example, $\omega_0$ may be generated by the standard combination of a voltage-controlled oscillator and a synthesizer, as is well known in the art. The frequency down-conversion may also be performed with two stages (or more), with each stage having its own local-oscillator frequency. No specific method of frequency down-conversion and filtering is needed for one of ordinary skill in the art to make and use the present invention.

Multipliers 130, depending upon their particular implementation (e.g., conventional multiplier, mixer, non-linear element mixer, etc.) can generate other replicas of the broadcast bandwidth $\Delta\omega_S$ centered about one or more higher carrier frequencies. However, these replicas are filtered out by low-pass filters 131a and 131b.

The outputs of filters 131a and 131b may be mathematically represented as follows (for broadcast signal $\omega_{S1}$ of satellite #1, having corresponding I-F carrier frequency $\Omega_{S1}$):

$V_1 = \frac{1}{2} M_1 p_1(t-\xi) \cos(\Omega_{S1} t + \phi_1)$ (output from filter 131a)

$V_2 = \frac{1}{2} M_1 p_1(t-\xi) \sin(\Omega_{S1} t + \phi_1)$ (output from filter 131b)

where the broadcast signal as received by the receiver is represented as: $M_1 p_1(t-\xi) \sin(\omega_{S1} t + \phi_1)$, where $M_1$ is the amplitude of the broadcast signal as received, where $p_1(t-\xi)$ is a digital function having ±1 values representing the C/A-code (or other pseudo-random codes), where i represents the time delay of the C/A-code from transmission to reception, where $\sin(\omega_{S1} t + \phi_1)$ represents the carrier, and where $\omega_1$ represents the phase difference between the carrier frequency as transmitted and as received. The outputs of filters 131a and 131b will have additional mathematical terms from other visible satellites, these terms being simply added to (i.e., superimposed on) the terms shown above. After passing through low-pass filters 131a and 131b, the signals $V_1$ and $V_2$ are sampled and quantized into digital forms by ADC converters 132a and 132b, respectively, at the same sampling frequency, and the quantized versions are shown at reference number 14 in the figures. The sampling frequency is chosen to satisfy the well-known Nyquist criteria (i.e., sampling frequency being greater than twice the highest frequency signal presented to the ADC), and such that the period of the sampling frequency and the chipping period (Δ) are not divisible (i.e., do not divide to produce a whole number). As an example, low-pass filters 131a and 131b may have a maximum bandwidth of 15–17 MHz each, and the sampling period may be set to 35 MHz, with the chipping period A being set at 1.023 MHz (by the GPS standard) or 0.511 MHz (by GLN standard). The quantization of the ADC sampling may be binary (−1 and +1, also called one-bit resolution) or three-leveled (−1, 0 and +1, also called two-bit resolution), which are commonly employed in the GPS art. Higher levels of quantization may be used.

The quantized outputs 14 of QADC 13 are simultaneously provided to all of the satellite-tracking channels of the receiver (typically four or more for high-accuracy receivers), each tracking channel being assigned to track one of the visible satellites. For simplicity, FIG. 1 shows only one tracking channel in detail. In turn, each satellite-tracking channel has three or four signal-processing correlators (sometimes called paths), depending upon whether coherent or incoherent demodulation of the satellite signal is used. Three signal processing correlators are shown in FIG. 1, where coherent demodulation is used. The other satellite-tracking channels have the same construction as shown in FIG. 1, but use different PR-codes, reflective of the different satellites being tracked by these channels. The tracking channels may be designed such that they may each receive an indication from a master controller (which is not shown in the drawings, and which is not part of the invention) as to which satellite it is to track, and therefore which PR-codes are to be used. The PR-codes may be stored in a common memory, or may be downloaded to the tracking channel prior to operation. The tracking channels for down-converting GPS P-code in civilian receivers would be a little different from that described above because of the modulation of the P-code by the secret W-code. However, a partial decoding of the W-code can be done in a number of well-known ways, and the decoding of the W-code does not form part of the present invention. The present invention can be completely shown and described using the non-secret C/A-code, and the description herein is more than sufficient to enable one of ordinary skill in the GPS receiver art to practice the invention for C/A-codes as well as P-codes, W-codes, and other types of PR-codes in application areas different from GPS and GLN.

Referring to FIG. 1, the down-converted and sampled version 14 of the broadcast signal is received by each tracking channel and multiplied by a reference carrier signal 16 generated by the tracking channel. Like signal 14, the reference signal is in quadrature form, comprising a Sine signal component and a Cosine signal component. The multiplication is performed by a complex multiplier 15 capable of handling the two quadrature formatted signals. The purpose of multiplier 15 and reference carrier signal 16 is to frequency down-convert the broadcast signal 14 to baseband, and to thereby remove the carrier and retain (or save) the PR-code signal of the visible satellite. The bit resolution of reference carrier signal 16 is typically the same as that for signal 14, which is typically one or two bits of resolution, but may be higher. As described below in greater detail, the reference carrier signal 16 is generated by a phase lock loop (PLL) system of the tracking channel such that the signal 16 closely follows the frequency and phase of the intermediate frequency carrier $\Omega_{S1}$ of its assigned satellite. More specifically, the Sine component of signal 16 is $\sin(\Omega_{S1}t+\phi_1+\phi_P)$, and is controlled to track the Sine component of intermediate frequency (I-F) broadcast carrier $\Omega_{S1}$, which is $\sin(\Omega_{S1}t+\phi_1)$. The term $\phi_P$ represents the phase difference between the I-F broadcast carrier and the reference carrier signal 16, and is driven to a value very close to zero by the PLL system (thereby causing the tracking of the signals). Similarly, the Cosine component of signal 16, which is $\cos(\Omega_{S1}t+\phi_1+\phi_P)$, is controlled to track the Cosine component of the I-F broadcast carrier, which is $\cos(\Omega_{S1}t+\phi_1)$. A positive value of $\phi_P$ indicates that the reference carrier 16 is ahead of the I-F broadcast carrier $\Omega_{S1}$, and therefore needs to be retarded. A negative value of $\phi_P$ indicates that the reference carrier 16 is behind the I-F broadcast carrier $\Omega_{S1}$ and therefore needs to be advanced.

An exemplary embodiment of a complex multiplier 15 is shown at 150 in FIG. 3. Complex multiplier 150 comprises four digital multipliers 151–154, a digital adder 156, and a digital subtractor 158. Multiplier 151 takes the output 14a of ADC 132a and multiplies it with the Cosine component of the reference carrier, $\cos(\Omega_{S1}t+\phi_1+\phi_P)$, and provides the result to adder 156 as an input. Multiplier 152 takes the output 14b of ADC 132b and multiplies it with the Cosine component of the reference carrier, $\cos(\Omega_{S1}t+\phi_1+\phi_P)$, and provides the result to subtractor 158 as an input. Multiplier 153 takes the output 14a of ADC 132a and multiplies it with the Sine component of the reference carrier, $\sin(\Omega_{S1}t+\phi_1+\phi_P)$, and provides the result to subtractor 158 as an input. Multiplier 154 takes the output 14b of ADC 132b and multiplies it with the Sine component of the reference carrier, $\sin(\Omega_{S1}t+\phi_1+\phi_P)$, and provides the result to adder 156 as an input. Adder 156 produces the in-phase component 20 of the output of complex multiplier 150, which is represented as $U_1(t)$, and subtractor 158 produces the quadrature component 21 thereof, which is represented as $U_2(t)$. These values are related to $V_1$ and $V_2$ as follows (for broadcast signal $\omega_{S1}$ of satellite #1, having corresponding I-F carrier frequency $\Omega_{S1}$):

$$U_1 = V_1 \cos(\Omega_{S1}t+\phi_1+\phi_P) + V_2 \sin(\Omega_{S1}t+\phi_1+\phi_P)$$

$$U_2 = V_1 \sin(\Omega_{S1}t+\phi_1+\phi_P) - V_2 \cos(\Omega_{S1}t+\phi_1+\phi_P)$$

If we assume for the moment that $V_1$ and $V_2$ only bear the signal from one satellite and are of the form $V_1=\frac{1}{2}M_1p_1(t-\xi)\cos(\Omega_{S1}t+\phi_1)$ and $V_2=\frac{1}{2}M_1p_1(t-\xi)\sin(\Omega_{S1}t+\phi_1)$, then $U_1$ and $U_2$ reduce to the form:

$$\begin{aligned}U_1 &= \frac{1}{2}M_1 p_1(t-\xi) \times \{\cos(\Omega_{S1}t+\varphi_1)\cos(\Omega_{S1}t+\varphi_1+\varphi_P) + \\ &\qquad \sin(\Omega_{S1}t+\varphi_1)\sin(\Omega_{S1}t+\varphi_1+\varphi_P)\} \\ &= \frac{1}{2}M_1 p_1(t-\xi) \times \{\cos(\Omega_{S1}t+\varphi_1-\Omega_{S1}t-\varphi_1-\varphi_P)\} \\ &= \frac{1}{2}M_1 p_1(t-\xi)\cos(-\varphi_P) \\ &= \frac{1}{2}M_1 p_1(t-\xi)\cos(\varphi_P)\end{aligned}$$

-continued $$U_2 = \frac{1}{2}M_1p_1(t-\xi) \times \{\cos(\Omega_S{}_It + \varphi_1)\sin(\Omega_S{}_It + \varphi_1 + \varphi_p) - \sin(\Omega_S{}_It + \varphi_1)\cos(\Omega_S{}_It + \varphi_1 + \varphi_p)\}$$

$$= \frac{1}{2}M_1p_1(t-\xi) \times \{\sin(\Omega_S{}_It + \varphi_1 + \varphi_p - \Omega_S{}_It - \varphi_1)\}$$

$$= \frac{1}{2}M_1p_1(t-\xi)\sin(\varphi_p)$$

As described in greater detail below, the PLL system will use signal $U_2$ to drive $\phi_P$ to a value of near zero, which brings $U_2$ to near zero and $U_1$ to $\frac{1}{2}M_1p_1(t-\xi)$. Each of the other satellite broadcast signals will introduce terms into $V_1$ and $V_2$ which will be in the form of $\frac{1}{2}M_Np_N(t-\xi_N)\cos(\Omega_{SN}t+\phi_N)$ and $\frac{1}{2}M_Np_N(t-\xi_N)\cos(\Omega_{SN}t+\phi_N)$, respectively. Here, the subscript "N" represents any of the other satellites being received. These terms will be carried into $U_1$ and $U_2$. These extraneous terms are substantially eliminated when signals $U_1$ and $U_2$ are correlated with the pseudo-random code signal $p_1(t)$ of the desired satellite, or correlated with a function which has a high correlation with $p_1(t)$ and has substantially lower, and preferably zero, correlations with the pseudo-random code signals $p_N(t)$ of the other satellites.

One of ordinary skill in the art will recognize that the above-described components of complex multiplier 15 may be implemented by common digital circuits, or by any high-speed digital signal processor (DSP) running under software control which carries out the arithmetic operations specified by the block shown in FIG. 3. The configuration and programming of such DSP signal processors is well with the ordinary skill in the art.

Referring back to FIG. 1, the in-phase component ($U_1$) from complex multiplier 15 (e.g., multiplier 150) is indicated at 20, and the quadrature component ($U_2$) is indicated at 21. Both of these signals contain the PR-code signals of the visible satellites (i.e., $M_1p_1(t-\xi_1)$ through $M_Np_N(t-\xi_N)$), which are the baseband signals used by the satellites to modulate their carrier signals (e.g., the respective C/A-codes, P-codes, and low-frequency information signals). As such, signal 20 will be referred to herein as the "in-phase component of the satellite baseband signals", and signal 21 will be referred to herein as the "quadrature component of the satellite baseband signals." The quadrature component 21 of the satellite baseband signals is provided to the PLL system, which comprises a correlator 23, a discriminator 37, a PLL filter 19, and a reference carrier generator 17. Reference carrier generator 17 generates the reference carrier signal 16 (both in-phase and quadrature components) which is provided to complex multiplier 15. The in-phase component 20 of the satellite baseband signals is provided to a main correlator 35, which demodulates the low frequency (50 Hz) information signal A(t) of the desired satellite, if the A(t) is present within the broadcast signal. (The desired satellite is the one which the tracking channel has been assigned to track.) The in-phase component 20 is also provided to the DLL system, which comprises a correlator 22, a discriminator 28, a DLL filter 31, and a reference code generator 25. Reference code generator 25 provides a separate reference PR-code signal to each of the correlators 22, 23, and 35, with each PR-code signal comprising a plurality of periodically spaced pulses whose polarities (signs) follow the form of the PR-code of the desired satellite. The reference PR-code signals are preferably different from one another, but nonetheless each PR-code signal has a range of strong correlation with the PR-code of the desired satellite, and near-zero correlation outside of this range. Moreover, for the GPS system, each of the three reference PR-code signals has a low or near zero correlation with the PR-codes of the other satellites. (In the GLN system, each satellite uses the same C/A-code, but at different carrier frequencies).

More specifically, code generator 25 provides a first code signal S(t) to DLL system's correlator 22 on a signal line 24, a second code signal $S_K(t)$ to main correlator 35 on a signal line 29, a third code signal $S_2(t)$ to the PLL system's correlator 23 on a signal line 36. Each of these codes are synchronized with respect to one another, and each has a range of strong correlation with the PR-code broadcast by the desired satellite and a very weak or substantially zero correlation with the PR-codes broadcast from the other satellites. The range of strong correlation is generally less than two chip durations, $2\Delta$. As one inventive aspect of the present invention, the three reference codes take different forms (i.e., have different wave shapes) in order to provide improved reduction of multipath errors, with the code for the DLL system having a locking point within the range of strong correlation. The value of the correlation function at this locking point is zero, but is non-zero on either side with opposing values. Moreover, the function is asymmetric about the locking point. (The locking point is also called the point $\epsilon_0$ of steady balance.)

As another inventive aspect of the present invention, the three reference PR-codes provided by generator 25 may be phase shifted with respect to one another (typically on the order of one chip duration $\Delta$ or less) to provide improved immunity to noise. As described in greater detail below, the code signal $S_K(*)$ to main correlator 35 may be shifted by a time offset $\epsilon_K$ with respect to the code signal S(t) provided to the DLL correlator 22. The offset $\epsilon_K$ is measured from the chip fronts of the signals S(t) and $S_K(*)$, and the offset is shown in $S_K(*)$ as follow: $S_K(t-\epsilon_K)$. A positive value of $\epsilon_K$ indicates that $S_K(t-\epsilon_K)$ lags behind S(t) by a time offset $\epsilon_K$, and a negative value indicates that $S_K(t-\epsilon_K)$ leads ahead of S(t) by a time offset $\epsilon_K$. Similarly, the code signal $S_2(*)$ to the PLL correlator 23 may be shifted by a time offset $\epsilon_S$ with respect to the code signal S(t), which is indicated as $S_2(t-\epsilon_S)$. The offset $\epsilon_S$ is measured from the chip fronts of the signals S(t) and $S_2(t-\epsilon_S)$, and a positive value of $\epsilon_S$ indicates that $S_2(t-\epsilon_S)$ lags behind S(t) by $\epsilon_S$ and a negative value indicates that $S_K(t-\epsilon_K)$ leads ahead of S(t) by $\epsilon_S$.

Before turning to the specifics of the novel PR-codes and the corresponding novel correlation functions, the basic operation of main correlator 35, the DLL system and PLL system are described, assuming that the novel PR-code signals have been placed in rough synchronization by the search system 32. Search system 32 may be implemented in any number of well known ways, and does not form a part of the present invention. As it turns out, the novel PR-codes of the present invention have a wide locking range, which enables the use of virtually all of the known search systems, even the simplest of search systems.

Each of the correlators 22, 23, and 35 correlates its respective reference code signal with the down-converted input signal by forming multiplication products of these signals and accumulating the products for a fixed period of time, which is often called the accumulation period. The accumulation period is typically 1 ms, 2 ms, or 5 ms in duration. After each such accumulation period, the final accumulated total is provided at the output of the correlator as the correlation signal for the correlator, and is then used by other components of the tracking system, such as the filters and discriminators. After each accumulation period, the correlator is reset to a value of zero and a new accumulation cycle is started. The accumulation period is generally the same for each of correlators 22, 23, and 35, and the correlators are usual synchronized to start their accumulation periods at the same time. Without loss of generality, the description herein will use synchronized operation of correlators 22, 23, and 35 with a common accumulation period $T_A$, which has a corresponding frequency $F_A=1/T_A$. As such, the outputs of the correlators, and correspondingly the input signals to PLL discriminator 37 and DLL discriminator 28, are discrete time signals which are digitized at frequency $F_A$. Similarly, the outputs of PLL discriminator 37 and DLL discriminator 28 are discrete time signals, as are the inputs and outputs of PLL filter 19 and DLL filter 31. As such, the frequency $F_A$ places an upper limit on the frequency response of the PLL and DLL systems. However, the frequency $F_A$ is sufficient to track typical phase chances in the input code and carrier signals, and is chosen to be above the modulation frequency of the information signal A(t), if present. We will denote a discrete-time signal by using the time indicator symbol "$t_K$" as the correlation signal's time argument in place of the continuous time indicator symbol "t".

Main correlator 35 correlates the in-phase component 20 of the satellite baseband signals with the PR-code $S_K(t-\epsilon_K)$ and generates at its output the low-frequency (50 Hz) information signal I(*) from the desired satellite. Signal I(*) has the general form of:

$$I(t_K,\epsilon,\phi_p) = M \times A_K(t) \times R_{MC}(\epsilon - \epsilon_K) \times \cos(\phi_p)$$

where M represents the received signal magnitude of the baseband signal (as quantized by QADC 13), where $A_K(t)$ is the value of the low frequency information signal $A_K(t)$ over the time interval from $t_{K-1}$ to $t_K$, and where $R_{MC}(\epsilon-\epsilon_K)$ is the correlation function between the PR-code of the desired satellite and the reference PR-code signal $S_K(t-\epsilon_K)$, as a function of time shift $\epsilon$ between the sequence starts of the PR-codes in the DLL system (the time shift $\epsilon$ is more fully defined below in the discussion of the DLL system). The term $\cos(\phi_P)$ arises from the phase difference between the I-F broadcast carrier and the reference carrier signal 16, and is driven to a value very close to 1 by the PLL system($\phi_P\sim0$). A(t) changes between the values of −1 and +1 to convey the low frequency information, and each bit of data in A(t) is held constant for 20 C/A-code sequences (which corresponds to 20 ms). When the reference carrier signal 16 is sufficiently synchronized to the I-F broadcast carrier and the reference code $S_K(t-\epsilon_K)$ is sufficiently synchronized to the satellite PR-code, $R_{MC}(\epsilon-\epsilon_K)$ and $\cos(\phi_P)$ are at substantially constant values, and the sign changes in signal I(*) provide the data bits of information signal A(t). If A(t) is not present, the above equation, as well as further equations provided below, may be used by setting A(t)=1. An exemplary correlation function $R_{MC}(\epsilon-\epsilon_K)$ for main correlator 35 according to the present invention is shown at a graph 502 in FIG. 5 (solid line). The waveform shown in graph 502 is also the form of the correlation signal I(*) as a function of the time shift $\epsilon$: I($\epsilon$).

Referring back to FIG. 1, signal I(*) is provided to the DLL and PLL systems so that these systems may filter out A(t), if present, and which will enable better synchronization to the C/A-code (or P-code as the case may be) and the carrier phase in these systems. The signal I(*) may also be used to gauge the power of the broadcast signal, and may be provided to the DLL and PLL to normalize the output signals from those processing correlators. The low-frequency signal A(t), when present, is provided to a geographic computation engine, which is well known to the GPS/GLN art and which does not form a part of the present invention. The computation engine reads the information signal A(t), compares it with the information from other satellites tracked by other tracking channels, and computes a rough set of global coordinates for the receiver's geographical location. The computation engine may also read the output of reference code generator 25 to compute a more accurate set of global coordinates, and may also read the output of reference carrier generator 17 to compute an even more accurate set of global coordinates when operating in a differential navigation mode with a reference receiver. The focus of the present invention is not on the geographic computation engine, but on making the outputs of generators 17 and 25 more resistant to multipath errors, thus enabling any geographic computation engine to compute a better set of global coordinates.

In the DLL system, DLL correlator 22 correlates the in-phase component 20 ($U_1$) of the satellite baseband signals with the reference PR-code signal S(t) on line 24 and generates a correlation control signal dI(*) at its output 27. Reference code S(t) is a pulsed version or strobed version of the PR-code being tracked. The correlation process filters out the effects of the baseband signals from the undesired satellites, and dI(*) has the general form of:

$$dI(t_K,\epsilon,\phi_p) = M \times A_K(t) \times \Delta R_{DLL}(\epsilon) \times \cos(\phi_P)$$

where $\Delta R_{DLL}(\epsilon)$ is the correlation function between the PR-code of the desired satellite and the reference PR-code signal S(t), as a function of time offset c from synchronization of the two PR-codes. (The use of the "Δ" symbol in $\Delta R_{DLL}$ does not represent the chip duration Δ, but rather indicates that a pulsed or strobed reference code has been used to generate $\Delta R_{DLL}$.) The time shift $\epsilon$ is equal to the time period between the start of a satellite PR-code sequence and the start of corresponding sequence of PR-reference code S(t) by generator 25. If the satellite PR-code sequence is encountered first, $\epsilon$ is positive; otherwise $\epsilon$ is negative. The time shift $\epsilon$ may also be defined and measured from the starts of corresponding chip fronts in the PR-code signals and the reference code signal S(t) in a similar manner. The term $\cos(\phi_P)$ in the above equation arises from the phase difference between the I-F broadcast carrier and the reference carrier signal 16, and is driven to a value very close to 1 by the PLL system($\phi_P$=0). (As previously indicated, in some cases the broadcast signal does not include A(t), in which case one may set A(t)=1 in the above equation.)

According to the present invention, the form of the reference PR-code signal S(t) is preferably chosen to meet the following criterion:

(1) the value of correlation function $\Delta R_{DLL}(\epsilon)$ (and therefore control signal dI) is selected to be substantially zero at a point $\epsilon=e_0$; the point $\epsilon=\epsilon_0$ is called the point of steady balance and the DLL system adjust itself to operate at this point during steady-state operations; $\epsilon_0$ is usually negative (but not necessarily);

(2) $\Delta R_{DLL}(\epsilon)$ (and dI) changes from its value of zero at $\epsilon=\epsilon_0$ to a high value of one polarity for $\epsilon>\epsilon_0$, which occurs when the S(t) lags behind the satellite's C/A-code (or P-code) from its relative position at the point $\epsilon_0$ of steady balance; and (3) $\Delta R_{DLL}(\epsilon)$ (and dI) changes from its value of zero at $\epsilon=\epsilon_0$ to a low value of the opposite polarity for $\epsilon<\epsilon_0$, which occurs when S(t) leads ahead of the satellite's C/A-code from its relative position at the point $\epsilon_0$ of steady balance.

An exemplary DLL correlation function $\Delta R_{DLL}(\epsilon)$ according to the present invention is shown in a graph 501 in FIG. 5 (solid line). The waveform shown in graph 501 is also the form of the correlation signal dI(*) as a function of the time shift $\epsilon$: dI($\epsilon$). The sign of the correlation function $\Delta R_{DLL}(\epsilon)$ indicates whether reference generator 25 needs to advance or retard the generation of S(t). If S(t) is lagging from the position it has at the point $\epsilon_0$ of steady balance (corresponding to $\epsilon > \epsilon_0$), S(t) needs to be advanced. For the curve shown in graph 501 of FIG. 5, $\Delta R_{DLL}(\epsilon)$ is greater than zero under this condition, and its positive value may be used to cause reference generator 25 to advance S(t). On the other hand, if S(t) is ahead of the position it has at the point $\epsilon_0$ of steady balance (corresponding to $\epsilon < \epsilon_0$), S(t) needs to be retarded. For the curve shown in graph 501, $\Delta R_{DLL}(\epsilon)$ is less than zero under this condition, and its negative value may be used to cause reference generator 25 to retard S(t).

Given that the PLL system has set $\cos(\phi_P)=1$, the value of $\Delta R_{DLL}(\epsilon)$ can be extracted, or sufficiently approximated, from signal dI(*) by removing the modulating effects of A(t), if present. (If A(t) is not present within the broadcast signal, then $M^* \Delta R_{DLL}(\epsilon)$ equals dI(*) when $\cos(\phi_P)=1$.) The removal of the modulation effects is performed by DLL discriminator 28, which may be implemented in several ways. For example, one can simply multiply or divide dI($t_K, \epsilon, \phi_P$) by either −1 or +1, depending upon the current sign of A(t) (as provided by I($t_K, \epsilon, \phi_P$) at the output of main correlator 35). The output of DLL discriminator 28 is provided at line 30 and is designated as the DLL control signal Ed. In preferred embodiments of the present invention, DLL discriminator 28 generates Ed according to the following mathematical form:

$$Ed = \frac{dI(t_K, \varepsilon, \varphi_P)}{I(t_K, \varepsilon, \varphi_P)} = \frac{M \times A_K(t) \times \Delta R_{DLL}(\varepsilon) \times \cos(\varphi_P)}{M \times A_K(t) \times R_{MC}(\varepsilon - \varepsilon_K) \times \cos(\varphi_P)}$$

$$= \frac{\Delta R_{DLL}(\varepsilon)}{R_{MC}(\varepsilon - \varepsilon_K)}$$

This removes the dependencies on M, A(t), and $\phi_P$, but introduces $R_{MC}(\epsilon - \epsilon_K)$ in the denominator. However, when the signals are synchronized in the DLL system ($\epsilon = \epsilon_0$), $R_{MC}(\epsilon - \epsilon_K)$ has a nearly constant value for small variations in $\epsilon$ around $\epsilon = \epsilon_0$, and no harm is done by having it in the denominator. An exemplary DDL correlation function $\Delta R_{DLL}(\epsilon)$ according to the present invention is shown in graph 501 of FIG. 5 (solid line), and an exemplary correlation function $R_{MC}(\epsilon - \epsilon_K)$ from main correlator 35 according to the present invention is shown in graph 502 of FIG. 5 (solid line). As an advantage, the above form normalizes Ed to the signal strength M of the satellite baseband signal since M is canceled out of dI(*) with the division of I(*). Thus the waveform of signal Ed may be made relatively independent of M for a wide range of input signal strengths. While this normalization is advantageous, it is not essential for practicing the general embodiments of the present invention. It may be appreciated that other normalization approaches may be used.

Once being generated, signal Ed is filtered by a conventional control loop filter 31 to set the response characteristics of the DLL system. The filtered signal Ed is provided to generator 25. Generator 25 advances the generation of S(t) in time when Ed is positive, retards the generation of S(t) in time when Ed is negative, and maintains the generation of S(t) at its current frequency and phase when Ed is zero. The other PR-codes $S_K(t-\epsilon_K)$ and $S_2(t-\epsilon_S)$ are adjusted in step with S(t), being advanced or retarded by the same amount, and thus solidly track the phase of S(t). Because signal S(t) is provided back to the DLL correlator 22, which helps to generate Ed, a negative feedback loop is formed by components 22, 28, 31, and 25. As is well known in the feedback control art, the various components of a control loop may contain signal inversions which would reverse the action of the control signal Ed. So, for example, with the inclusion of appropriate signal inversions, generator 25 may retard the generation of S(t) when Ed is negative rather than positive, and may advance the generation of S(t) when Ed is positive rather than negative. The choice of the sign orientation of Ed with respect to the advance/retard operation of generator 25 is matter of design choice and is not critical to the practicing of the present invention. However, a change in the sign orientation of Ed with respect to the advance/retard operation of generator 25 should be compensated by a change in the sign at another place in the feedback loop (e.g., in the loop filter) to ensure that the loop is a negative feedback loop rather than a positive feedback loop.

Generator 25 may be implemented as a memory device which holds the values of each signal S(t), $S_K(t-\epsilon_K)$ and $S_2(t-\epsilon_S)$ at quantized periods of time during the C/A-code sequence, along with a controller which reads out the signal values of the quantized periods in the sequence orders, and an adjustable clocking means which governs when and how fast the controller reads values from the memory. The adjustable clocking means is responsive to the DLL control signal Ed in determining the clocking rate. While powered, the controller continually repeats back to the beginnings of the signal sequences when the ends are reached. Moreover, the signal sequences are synchronized to start at substantially the same time (usually within a chip duration $\Delta$).

The tracking response characteristics of the DLL system are set by the transfer characteristics of components 22, 28, 31, and 25. The accumulation period $T_A$ of correlator 22 sets the digitization rate of the DLL loop to frequency $F_A$; as such, the transfer characteristic of correlator 22 does not introduce a pole (e.g., integrator) or a zero (e.g., differentiator) into the overall transfer characteristic of the DLL loop. DLL discriminator 28 generally involves a normalization process and does not generally have a frequency dependent transfer characteristic. Reference generator 25 may have a frequency dependent characteristic. Typically, the phase of the output code signal(s) of a reference code generator will be proportional to the integral of the input control signal. Such is well known to the art, and is used in preferred embodiments of the present invention. DLL filter 31 is usually constructed to have a frequency dependent transfer characteristic. As is typically done in the loop control art, the loop filter comprises a lead-lag filter and the reference code generator is constructed to generate the phase of its reference codes in relation to the integral of the input to the code generator. The filter has one integrator (along with a non-integrating path) and the reference generator has one integrator, which provides the feedback loop with two integrators (so-called second order loop of servo system). This conventional approach is used in preferred embodiments of the present invention, and does not form part of the present invention. Moreover, the construction of filter 31 is well within the skill of ordinary practitioners of the art and need not be described in detail herein.

Each of the components 22, 28, 31, and 25 of the DLL system may be implemented by discrete digital circuits or by a digital signal processor (DSP) which is programmed to implement the operations of these components. The basic knowledge for programming DSP processors to perform the signal processing tasks of these components is well within the ordinary skill of the art.

In the PLL system, PLL correlator 23 correlates the quadrature component 21 of the satellite baseband signals with the reference PR-code signal $S_2(t-\epsilon_S)$ on line 36 and generates a correlation control signal dQ(*) at its output 26.

Reference code $S_2(t-\epsilon_S)$ is a pulsed version or strobed version of the PR-code being tracked. The correlation process filters out the effects of the baseband signals from the undesired satellites, and dQ(*) has the general form of:

$$dQ(t_K,\epsilon,\phi_P) = M \times A_K(t) \times \Delta R_{PLL}(\epsilon-\epsilon_S) \times \sin(\phi_P)$$

where $\Delta R_{PLL}(\epsilon-\epsilon_S)$ is the correlation function between the PR-code of the desired satellite and the reference PR-code signal $S_2(t-\epsilon_S)$, as a function of the time offset $\epsilon$. (The use of the "Δ" symbol in $\Delta R_{PLL}$ does not represent the chip duration Δ, but rather indicates that a pulsed or strobed reference code has been used to generate $\Delta R_{PLL}$.) The term $\sin(\phi_P)$ arises from the phase difference between the I-F broadcast carrier and the reference carrier signal 16. When the term $\sin(\phi_P)$ is at zero, the internal I-F carrier is synchronized to the satellite carrier, and the phase of $\phi_1$ of the internal I-F carrier with respect to the internal time clock of the geographic computation engine provides additional timing information which enables a more precise computation of the receiver's position. The PLL monitors the term $\sin(\phi_P)$ in $dQ(t_K,\epsilon,\phi_P)$ and provides a control signal Ep to reference carrier generator 17 which causes the generator to shift the phase of the internal I-F carrier such that $\phi_P$ is driven to zero. (As previously indicated, in some cases the broadcast signal does not include A(t), in which case one may set A(t)=1 in the above equation.)

To be of best use, the modulation effects of A(t) should be removed from $dQ(t_K,\epsilon,\phi_P)$, if the signal A(t) is present in the satellite broadcast signal, and the correlation function $\Delta R_{PLL}(\epsilon-\epsilon_S)$ should be reasonably close to its maximum value when the DLL system has synchronized the PR-codes at the point of steady balance ($\epsilon=\epsilon_0$). An exemplary PLL correlation function $\Delta R_{DLL}(\epsilon)$ according to the present invention is shown in a graph 503 of FIG. 5 (solid line). The waveform shown in graph 503 is also the form of the correlation signal dQ(*) as a function of the time shift $\epsilon$: $dQ(\epsilon)$. The removal of the modulation effects of A(t), if present, is performed by PLL discriminator 37, which receives the correlated signal $dQ(t_K,\epsilon,\phi_P)$ as an input and generates the control signal Ep as an output. Discriminator 37 may be implemented in several ways. For example, discriminator 37 can simply multiply or divide $dQ(t_K,\epsilon,\phi_P)$ by either −1 or +1, depending upon the current sign of A(t) (as provided by $I(t_K,\epsilon,\phi_P)$ at the output of main correlator 35). As another example, discriminator 37 can generate Ep according to the following mathematical form:

$$Ep = \frac{dQ(t_K,\varepsilon,\varphi_P)}{I(t_K,\varepsilon,\varphi_P)} = \frac{M \times A_K(t) \times \Delta R_{PLL}(\varepsilon-\varepsilon_S) \times \sin(\varphi_P)}{M \times A_K(t) \times R_{MC}(\varepsilon-\varepsilon_K) \times \cos(\varphi_P)}$$

$$= \frac{\Delta R_{PLL}(\varepsilon-\varepsilon_S)}{R_{MC}(\varepsilon-\varepsilon_K)} \times \tan(\varphi_P)$$

This removes the dependencies on M and A(t), but maintains the dependence upon $\phi_P$. It also introduces $R_{MC}(\epsilon-\epsilon_K)$ in the denominator, but this is not a problem when the PR-codes are synchronized at $\epsilon=\epsilon_0$, or even with $\epsilon$ within ½ chip of $\epsilon_0$. In preferred embodiments of the present invention, discriminator 37 generates Ep according to the following mathematical form:

$$Ep = \tan^{-1}\left[K_N \times \frac{dQ(t_K,\varepsilon,\varphi_P)}{I(t_K,\varepsilon,\varphi_P)}\right]$$

$$= \tan^{-1}\left[K_N \times \frac{\Delta R_{PLL}(\varepsilon-\varepsilon_S)}{R_{MC}(\varepsilon-\varepsilon_K)} \times \tan(\varphi_P)\right]$$

where $\tan^{-1}[*]$ is the inverse tangent function (also called arc tan(*)), and where $K_N$ is a normalization factor which is substantially equal to $R_{MC}(\epsilon_0-\epsilon_K)/\Delta R_{PLL}(\epsilon_0-\epsilon_S)$. $K_N$ accounts for the relative difference between the maximum values of the correlation functions $R_{MC}$ and $\Delta R_{PLL}$ as measured at the point $\epsilon_0$ of steady balance. At synchronization of the PR-codes in the DLL system ($\epsilon=\epsilon_0$), the multiplication of the ratio $\Delta R_{PLL}(*)/R_{MC}(*)$ by $K_N$ produces a value of 1. Thus, the above mathematical form can be simplified as follows during synchronization and near synchronization conditions of the PR-codes by the DLL system:

$$Ep = \tan^{-1}\left[K_N \times \frac{dQ(t_K,\varepsilon,\varphi_P)}{I(t_K,\varepsilon,\varphi_P)}\right] \approx \varphi_P$$

This second form for Ep has the advantage that the value of Ep is well behaved for $45° < |\phi_P| < 90°$.

All of the exemplary forms of Ep are functions of $\phi_P$. As previously described above, a positive value of $\phi_P$ indicates that reference carrier 16 is ahead of the I-F carrier $\Omega_{S1}$ of the broadcast signal, and therefore needs to be retarded. A negative value of $\phi_P$ indicates that the reference carrier 16 is behind the I-F carrier $\Omega_{S1}$ of the broadcast signal and therefore needs to be advanced. Therefore, control signal Ep contains information as to how the carrier signal 16 is to be adjusted to achieve carrier lock.

Once being generated, signal Ep is filtered by a conventional control loop filter 19 to set the response characteristics of the PLL system. The filtered Ep signal is then provided to the internal I-F reference carrier generator 17, which may comprise a voltage controlled oscillator, numerically controlled oscillator, or equivalents thereof, as is known in the art. When Ep is substantially zero, which indicates carrier lock, generator 17 maintains the current phase and frequency of carrier signal 16. When Ep is negative, which indicates that reference carrier signal 16 is lagging behind the I-F broadcast carrier, generator 17 advances the generation of carrier signal 16 in time. When Ep is positive, which indicates that reference carrier signal is ahead of the I-F broadcast carrier, generator 17 retards the generation of carrier signal 16 in time. These changes propagate through PLL correlator 23, discriminator 37, and PLL filter 19 to bring future values of Ep to substantially zero.

In preferred embodiments of the present invention, carrier generator 17 comprises a conventional numerically controlled oscillator which provides quadrature outputs. Such an oscillator generally comprises a table of N values corresponding to one cycle of a Sine wave and a table of N values corresponding to one cycle of a Cosine wave, each of which are addressed by an index register to provide the current values of the quadrature outputs. N is generally large, typically being greater than 2,000. The index register is periodically incremented by a increment value ΔF at a frequency which is much greater than the highest expected output frequency of the oscillator. The increment value ΔF directly controls the output frequency of the oscillator. Typically, the increment value ΔF is computed as the integral of the input control signal, which is typically a phase error signal. If the oscillator need only provide outputs in one bit or two bits of resolution, the wave tables may be replaced by computational formulas, as is well known to the art, or by simple programmable counters.

Because carrier signal 16 is provided back to the PLL correlator 23, which helps to generate Ep, a negative feedback loop is formed by components 23, 37, 19, and 17. As is well known in the feedback control art, the various components of a control loop may contain signal inversions which would reverse the action of the control signal Ep. So, for example, with the inclusion of appropriate signal inversions, generator 17 may retard the generation of signal 16 when Ep is negative rather than positive, and may advance the generation of signal 16 when Ep is positive rather than negative. An example of such a signal inversion would be to multiply the above exemplary forms for Ep by −1. The choice of the sign orientation of Ep with respect to the advance/retard operation of generator 17 is matter of design choice and is not critical to the practicing of the present invention. However, a change in the sign orientation of Ep with respect to the advance/retard operation of generator 17 should be compensated by a change in the sign at another place in the feedback loop (e.g., in the loop filter) to ensure that the loop is a negative feedback loop rather than a positive feedback loop.

The tracking response characteristics of the PLL system are set by the transfer characteristics of components 23, 37, 19, and 17. The accumulation period $T_A$ of correlator 23 sets the digitization rate of the PLL loop to frequency $F_A$; as such, the transfer characteristic of correlator 23 does not introduce a pole (e.g., integrator) or a zero (e.g., differentiator) into the overall transfer characteristic of the DLL loop. As indicated above, PLL discriminator 37 generally comprises the computation of ratios and functions, and therefore does not generally have a frequency dependent transfer characteristic. Carrier reference generator 17 typically has a frequency dependent characteristic. As indicated above, generator 17 preferably comprises a numerically controlled oscillator which integrates the input control signal to form the frequency increment value $\Delta F$. This construction is typical in the phase-look loop art, and causes the phase of the generator's output signals to be related to the integral of the control input signal. PLL filter 19 is usually constructed to have a frequency dependent transfer characteristic. As is typically in the PLL control art, the PLL loop filter comprises a lead-lag filter when the reference carrier generator integrates its input control signal to form the frequency increment value. Such a lead-lag filter may be constructed by processing the signal through two parallel paths which are combined to provide the output of the filter. The first path multiplies the signal by a gain value and integrates the signal. The second path multiplies the signal by a second gain factor and has no integration (so called "inertia free" path). This conventional approach is used in preferred embodiments of the present invention, and does not form part of the present invention. Moreover, the filter construction is well within the skill of ordinary practitioners of the art and need not be described in detail herein.

Each of the components 23, 37, 19, and 17 of the PLL system work with signals which are in digital form, and may be implemented by discrete digital circuits or by a digital signal processor (DSP) which is programmed to implement the operations of these components. The basic knowledge for programming DSP processors to perform the signal processing tasks of these components is well within the ordinary skill of the art.

Multipath Reduction

Having thus described the general operation of the receiver channel shown in FIG. 1, we now focus on the features of the receiver channel which reduce the effects of multipath signals. A first feature is a novel form of the correlation function $\Delta R_{DLL}(\epsilon)$ for the DLL correlator, which is shown in the solid curve of graph 501 of FIG. 5. This novel form is mirrored by the correlation signal $dI(\epsilon)$ generated by DLL correlator 22 as a function of time shift $\epsilon$. (For the purposes of discussion, it will be assumed that A(t) is not present, or that it is removed by appropriate means from the correlation signals if it is present.) $\Delta R_{DLL}(\epsilon)$ and $dI(\epsilon)$ are substantially zero at the point $\epsilon_0$ of steady balance, as shown in graph 501. As the DLL reference code lags from is position at the point $\epsilon_0$ of steady balance ($\epsilon > \epsilon_0$), $\Delta R_{DLL}(\epsilon)$ and $dI(\epsilon)$ quickly rise in magnitude to a high peak value $dI_L$ of one polarity (e.g., positive), and continue to have that high peak value (or more) for a length $L_L$ of time shift $\epsilon$ which is preferably on the order of one chip duration $\Delta$ (i.e., preferably in the range of $\epsilon = \epsilon_0$ to approximately $\epsilon = \epsilon_0 + \Delta$). Because correlation signal $dI(\epsilon)$ can have more than one peak in the lagging direction from the point $\epsilon_0$ of steady balance, we define the point at which $dI_L$ is defined to be the point at which the slope of the curve of $dI(\epsilon)$ (and $\Delta R_{DLL}(\epsilon)$) shown in graph 501 first reaches zero as the time shift value $\epsilon$ moves in the lagging direction from point $\epsilon_0$. As is known in the art, the slope of the curve shown in graph 501 is the rate of change of $dI(\epsilon)$ (and $\Delta R_{DLL}(\epsilon)$) with respect to a change in the time shift value $\epsilon$. We formally define the length $L_L$ as the range of time shift values $\epsilon$ in the lagging direction from point $\epsilon_0$ where the values of the correlation signal dI have the same polarity as that of the peak $dI_L$ and whose magnitudes are at least 5% of the magnitude of $dI_L$.

As the DLL reference code leads from is position at the point $\epsilon_0$ of steady balance ($\epsilon < \epsilon_0$), $\Delta R_{DLL}(\epsilon)$ and $dI(\epsilon)$ quickly fall in magnitude to a relatively low peak value $dI_E$ which has a polarity opposite (e.g., negative) to the previous polarity, and then returns to a value of zero within a relatively short length $L_E$ of time shift $\epsilon$. We define the point at which $dI_E$ is defined to be the point at which the slope of the curve of $dI(\epsilon)$ (and $\Delta R_{DLL}(\epsilon)$) shown in graph 501 first reaches zero as the time shift value $\epsilon$ moves in the leading direction from point $\epsilon_0$. The distance between the two points of zero slope which define the locations for $dI_L$ and $dI_E$ is the transition distance for signal $dI(\epsilon)$ to change from $dI_L$ and $dI_E$. We formally define the length $L_E$ as the range of time shift values $\epsilon$ in the leading direction from point $\epsilon_0$ where the values of the correlation signal dI have the same polarity as that of the peak $dI_E$ and whose magnitudes are at least 5% of the magnitude of $dI_E$. Length $L_E$ is preferably on the order of a few front durations F, such as between F and 4*F. As shown in graph 401 of FIG. 4, the front duration F is the time period in which the input PR-code signal, as presented to the correlators, changes value between chip boundaries (e.g., either from +1 to −1, or from −1 to +1). Referring back to FIG. 5, length $L_L$ is preferably as long as possible (without affecting $L_E$), usually at a value of around a chip duration $\Delta$, and preferably at least $\frac{1}{3}\Delta$ to $\frac{1}{2}\Delta$. The ratio of $dI_L$ to $dI_E$ is preferably between 2:1 and 8:1, and more typically between 3:1 and 6:1. With this form, $\Delta R_{DLL}(\epsilon)$ and $dI(\epsilon)$ are asymmetrical about the point $\epsilon_0$ of steady balance and about all other points in the domain of $\epsilon$. There is no even-symmetry or odd-symmetry in $\Delta R_{DLL}(\epsilon)$ about point $\epsilon_0$ or any other point.

$\Delta R_{DLL}(\epsilon)$ and $dI(\epsilon)$ may be generated in a number of ways. As a first way, the asymmetric stobe signal $S(t) = S_{P2}(t)$ shown at graph 402 in FIG. 4 generates the structure. Reference code $S_{P2}(t)$ comprising a repeating sequence of strobes spaced from one another in time by the chip duration $\Delta$. Each strobe corresponds to a chip in the PR-code of the input signal (graph 401) and has a duration D less than the chip duration $\Delta$. Each strobe comprises a first pulse $P_1$ of a first value $S_1$ and first duration $D_1$ and a second pulse $P_2$ of a second value $S_2$ and second duration $D_2$. $S_1$ and $S_2$ have different polarities, and may have the same or different values. Durations $D_1$ and $D_2$ may be the same or different. The square area (or square) of the first pulse $P_1$ is $A_1=D_1*S_1$, and the square area of the second pulse $P_2$ is $A_2D_2*S_2$, with both square areas representing time-integrated magnitudes of the pulses. (A time-integrated magnitude is the integral of the pulse's absolute value during the pulse's time duration.) As a novel feature of the present invention, the square areas $A_1$ and $A_2$ are substantially different from one another (e.g., by at least a factor of 2, preferably 2–10 times different, and more preferably between 2 to 4 times different, or between 4 to 8 times different). For generating the correlation signal shown in graph 501 of FIG. 5, area $A_1$ is preferably greater than area $A_2$ by a factor of approximately 2 ($A_1=2*A_2$) with $S_1=S_2$. (With this configuration, and with F around 57 ns, the pulses shown in FIG. 4 are close to their positions at DLL lock, which is $\epsilon=E$ 0.) Thus, the time integrated value of the two pulses is non-zero, and is related to the difference between the areas. The polarity of each strobe's first pulses $P_1$ is the same as the polarity of the corresponding chip in the PR-code (Of course, it may instead be the opposite polarity from that of the input PR-code chip, in which case the reference code generated is $-S_{P2}(t)$, and $-\Delta R_{DLL}(\epsilon)$ and $-dI(\epsilon)$ are generated). To achieve a difference of at least a factor of 2 in the integrated magnitudes of pulses $P_1$ and $P_2$, one can make their values $S_1$ and $S_2$ the same, but make the pulse duration $D_1$ at least twice as long as duration $D_2$; one can also make their durations $D_1$ and $D_2$ the same, but make the magnitude of value $S_1$ be at least twice the magnitude of value $S_2$.

In the illustrated example, pulse $P_1$ slightly leads the PR-code chip to which it is to be synchronized to (meaning that its left most edge occurs at an earlier time than the left edge of corresponding chip.) However, it is not necessary for pulse $P_1$ to lead the chip to which it is to be synchronized to.

It may be appreciated that the same result of correlating the strobe signal $S_{P2}(t)$ with the input signal may be equivalently achieved by the steps of correlating a sequence of the first pulses $P_1$ with the input signal in a first correlator, correlating a sequence of the second pulses $P_2$ with the input signal in a second correlator, and then adding the outputs of these two correlators together. The use of two correlators in this manner is an equivalent.

If the receiver channel receives both the direct signal from the satellite and another signal reflected from the ground or a local object, a multipath error ($E_{MP}$) can occur which will disturb the location of the point $\epsilon_0$ of steady balance. The benefit of the asymmetric $\Delta R_{DLL}(\epsilon)$ and $dI(\epsilon)$ for reducing and preventing such multipath errors is now explained. Referring to graph 401 of FIG. 4, a multipath signal of the directly-received signal is shown by a dashed curve. The multipath signal has the same general shape as the directly received signal (shown by solid curve) but is delayed by a delay $\delta$ (and therefore lags the direct signal) and has a smaller amplitude. The multipath signal is always received after the direct signal, and therefore always lags the direction signal ($\delta$ is therefore never negative). Thus, the multipath signal is a delay and reduced-scaled version of the directly receive signal. Referring now to FIG. 5, the effect of the multipath signal on the correlation process is shown by a dashed lines in graphs 501–503 that are identified as "Multipath Disturbance." Because the correlation process is linear process, the multipath signal will caused a delayed and reduced-scaled version of the correlation signal to be generated and added to the response generated by the directly received signal. As can be seen in each of graphs 501–503, which show respective correlation signals $dI(*)$, $I(*)$, and $dQ(*)$, each multipath disturbance (dashed curve) is substantially a scaled and delayed replica of the normal response caused by the directly-received signal (solid curve). When the multipath signal is present, the multipath disturbance curve is added to the regular response curve to produce the actual correlation signal. As the DLL control signal $Ed(*)$ is based on correlation signal $dI(*)$ and the point $\epsilon_0$ of steady balance established by $dI(*)$, disruption of $dI(*)$ at the point $\epsilon_0$ will cause the DLL to lock at a time shift $\epsilon$ which is not the intended point $\epsilon_0$, and a timing error will occur. Referring to graph 501, one can see by visual inspection that the multipath disturbance curve will not displace the point $\epsilon_0$ of steady balance if the multipath delay $\delta$ is greater than the length $L_E$ of the leading portion of $\Delta R_{DLL}(\epsilon)$ and $dI(\epsilon)$ ($\delta > L_E$). Under these conditions, the appearance of the reflected signal doesn't displace the point of steady balance, and so it doesn't cause a multipath error. When $\delta < L_E$, the multipath error appears, and its value depends upon $\delta$. It is evident that the multipath error would be absent when $\delta=0$ because the two curves would be lined up. When $\delta$ increases from a value of $\delta=0$, the magnitude of the multipath error $E_{MP}$ rises up to the maximum value of $E_{MP,MAX}$ at a point $\delta=\delta_{MAX}$, which is referred to herein as the most dangerous lag $\delta_{MAX}$. Then, as the lag delay $\delta$ moves from $\delta_{MAX}$ to $L_E$ the multipath error $E_{MP}$ decreases from $E_{MP,MAX}$ to zero.

The values of the strobe parameters (D, $D_1$, $S_1$, $D_2$, and $S_2$) and the duration F of the chip front collectively influence the shape of $\Delta R_{DLL}(\epsilon)$ and $dI(\epsilon)$, including the position of $\epsilon_0$ and the values of $dI_L$, $dI_E$, $L_L$, $L_E$, and the slope of the transition regions from $dI_L$ to $dI_E$, and from $dI_E$ back to zero. Usually, the magnitudes $\epsilon_0$ and $L_E$ are made close by values to the PR-code front (F) for this embodiment. Also it is best to provide the ratio $dI_E/dI_L<<1$. The maximum multipath error $E_{MP,MAX}$ can be reduced by reducing the magnitude of $dI_E$, and by increasing the slope of the transition region from $dI_L$ to $dI_E$, which passed through $\epsilon_0$. And the range of $\delta$ which will cause multipath errors can be reduced by reducing $L_E$. The magnitudes of $E_{MP,MAX}$ and $L_E$ are among the most important indexes which are to be reduced by choosing the parameters of the reference code $S_{P2}(t)$ (i.e. the magnitudes D, $D_1$, $D_2$, $S_1$, $S_2$). The other indexes, which also should be taken into account are the noise error, the tracking validity, the tracking band and so on, often lead to the conflicting demands to the parameters of $S_{P2}(t)$. Therefore, it is best to find a compromise taking into account the real conditions of the receiver operation and those actions that can be employed for the improvement of said other indexes. Resolution of the conflicting demands will often depend on the price and quantity of the receiver that is being constructed, and the applications for such receivers. Exemplary starting parameters are provided in TABLE I.

TABLE I

| | |
|---|---|
| D | in the range of front F to 1.5*F, |
| Ratio of $A_1/A_2 = (D_1*S_1)/(D_2*S_2)$ | in the range of 3 to 4, |
| Ratio of $D_1/D_2$ | in the range of 1.5 to 3, |
| Initial value of $\epsilon_K$ | 0 ns (and then adjusted as described above after an initial point $\epsilon_0$ has been found using the starting values for the other parameters). |

The front duration F and the shape of the front are determined by the filtering and frequency down-conversion at the front end of the receiver (usually analog circuits), and by the digitization frequency and resolution of the ADC 13. The duration and shape of the front can be readily measured, and these measurements may by input into a computer simulation model of the receiver which will simulate the correlation precesses and generate model responses for dI(*), dQ(*), and I(*). The parameters may then be varied and the resulting responses generated to guide one of ordinary skill in the art to an appropriate selection of parameter values depending upon his desired goals for the receiver (which can vary depending upon the application, price, and quality of the receiver to be constructed). This may be done without undue experimentation using a constructed receiver and a test signal which emulates the satellite broadcast signal applied to the receiver's antenna. The parameters may be set, and a small bias may be added to control signal Ed(*) to cause it to sweep through a range of time shift $\epsilon$. During the sweep, the correlation signals may be plotted as a function of $\epsilon$. The parameters may then be changed to find a desired result. Additionally, it is well within the skill of one or ordinary skill in the GPS/GLN art to construct a computer simulation model of the correlation process using the reference code $S_{P2}(t)$ along with the measured characteristics of the input signal and its front shape, and the variational differences in the correlation signal caused by changes in the parameters may be readily plotted and compared by computer.

The values of the parameters strongly depend upon the front-end analog and ADC components, and thus a parameter selection using one set of analog and ADC components may not be suitable for another set. Nonetheless, for a broad range of such component sets, parameter D may vary in the range of 0.5*F to 4*F, the ratio of $A_1/A_2=(D_1*S_1)/(D_2*S_2)$ may vary in the range of 1.5 to 10, and the ratio of $D_1/D_2$ may vary in the range of 1 to 6.

Referring to graph 502 of FIG. 5, the main correlation signal $I(\epsilon)$ is shown. As previously described with reference to FIG. 1, signal $I(\epsilon)$ is provided to the DLL discriminator 28, and is preferably used in normalizing $dI(\epsilon)$ to produce the DLL control signal $Ed(\epsilon)$. The normalization is usually done by dividing correlation signal $dI(\epsilon)$ by $I(\epsilon)$ to generate $Ed(\epsilon)$ as follows:

$$Ed(\epsilon)=dI(\epsilon)/I(\epsilon)$$

(Other forms for generating $E_d$ are possible.) The normalization in the present case doesn't change the location of the point of steady balance of the DLL and its purpose is to eliminate the information signal $A(t)$ and to removal of influences that changes in the input signal level would have on the gain within the DLL feedback loop.

In the operation area of the DLL around the point of steady balance, control signal $Ed(\epsilon)$ does not differ much from correlation signal $dI(\epsilon)$ (except by scaling constant) because the signal $I(\epsilon)$ changes little in this region (graph 502 of FIG. 5). It is useful while forming of the reference replica of the PR-code $S_K(t-\epsilon_K)$ (graph 404 of FIG. 4), which is used to generate $I(\epsilon)$, to offset the sequence start of $S_K(t-\epsilon_K)$ from the sequence start of $S_{P2}(t)$ by a time offset $\epsilon_K$, as shown in graph 502 of FIG. 5. The offset $\epsilon_K$ moves the correlation signal $I(\epsilon)$ in the leading direction to cause its maximum value to shift from $\epsilon=0$ to $\epsilon=\epsilon_0$, which provides the maximum value for $I(\epsilon)$ in the point $\epsilon_0$ of steady balance so that the percentage change in the magnitude of $I(\epsilon)$ is minimized in the neighborhood around $\epsilon_0$. It is also useful to set the value of control signal Ed to zero when the magnitude of $I(\epsilon)$ falls below a threshold value P (graph 502 of FIG. 5). This may be readily performed by DLL discriminator 28 shown in FIG. 1. As another approach, the value of $I(\epsilon)$ may be truncated to the threshold P if it falls below P. This may also be performed by DLL discriminator 28 (dI=Max[dI, P], where the function Max[*] takes maximum of dI or P). The threshold P is chosen according to the minimum allowable level of the input signal power.

The initial delay of the DLL reference code $S(t)=S_{P2}(t)$ is set by search system 32, as described above. Conventional search systems are capable of placing the time shift $\epsilon$ relatively close to the point $\epsilon_0$ usually within $\pm\frac{1}{3}\Delta$, which corresponds to $\pm 300$ ns for a GPS C/A-code. In order to provide the safe lock, it is best to add a positive time offset $\epsilon_P$ of approximately $\frac{1}{3}\Delta$ to $\frac{1}{2}\Delta$ to the initial estimate $\epsilon$. that search system 32 provides for $\epsilon_0$. In preferred embodiments of the present invention, time shift $\epsilon$ is initially set to a value of $(\epsilon_{INT}+\epsilon_P)$ prior to commencing tracking operations. Presuming that $\epsilon_{INT}$ happens to be at $\epsilon_0$, then the initial starting point is shown at $\epsilon_P$ in graph 501. If the initial estimate $\epsilon_{INT}$ is off by $\pm\frac{1}{3}\Delta$, the initial point will still fall in a location where $dI(\epsilon)$ has a large positive value, as can be seen by the graph, and the tracking operation will bring the time shift $\epsilon$ to $\epsilon_0$ through the adjustment action of the DLL. The setting of the initial value for time shift $\epsilon$ in this manner enables the DLL to properly lock even with relatively large errors in the initial estimate $\epsilon_{INT}$ provided by a conventional search system 32.

PLL System

Another novel feature of the present invention is the asymmetric positioning of the correlation function $\Delta R_{PLL}(\epsilon)$ and corresponding correlation signal $dQ(\epsilon)$ around the point $\epsilon_0$ of steady balance for the PLL correlator. $\Delta R_{PLL}(\epsilon)$ and $dQ(\epsilon)$ are shown in the solid curve of graph 503 of FIG. 5, along with a multipath disturbance signal shown by the dashed curve. $\Delta R_{PLL}(\epsilon)$ and $dQ(\epsilon)$ have a peak value of $dQ_{MAX}$, which preferably extends over a broad range of the domain of $\epsilon$, on the order of a chip duration $\Delta$. We define the point at which $dQ_{MAX}$ is defined to be the point at which the slope of the curve of $dQ(\epsilon)$ (and $\Delta R_{PLL}(\epsilon)$) shown in graph 503 first reaches zero as the time shift value $\epsilon$ moves in the lagging direction from point $\epsilon_0$. (The slope of the curve is the rate of change of $dQ(\epsilon)$ with respect to a change in the time shift value $\epsilon$.) On either side of this broad range, $\Delta R_{PLL}(\epsilon)$ and $dQ(\epsilon)$ have transition regions, or sloping regions, where their values transitions from $dQ_{MAX}$ to substantially zero. The width of these transitions regions is represented by $\epsilon_{TR}$, which is shown for the left transition region. The left transition region is in the leading direction with respect to the right transition region. In preferred embodiments, $\Delta R_{PLL}(\epsilon)$ and $dQ(\epsilon)$ are generated such that the point $\epsilon_0$ of steady balance is located in the leftmost (leading) transition region of $\Delta R_{PLL}(\epsilon)$ and $dQ(\epsilon)$, and such that value $dQ_0$ of these signals at the point $\epsilon_0$ of steady balance is near $dQ_{MAX}$, preferably being 70% to 90% of $dQ_{MAX}$ (in other words: $\Delta R_{PLL}(\epsilon_0)=dQ_0$ and $dQ(\epsilon_0)=dQ_0$ with $dQ_0$ near $dQ_{MAX}$). Moreover, the values of $\Delta R_{PLL}(\epsilon)$ and $dQ(\epsilon)$ do not change much as the time shift $\epsilon$ moves in the lagging direction away from the point $\epsilon_0$ of steady balance ($\epsilon$ moves in the lagging direction when the reference code lags). On the other hand, when the time shift $\epsilon$ moves in the leading direction away from the point $\epsilon_0$ of steady balance, the values of $\Delta R_{PLL}(\epsilon)$ and $dQ(\epsilon)$ rapidly fall down to near zero (corresponding to when $\epsilon$ advances through the interval $\epsilon_D$ shown in graph 503 of FIG. 5).

Thus, when at the point $\epsilon_0$ of steady balance, the magnitude of dQ decreases from the magnitude of $dQ_0$ by a first incremental amount when the time shift $\epsilon$ is advanced by a given small amount (e.g., $0.1\Delta$), and changes by a second incremental amount when the time shift $\epsilon$ is retarded from point $\epsilon_0$ by the same given amount (e.g., $0.1\Delta$), with the first incremental change in dQ being larger than the second incremental change in dQ. In preferred embodiments, the magnitude of dQ decreases from $dQ_0$ to less than 10% of the magnitude of $dQ_{MAX}$ when the time shift $\epsilon$ is advanced from point E g by an amount of not more than five front durations F (5F), and preferably by an amount 3F, and more preferably by an amount of F. As indicated above, the second correlation signal varies with the sine of the phase difference $\sin(\phi_P)$, and therefore the above values are given assuming a constant, non-zero value for $\sin(\phi_P)$. The value of $\sin(\phi_P)$ is at a maximum magnitude (either +1 or −1) when the phase $\phi_P$ is at value of $(K+\frac{1}{2})\pi$ for any integer K, and this value of phase may be used for the purposes of definition.

The above features in the correlation signal dQ may be readily achieved by using the pulsed reference code $S_2(t-\epsilon_S)$ shown at graph 403 in FIG. 4 to generate $\Delta R_{PLL}(\epsilon)$ and $dQ(\epsilon)$. $S_2(*)$ comprises a pulsed version of the PR-code being tracked by the channel, having pulses of duration "d", each of which is less than the chip duration $\Delta$ (d <$\Delta$). $S_2(*)$ has a pulse corresponding to each chip of the input PR-code being tracked, each pulse being spaced from an adjacent pulse by the chip duration $\Delta$, and each pulse having a polarity which follows the polarity of its corresponding chip in the input PR-code. (Of course, one may selected the pulses to have the opposite polarity, in which case $-S_2(*)$ is generated, which is an equivalent for the purpose of generating Ep since a sign inversion may be readily added to the PLL loop.) The generation of $S_2(*)$ is synchronized with the generation of the DLL reference code $S(t)=S_{P2}(t)$, being advanced and retarded by equal amounts by generator 25. However, the sequence start of $S_2(*)$ is preferably offset from the sequence start of the DLL reference code $S(t)=S_{P2}(t)$ by a time offset $\epsilon_S$ (graph 403 of FIG. 4), which is preferably constant, for the reasons provided below.

The above-described positioning of point $\epsilon_0$ in the left transition region of $\Delta R_{PLL}(\epsilon)$ and $dQ(\epsilon)$ (graph 503 of FIG. 5) can be readily achieved by the selection of the time offset $\epsilon_P$ value, as shown in graph 403. As previously indicated, the time offset $\epsilon_S$ is the different in the start sequence of $S(t)=S_{P2}(t)$ (graph 402) and the start sequence of $S_2(*)$ (graph 403), and may be measured between any strobe of $S(t)=S_{P2}(t)$ and the corresponding pulse of $S_2(t)$. The value of $\epsilon_S$ is dependent upon the form of strobes in $S(t)=S_{P2}(t)$ and pulses in $S_2(t)$, with $S(t)=S_{P2}(t)$ setting the point $\epsilon_0$ of steady balance and $S_2(t)$ setting the shape of $\Delta R_{PLL}(\epsilon)$ and $dQ(\epsilon)$ signals by the width and amplitude of its pulses. Having chosen the strobe shapes of $S(t)=S_{P2}(t)$ and $S_2(t)$, the value of $\epsilon_S$ may then be adjusted to provide the desired position of point $\epsilon_0$ in the left transition region of $\Delta R_{PLL}(\epsilon)$ and $dQ(\epsilon)$. The curve of $\Delta R_{PLL}(\epsilon)$ and $dQ(\epsilon)$ is shifted in the leading direction (to the left in FIG. 5) when $\epsilon_S$ increases from zero to a positive value, and is shifted in the lagging direction when $\epsilon_S$ decreases from zero to a negative value. The selection of $\epsilon_S$ to obtain a desired position may be readily done experimentally on a constructed receiver by one of ordinary skill in the art. Also, the value of $\epsilon_S$ may be fitted with the aid of a computer simulation of the receiver channel. The construction of such computer simulations in common practice in the GPS/GLN art, and is therefore within the ordinary skill of the art.

As indicated previously, the discriminator 37 of the PLL system (FIG. 1) preferably generates control signal Ep(*) in the form:

$$Ep(\varepsilon, \varphi_p) = \tan^{-1}\left(\frac{dQ(\varepsilon, \varphi_p)}{I(\varepsilon, \varphi_p)}\right) \text{ or:}$$

$$Ep(\varepsilon, \varphi_p) = \tan^{-1}\left[K_N \times \frac{dQ(\varepsilon, \varphi_p)}{I(\varepsilon, \varphi_p)}\right] \approx \varphi_p$$

where $\tan^{-1}$ is the inverse tangent function and where $K_N$ has been previously defined. In the tracking mode, the PLL is set in a point where $E_p(\phi_P)=0$ and follows the phase changes of the input carrier in limits $+\pi/2$.

If the receiver channel receives both the direct signal from the satellite and another signal reflected from the ground or a local object, a multipath error can occur in the DLL system which will affect the phase $\phi_P$ of the reference carrier generated by generator 17. The benefit of the asymmetric positioning $\Delta R_{PLL}(\epsilon)$ and $dQ(\epsilon)$ about the point $\epsilon_0$ of steady balance for reducing and preventing such multipath errors is now explained.

Referring now to graphs 502 and 503 FIG. 5, the effect of the multipath signal on the correlations signals I(*) and dQ(*) are shown by a respective dashed lines in graphs 502–503, which are identified as "Multipath Disturbance." Because the correlation process is linear process, the multipath signal will caused a delayed and reduced-scaled version of the correlation signals to be generated and added to the corresponding responses generated by the directly received signal. Each multipath disturbance (dashed curve) is substantially a scaled and delayed replica of the normal response caused by the directly-received signal (solid curve). When the multipath signal is present, multipath disturbance curve is added to the regular response curve to produce the actual correlation signal. As the PLL control signal Ep(*) is based on both correlations signals I(*) and dQ(*), disruption of I(*) and dQ(*) at the point $\epsilon_0$ of steady balance will cause and error in the generation of control signal Ep(*). Of the two signals I(*) and dQ(*), signal dQ(*) is the more important signal to evaluate the impact of the multipath disturbance. In the above generated form of of Ep(*), a multipath error doesn't occur if $\delta>\epsilon_D$. Thus, minimizing $\epsilon_D$ minimizes the error in the PLL system and the reference carrier phase.

The magnitude $\epsilon_D$ may be set by the value of $\epsilon_S$, and by the value of the pulse width "d" of the pules in $S_2(*)$ (within reasonably determined limits). When selecting these values to achieve a desired $\epsilon_D$, one should take into account that if "d" is decreased, the slope in the transitions regions of dQ(*) increases, and thus the recession to zero of the function $dQ(\epsilon)$ is increase in this region (graph 503 of FIG. 5), in other words, the slope is increased. Also, the transition width $\epsilon_{TR}$ is commensurately reduced. However, this is true while width "d" is greater than the front length F of the input PR-code (d>F). When "d" is decreased in magnitude below F, the correlation process in the sloping regions is determined more by the front length F than the pulse width "d". On the other hand, reducing pulse width "d" increases the effect of noise signals in the generation of dQ(*). Therefore, we can recommend choosing the value of width "d" to be close to the value of the front length F, such as in the range between F/2 and 2F.

The value of the time offset $\epsilon_S$ between reference code signals also influences the length of $\epsilon_D$. When changing $\epsilon_S$ the signal dQ($\epsilon$) will move relative to the point $\epsilon_0$ of steady balance of the DLL. This can reduce the value $\epsilon_D$, and therefore reduce the delay $\delta$ region in which multipath signals will cause errors, but changing $\epsilon_S$ in this manner simultaneously reduced the magnitude of $dQ(\epsilon_0)$, which in turn will cause noise signals to have more influence on the value of Ep(*). As a compromise, we can recommend choosing $\epsilon_S$ so as to minimize the length of $\epsilon_D$ while not allowing the value of $dQ(E_0)=dQ_0$ to decrease substantially from the maximum value $dQ_{MAX}$ of the correlation signal $dQ(*)$ (graph 503 of FIG. 5). Thus, it may be appreciated that selecting the values of $\epsilon_S$ and d provides the value of $dQ_0$ and its location on the curve so that dQ falls at a fast rate in the advancing direction from point $\epsilon_0$ and rises at a slower rate in the retarding direction from point $\epsilon_0$.

A more detailed notion about the quantitative characteristics of these trade-off can be obtained by varying the above parameters on a constructed receiver channel and then measuring the results under laboratory test conditions, as indicted above. Also, the use of a computer-aided model of the receiver channel may be used, as indicated above. The construction of computer models of receivers channels is a common practice in the GPS/GLN art. The particular values of "d" and $\epsilon_S$ will be influenced by the particular set of front-end analog and ADC components used, and therefore it is best for one to adjust the parameters based on the components used, as indicated above for the DLL reference code parameters. As a starting point, one may use d=F and $\epsilon_S$=F. Over a broad range of constructed receiver embodiments, "d" may typically range between ½F and 4*F, or between Δ/40 and Δ/5, and $\epsilon_S$ may typically range between ½F and 2*F, or between Δ/40 and Δ/10.

In preferred embodiments, narrow pulse width (D) on the order of one or two front durations F are used for the strobe pulses (P1, P2) in the DLL circuits for the greatest amount of multipath rejection. Also in preferred embodiments, a narrow pulse width (d) on the order of one or two front durations F is used for the strobe pulses in the PLL circuit. However, such narrow pulses result in correlation signals in the DLL and PLL circuits which have relatively large amounts of noise. To overcome this problem, only strong satellite signals are used. The DLL and PLL loops may be set with frequency response bandwidths in the conventional range of 15 Hz to 25 Hz.

In more preferred embodiments, the joint tracking system disclosed in co-pending patent application Ser. No. 60/091, 004, entitled "The Joint Tracking of the Carrier Phases of the Signals Received from Different Satellites", assigned to the assignee of the present application and incorporated herein by reference, is used with the PLL and DLL loops. In preferred implementations of this system, the DLL and PLL loops are set with frequency response bandwidths in the range of 1 Hz to 5 Hz and longer accumulation periods in their correlators, which overcomes the noise problem caused by narrow strobe pulses. The joint tracking system further comprises four additional loops which track dynamic changes that are common to all of the PLL loops (and DLL loops as well). Three of these common loops track the dynamic changes in the three spatial coordinates of receiver's antenna—one such common loop for each spatial coordinate. The fourth common loop tracks fluctuations in the receiver's reference oscillator. The common loops take their input from the correlation signals of the PLL loops, process these signals to determine the common changes in the coordinates and fluctuations in the reference oscillator, and then generate correction signals that are provided to the PLL oscillators of the PLL loops. Corresponding correction signals are provided to the reference code generators of the DLL loops. The frequency response bandwidths of the four common loops are in the range of 15 Hz to 25 Hz. The joint tracking system enables one to use weak satellite signals with the narrow strobe pulses which provide the greatest amount of multipath rejection.

Experimental Results

FIG. 6 illustrates the relation of the main correlation signal dI($\epsilon$) of the DLL from the time delay of the reference code shown in graph 402 of FIG. 4 relative to the PR-code front of the input signal (graph 401), obtained with the aid of the simulation model of the receiver channel under the following conditions and parameters:

the receiver filter is of the type SAWF CTI 1652;

the time digitization frequency in ADC 13 is 35 MHz;

the quantization in ADC 13 is binary;

the general duration D of the strobe is $S_{P2}(t)$ with D=171 ns, with $D_1$=114 ns, $D_2$=57 ns, $S_1$=1, and $S_2$=0.5;

GPS signal, C/A-code; and the front duration F being around 57 ns under the above filtering and sampling conditions.

In a more detailed view, the signal dI($\epsilon$) in a region around the point of steady balance is shown in FIG. 7, where ratio of the square areas $A_1$:$A_2$ of the pulses $P_1$ and $P_2$ in $S_P(t)=S_{P2}(t)$ is 4:1), and in FIG. 8, where the ratio is 8:1.

The model experiments show that when the initial time shift is set in the point $\epsilon_P \approx$500 ns (with error up to ±300 ns), the DLL is safely placed in the point of steady balance when noise with the energetic potential 40 dB/Hz is present.

The noise error of the DLL (with noise band about 2 Hz) in the tracking mode is characterized by the root mean square (RMS) equal to 1.53 m (for the strobe parameters of FIG. 7) and to 3.24 m (for the strobe parameters of FIG. 8). For comparison, the corresponding noise error was measured under similar noise conditions for an early-late correlator (with equal area pulses spaced by a time offset of 57 ns), and was found to be equal to 1.08 m.

The multipath error reduction in the above described receiver channel according to the present invention is characterized by the relation of the error $E_{MP}$ from the delay δ obtained with the model for two extreme values of the carrier phase shift of the multipath signal (0 and π). The obtained relationships are shown in FIG. 9 for three types of the main reference code. Three curves are shown and labeled as curve (a), (b), and (c). These curves are generated with the following parameters:

curve (a) is the comparative example, has a single rectangular strobe-impulse with duration of D=57 ns;

curve (b) is the asymmetric pulse according to the present invention with parameters of FIG. 7 (D=171 ns, $D_1$=114 ns, $D_2$=57 ns, $S_1$=1, $S_2$=0.5).

curve (c) is the asymmetric pulse according to the present invention with parameters of FIG. 8 (D=171 ns, $D_1$=114 ns, $D_2$=57 ns, $S_1$=1, $S_2$=0.25).

All curves use GPS C/A-code as the input signal with the multipath signal having an amplitude of 10% of the amplitude of the directly-received signal ($\alpha$=0.1). The figure shows the maximal extremes, which occur for carrier phase shifts of 0 and π. From the curves shown in FIG. 9, it is evident that the use of the asymmetric strobes according to the present invention (curves (b) and (c)) enable one to reduce the maximum multipath $E_{MP,MAX}$ error by more than a factor or two (more than a 50% reduction), and to reduce the region of lagging delay δ which would cause a multipath error by a factor of approximately 10 times.

The multipath error reduction in the PLL system is characterized by the curve of the reference carrier phase error as a function of the multipath delay δ shown in FIG. 10. The curve is obtained with the aid of computer simulation model. From the curve, it is evident that the multipath error of the PLL almost disappears when the delay δ exceeds 150 ns.

The measured noise error of the PLL (with the noise band close to 10 Hz), when the energetic potential is 40 dB/Hz, is characterized by the RMS value equal to 0.11 radians (rad). For comparison, the corresponding noise error in a conventional PLL using a replica reference code (e.g., graph 404 of FIG. 4) was measured under similar conditions, and the corresponding RMS was found to be 0.04 rad. It was also found that when the reflected signal delay δ is less than 25 ns, the multipath errors in both the conventional PLL and the PLL according to the present invention are almost equal. However, when δ increases the multipath error of the ordinary PLL remains at the same value until the delay δ reaches a value close to chip time Δ(977.5 ns), whereas the multipath error in the PLL of the present invention decrease to a value of zero by 150 ns. With the PLL system according to the present invention, multipath signals with delay δ lagged more than one or two front durations cause very little multipath error.

Other Reference Codes that can be used for $S_P(t)$ in Addition to $S_{P2}(t)$

It may be appreciated that other reference codes may be used to generate the asymmetric form of the DLL correlation signal dI(*). FIG. 11 shows two such examples. The reference code $S_{P1}(t)$ shown in graph 411 of FIG. 11 is the same as that of $S_{P2}(t)$ previously shown and discussed except that the strobes are omitted for those chips of the input PR-code which do not change in value from the previous chip. In other words, if there is no polarity change in the pre-selected series of numbers on which the PR-code is base, no strobe (or a zero-value strobe) is generated. As another way of stating this, the asymmetric strobes are only generated when the PR-code changes value (or moments of change) and not at every chip (i.e., not at every chip end). When using reference code signal $S_{P1}(t)$, the location of the point $\epsilon_0$ of steady balance is shifted in the advanced direction such that it within two front durations F of the point $\epsilon=-\Delta$ (in other words, we typically have $-(\Delta+2*F) \leq \epsilon_0 \leq -(\Delta-2*F)$. In the case of reference code signal $S_{P2}(t)$, the point of $\epsilon_0$ of steady balance is typically within two front durations F of the point $\epsilon=0$ (in other words, we typically have $-F \leq \epsilon_0 \leq F$).

In a similar manner, the reference code used by the PLL loop may have selected ones of its pulses omitted. The omitted pulses correspond to those chips of the input PR-code which do not change in value from the previous chip.

Graph 412 shows yet a different reference code that can generate an asymmetric DLL correlation signal. The reference code $S_D(t)$ comprises the sequence of the single rectangular pulses for each chip of PR-code, and with the pulse polarity corresponding to the polarity of the input PR-code signal. The square area of the pulses (i.e., the time-integrated magnitudes) in the reference code $S_D(t)$ are different depending on whether the chip corresponding to the pulse has changed in value form the previous chip's value. If a change has occurred, the pulse area is larger.

It may be appreciated that reference codes $S_{P1}(t)$, $S_{P2}(t)$ and $S_D(t)$ may be generally described as comprising a repeating sequence of strobes, with the start of each strobe being spaced in time from the start of the next strobe by an integer number of chip durations Δ. In the case of reference codes $S_{P2}(t)$ and $S_D(t)$, the integer number is always 1. In the case of reference code $S_{P1}(t)$, a strobe is generated for each polarity change between consecutive chips; if there is no polarity change, no strobe is generated. Thus, for reference code $S_{P1}(t)$, the integer number of chip durations Δ between two consecutive strobes depends upon the structure of the code, and is equal to one (1) plus the number consecutive chips between the consecutive strobes in which the chip polarities do not change. The strobes of reference codes $S_{P1}(t)$, $S_{P2}(t)$ and $S_D(t)$ have a duration equal to or less than the chip duration Δ and comprise at least one pulse, the values of the pulses being related to the preselected series of numbers, and more specifically to the respective numbers in the pre-selected series.

In addition, the reference code signal $S_2(t)$ for the PLL loop may have a form which is similar to the form of signal $S_{P1}(t)$ or signal $S_D(t)$.

INCOHERENT DETECTION

As previously indicated, the PLL loop is not present in an incoherent detector, and the DLL correction signal is generated to be invariant to the lack of phase coordination between the independent heterodyne reference carrier and the input carrier. Nonetheless, the aspects of the present invention may be applied to incoherent detection.

Incoherent detection uses four correlators with an incoherent reference carrier. The satellite signal is down converted using a reference carrier signal which is not phased adjusted to follow the phase of the satellite's carrier signal (i.e., it is incoherent). The incoherent reference carrier signal is in quadrature format, and the down-converted satellite signal is provided in quadrature format, having a first orthogonal component and a second orthogonal component. Each of the orthogonal components of the down-converted satellite signal is multiplied with a replica of the satellite's PR-code signal (e.g., $S_K(t)$) and thereafter accumulated by two respective correlators to generate two orthogonal correlation signals $I_0$ and $Q_0$:

$$I_0(\epsilon,\phi)=M*R_0(\epsilon)*\cos(\phi), \text{ and}$$

$$Q_0(\epsilon,\phi)=M*R_0(\epsilon)*\sin(\phi).$$

These correlation signals also depend upon the magnitudes of $\epsilon$ and $\phi$, as in the coherent technique. In this case, $\phi$ is not controlled and can have any phase shift value. In the third correlator, the first orthogonal component of the down-converted satellite signal is multiplied with a reference code signal that has the form of short pulses or strobes (such as those according to the present invention) and the resulting product is accumulated to generate a third correlation signal $dI_0(\epsilon,\phi)=M*\Delta R_0(\epsilon)*\cos(\phi)$. In the fourth correlator, the second orthogonal component of the down-converted satellite signal is multiplied with the same reference code signal as used in the third correlator and the resulting product is accumulated to generate a fourth correlation signal $dQ_0(\epsilon,\phi)=M*\Delta R_0(\epsilon)\sin(\phi)$.

The error signal $Ed(\epsilon)$ may be formed according to following form:

$$Ed(\epsilon)=I_0 dI_0+Q_0 dQ_0=M^2*\Delta R_0(\epsilon)R_0(\epsilon),$$

or the form:

$$Ed(\epsilon)=(I_0 dI_0+Q_0 dQ_0)/(I_0^2+Q_0^2)=\Delta R_0(\epsilon)/R_0(\epsilon).$$

Other forms are also possible. Thus, the strobes of the present invention may be used in incoherent receiver structures to provide the same results for the DLL loop.

The embodiments of the present invention that have been described so far may be summarized as follows. The methods, and apparatuses for implementing those methods, track an input code signal, such as that provided by a global positioning satellite, by generating a corresponding reference code signal, such as S(t), and then adjusting the phase of the reference code signal to track the phase of the input code signal. The input code signal comprises a repeating sequence of chips, whose values are based upon a preselected series of numbers. The reference code signal (S(t)) comprises a repeating sequence of strobes whose structures are based upon the same preselected series of numbers. (While global positioning satellites use preselected series of numbers that represent pseudo-random number sequences, the present invention is also applicable to those cases where the preselected series of numbers might represent periodic or regular sequences.) The methods include a step of generating a correlation signal dI whose value is related to (i.e., is a function of) the correlation of the input code signal with the reference code signal. The correlation signal dI provides an indication of how the phase of the reference code signal is to be adjusted relative to the input code signal in order to a maintain a set difference in time between the sequence start of the input code signal and the reference code signal.

The reference code signal is generated such that the start of its strobe sequence may be adjusted in time with an adjustable time shift $\epsilon$ from the start of the sequence of the input code signal. The value of the time shift $\epsilon$ has a first polarity when the sequence start of the reference code signal leads the sequence start of the input code signal and a second polarity opposite to the first polarity when the sequence start of the reference code signal lags the sequence start of the input code signal. The time shift $\epsilon$ moves in a leading direction when the sequence start of the reference code is advanced in time, and moves in a lagging direction when the sequence start of the reference code is retarded in time. Thus, the time shift value $\epsilon$ is representative of the phase of the reference code signal as measured with respect to the phase of the input code signal. The correlation signal dI has a value which is a function of the time shift $\epsilon$, and is equal to zero when said time shift $\epsilon$ is at the point $\epsilon_0$ of steady balance. When dI is at the point of steady balance, the desired difference in time between the sequence starts of the input code signal and the reference signal is achieved. (The point of steady balance co may have a positive or negative value on the time shift $\epsilon$ axis; in other words, it may be in either the leading or lagging direction of time shift $\epsilon$). The value of the correlation signal dI has a first polarity when the time shift $\epsilon$ moves in the leading direction away from the point of steady balance $\epsilon_0$, and a second polarity opposite to the first polarity when the time shift $\epsilon$ moves in the lagging direction away from point $\epsilon_0$. The methods and apparatuses of the present invention preform the step of adjusting the time shift $\epsilon$ of the reference code signal in response to the value of the correlation signal dI to move the time shift $\epsilon$ toward the point $\epsilon_0$ of steady balance and seek to maintain it there. This adjustment step may be preformed by the DLL loop (e.g., components 22, 28, 31, and 25). The correlation signal dI indicates that the time shift $\epsilon$ should be advanced when the signal's value has its second polarity, and indicates that the time shift $\epsilon$ should be retarded when the signal's value has its first polarity. The generation of the reference code signal S(t) by generator 25 is advanced or retarded by the DLL loop to achieve the adjustments in the time shift $\epsilon$ that are indicated by the correlation signal. Because of system noise, the time shift $\epsilon$ may move around in a small neighborhood around point $\epsilon_0$, and may be temporarily moved away from point $\epsilon_0$ by dynamic effects, such as caused by movement of the antenna. Nonetheless, the adjustment process always moves $\epsilon$ toward $\epsilon_0$ to seek to maintain it there. The first reference code signal thereby tracks the input code signal by being adjusted toward maintaining a constant time shift between the sequence starts of the two code signals. Accounting for the effects of noise and dynamic effects, we say that the adjustment maintains $\epsilon$ about point $\epsilon_0$, or approximately at point $\epsilon_0$.

The search system 32 preferably initially sets the time shift $\epsilon$ at a point which lags the point $\epsilon_0$ of steady balance before commencing the adjusting of the time shift $\epsilon$ to bring it toward the point $\epsilon_0$.

The steps thus far described also generally apply to the Y-displacement embodiments that will be described later.

The generated form of the correlation signal dI has distinct novel features for improving multipath rejection. These features may be used alone, or may be used together, which is the case in preferred embodiments of the present invention. The first such feature is that the above-defined lagging peak value $dI_L$ of the correlation signal dI has a greater magnitude than the magnitude of above-defined leading peak value $dI_E$ of the correlation signal dI. In preferred embodiments, the magnitude of $dI_L$ is at least five times the magnitude of $dI_E$ ($dI_L \geq 5dI_E$), and is preferably between five times and ten times as much. Nonetheless, at least some benefits from this feature will be achieved with the magnitude of $dI_L$ being two times to five times the magnitude of $dI_E$ ($2dI_E \leq dI_L \leq 5dI_E$). A second feature is that above-defined range $L_E$ of the correlation signal dI in the leading direction of time shift $\epsilon$ is less than the above-defined range $L_L$ of signal dI in the lagging direction (or conversely, $L_L$ is greater than $L_E$). Range $L_E$ is generally less than 20% of a chip time duration $\Delta$, and usually not more than four front durations (4*F), while range $L_L$ is generally greater than 50% of a chip time duration $\Delta$. In preferred embodiments, range $L_L$ is at least four times greater than range $L_E$. The second feature may be used in combination with the first feature, with each feature being embodied in any of its forms stated above. As one preferred combination, range $L_L$ at least four times greater than range $L_E$, and magnitude of $dI_L$ is between five times and ten times the magnitude of $dI_E$. As a third feature which aids multipath reduction with the previous two features, correlation signal dI preferably changes from its leading peak value $dI_E$ to its lagging peak value $dI_L$ within a time shift distance of not more than five front durations F (5*F), and preferably in a time shift distance of one duration F to three durations F (3*F).

The above various forms of the correlation signal dI (such as for example, $dI_L > 5dI_E$) may be achieved by selecting the square areas $A_1$ and $A_2$ (the integrated magnitudes) of the pulses in the asymmetric strobe, as previously described. The areas may in turn be selected by selecting the widths and heights of the pulses. The first pulse in the asymmetric pulse preferably has a larger integrated magnitude (e.g., larger square area), as indicated above. (Of course, the height of a pulse may be varied over the width of the pulse; but such is not necessary.) In preferred embodiments, the duration of each of the first and second pulses in each asymmetric strobes is not more than three front durations F. In further preferred embodiments, the duration of the second pulse is not more than two front durations F.

The above forms of the correlation signal dI may be effectively achieved in the Y-displacement embodiments that are described later herein.

The operation of the PLL loop is another inventive feature of the present invention, which may used with any of the above embodiments (and Y-displacement embodiments described below) when a coherent receiver is used. While such use is optional, it is preferred. As a summary, the PLL embodiment generate a reference carrier signal such that its phase may be adjusted, with the difference in the phases between the modulated input carrier signal and the reference carrier signal being indicated by $\phi_P$. The modulated input carrier signal is frequency down-converted using the reference carrier signal to generate an in-phase baseband code signal and a quadrature baseband code signal, with both signals being representative of the input code signal. The in-phase baseband code signal is tracked by the first reference code in the DLL loop, as described above. The second reference code signal ($S(t-\epsilon_S)$) is generated as described above, and the correlation signal dQ is generated from the quadrature baseband code signal and the second reference code signal. The PLL loop (e.g., components 37, 19, and 17) then adjust the phase of the reference carrier signal based on the value of dQ to cause the phase difference $\phi_P$ move toward a value of zero and stay there.

The above methods and apparatuses, and all of their above-described modifications and preferred forms, may be implemented using discrete-time signal forms for the reference code signals (e.g., S(t)). The signal values of the discrete-time signal are provided at periodic intervals spaced from one another in time by a time duration T. Likewise, as part of generating the correlation signals $dI_1$ I and dQ, the methods and apparatus include a step of digitizing the input code signal at periodic intervals spaced from one another in time by the time duration T. The correlators (and correlation steps) work with these discrete-time signals to produce the correlation signals. The Y-displacement embodiments described below may also be implemented with these discrete-time signals.

Y-DISPLACEMENT EMBODIMENTS

The results of the asymmetric correlation signal $dI(\epsilon)$ may be achieved in the following additional embodiments, which may employ symmetric strobes. In the description of these embodiments, we will focus our discussions on the dependency of the various correlations signals (such as dI) and control signals (such as Ed) upon the time shift value $\epsilon$, with a reminder to the unfamiliar reader that these correlation signals and control signals are generated at discrete time points (those of ordinary skill in the art already know this). These embodiments comprise the steps of generating a starting correlation signal $dI_1(\epsilon)$ with a reference code signal, removing the modulating effects of the information signal A(t) if it is present, and then adding a displacement value "Y" to the correlation signal $dI_1(\epsilon)$ to generate a final correlation signal. The final correlation signal is asymmetric and serves as the control signal $Ed(\epsilon)$ for the DLL system, as is done in the previously described embodiments. The Y-displacement embodiments are generally described with respect to FIG. 12, which shows a set 700 of three graphs 701–703. The first graph 701 shows a starting correlation signal $dI_1(\epsilon)$, which is symmetric (solid curve in the graph). The reference code used in generating $dI_1(\epsilon)$ may comprise a sequence of strobes having single pulses whose values follow the values of the PR-code being tracked, and is generated by reference code generator 25 (FIG. 1). This reference code is designated as $S_A(t)$ and is shown at graph 422 in FIG. 13 in relation to the input PR code, which is reproduced as graph 401 in FIG. 13. As before, the time shift $\epsilon$ is the time difference between the sequence starts of the input code signal and the reference code signal. $S_A(t)$ has pulses of width $D_A$ spaced at increments of the chip duration $\Delta$, where width $D_A$ is less than the chip duration $\Delta$. The pulses of $S_A(t)$ have a magnitude $S_A$, where the polarity of each pulse is the same as its corresponding chip in the input reference code (of course, one could multiply the entire reference code $S_A(t)$ by −1 and still obtain a reference code $-S_A(t)$ that will still work).

Referring back to FIG. 12, correlation signal $dI_1(\epsilon)$ has a maximum value $dI_{MAX}$ between points $\epsilon=\epsilon_B$ and $\epsilon=\epsilon_D$ where the slope of the curve is zero, and has two sloping transition regions on either side of points $\epsilon_B$ and $\epsilon_D$ which bring the value of the signal down to substantially zero (i.e. to zero, accounting for the fact that all signals can have intrinsic noise). The region to the right of $\epsilon_D$ corresponds to the case when the front edge of the reference code signal lags the front of the PR-code by an excessive amount (on the order of $\Delta$). The region to the left of $\epsilon_B$ corresponds to the case when the front edge of the reference code signal leads the front of the PR-code by a small amount (on the order of the strobe pulse width pulse, or the front width of the input code signal). The left transition region is between points $\epsilon=\epsilon_B$ and $\epsilon=\epsilon_A$, and the point $\epsilon_0$ of steady balance is preferably located in this region, with $dI_1$ have a non-zero value at $\epsilon_0$, for the greatest reduction of multipath signal effects. The value of signal $dI_1(\epsilon)$ has a non-zero rate of change with respect to a change in the time shift $\epsilon$ in the region $[\epsilon_A,\epsilon_B]$, and thus has a non-zero rate of change as it moves away from the point $\epsilon_0$ in each of the leading and lagging directions. As the time shift $\epsilon$ lags from point $\epsilon_0$, the value of signal $dI_1(\epsilon)$ increases in value until it reaches $dI_{MAX}$ at point $\epsilon=\epsilon_B$. As time shift leads from point $\epsilon_0$, the value of signal $dI_1(\epsilon)$ decreases in value until it reaches zero at point $\epsilon=\epsilon_A$. Signal $dI_1(\epsilon)$ remains at a value of zero in the region between points $\epsilon=\epsilon_A$ and $\epsilon=\epsilon_C$. (Region $[\epsilon_C,\epsilon_A]$ is in the advance direction from point $\epsilon_0$, which is in region $[\epsilon_A,\epsilon_B]$.) For the purposes of the appended claims, we will define the value of $dI_{MAX}$ as the value of $dI_1(\epsilon_B)$ at time-shift point $\epsilon=\epsilon_B$, which corresponds to the point where the rate of change in $dI_1(\epsilon)$ with respect to $\epsilon$ first reaches zero when $\epsilon$ is moved in the lagging direction from point $\epsilon_0$.

Next, as an optional step, the correlation signal is normalized, or scaled, to provide a consistent maximum value for a wide range of input signal levels. The result of the normalization is shown at the solid curve in graph 702 where the scaled $dI_1(\epsilon)$ has a maximum value of $dI_{NORM}$. In other words, we have generated a normalized version of the correlation signal $dI_1(\epsilon)$, which we denote herein as $dI_1'(\epsilon)$. While this step is optional, it is preferred since it substantially reduces tracking errors that are caused by changes in the signal level of the PR-code signal that can happen whether or not there are multipath signals present. We have shown an idealized normalization in the solid curve of graph 702. As described below, the normalization can be accomplished by generating a correlation signal which is representative of the signal strength of the PR-code signal, and then one can use that correlation signal to accomplish the normalization. Such signals are often not ideal, and often times have erroneous values for some values of the time shift value $\epsilon$. Of course, these erroneous values can cause the normalized version of the signal $dI_1(\epsilon)$ to be erroneous for some values of the time shift value $\epsilon$. A typical example of such erroneous values in signal $dI_1(\epsilon)$ are shown by dashed line 712 in graph 702. As it happens, the erroneous values 712 are far removed from where we will set the point of steady balance $\epsilon_0$, and therefore do not affect the operation of the Y-displacement tracking methods and apparatuses according to the present invention. Because of the possibility of the erroneous values 712, we define $dI_{NORM}$ as being the value that one wants in the normalized version of the correlation signal at time-shift point $\epsilon=\epsilon_B$, which corresponds to the same point where $dI_{MAX}$ is defined.

After the preferred optional normalization step, a displacement Y is added to $dI_1(s)$ (or $dI_1'(\epsilon)$) to generate the asymmetric control signal $Ed(\epsilon)$. In this case, displacement Y has a polarity opposite to that of $dI_{MAX}$ (or $dI_{NORM}$ if normalization is used). (In general, the polarity of displacement Y will depend upon the form of $dI_1(\epsilon)$, which in turn is dependent upon the form of its corresponding reference code). The result of these steps is shown in graph 703 of FIG. 12, with $Ed(\epsilon)$ being generated as:

$$Ed(\epsilon) = K*dI_1(\epsilon) + Y,$$

where K is a scaling coefficient which represents the effects of the optional normalization step. The quantity $K*dI_1(\epsilon)$ represents the normalized version $dI_1'(\epsilon)$ of the correlation signal $dI_1(\epsilon)$. To accomplish normalization, K will usually be generated as a function of the signal strength of the PR-code signal being tracked. This often means that K will be a function of time shift value $\epsilon$. However, the system will operate to maintain the time shift value $\epsilon$ at a point of steady balance $\epsilon_0$, and any variations in K due to changes in $\epsilon$ at point $\epsilon_0$ will be small or zero. As described below, another way of accomplishing normalization is to set K to a constant value and then generate displacement Y as a function of the signal strength of the PR-code signal being tracked. In this case, Y will often be a function of time shift value $\epsilon$. However, the system will operate to maintain the time shift value $\epsilon$ at a point of steady balance $\epsilon_0$, and any variations in Y due to changes in $\epsilon$ at point $\epsilon_0$ will be small or zero. For the time being, we have denoted K and Y in general form, with the understanding that one or both may be functions of the signal level of the input PR-code signal. The above form for $Ed(\epsilon)$ presumes that there is no low-frequency information signal A(t). If A(t) is present, it may be removed by the step of multiplying $dI_1(\epsilon)$ by the sign of $I(\epsilon)$. In this case, $Ed(\epsilon)$ may be generated as:

$$Ed(\epsilon) = K*dI_1(\epsilon)*Sgn(I(\epsilon)) + Y.$$

The above generated form is also applicable when A(t) is not present, and thus is a more general form. The receiver topology of FIG. 1 may be used to implement these generated forms by substituting strobe signal $S_A(t)$ for S(t), and by using the output of DLL correlator 22 to provide correlation signal $dI_1(*)$. The step of scaling by coefficient K and the optional step of multiplying by $Sgn(I(\epsilon))$ may be performed by DLL discriminator 28 (shown in FIG. 1), or by other means. The step of adding displacement Y is preferably performed by DLL discriminator 28 (shown in FIG. 1).

In contrast to correlation signal $dI_1(\epsilon)$, control signal $Ed(\epsilon)$ in graph 703 has two zero points 710 and 711 in its domain for the time shift $\epsilon$, one in each transition region of $dI_1(\epsilon)$. The point 710 in the left transition region is chosen as the point $\epsilon_0$ of steady balance because it provides the greatest reduction of multipath effects. A multipath signal is shown by a dashed curve in graph 401 of FIG. 13 with a delay $\delta$ between its front edge and the front edge of the directly-received input signal (solid curve). If present, the multipath signal adds with the directly-received input signal if it has the same phase, or subtracts from the input signal if it has the opposite phase. Without loss of generality, the figures show the multipath signal with a phase that would add with the directly-received input signal. Referring to FIG. 12, the multipath signal would affect the correlation signal $dI_1(\epsilon)$ by creating a delayed replica of the correlation function (shown by the dashed curve) that would add with the normal form of $dI_1(\epsilon)$ (solid curve) to provide the actual generated form of $dI_1(\epsilon)$ that is present at the output of correlator 22. The delay replica is identified in the figures as the "multipath disturbance." The delayed replica caused by the multipath signal is scaled by the amplitude of the multipath signal and is shifted from the normal form of $dI_1(\epsilon)$ in the domain of time shift $\epsilon$ by delay $\delta$, which was previously defined at graph 401 in FIG. 13. If correlation signal $dI_1(\epsilon)$ is normalized, the multipath disturbance will be similarly scaled. The multipath disturbance also disturbs the shape of the control signal $Ed(\epsilon)$ from its normal form, which is shown as the solid curve at graph 703. The actual form of the control signal $Ed(\epsilon)$ in the presence of a multipath signal would be the addition of the solid curve (which is the normal response) and the dash curve (which is the multipath disturbance).

A multipath disturbance has the potential of causing points 710 and 711 in the generated control signal $Ed(\epsilon)$ to no longer be zero points, and of creating other zero points in their places. Since the locations of such other zero points are not predictable, they are not useful. As shown in graph 703 of FIG. 12, the multipath replica (dashed curve) would clearly disturb right zero point 711 when added to the normal response of $dI_1(\epsilon)$ (solid curve), but would not disturb left point 710 since the replica has a zero value in the region around point 710. This is true for all values of delay $\delta$ which are greater than a delay $\delta_{MIN}$ value shown in graph 703. The delay $\delta_{MIN}$ may be readily found by shifting the multipath replica (dashed curve) in either of graphs 701 or 702 in the leading direction of the time shift $\epsilon$ to a delay which just causes the value at point $\epsilon_0$ of the actual $dI_1(\epsilon)$ signal to change substantially in value from its normal value. For this purpose, the typical worst-case multipath signal may be assigned an amplitude which is between 30% and 40% of the amplitude of the directly-received signal. The delay $\delta_{MIN}$ may also be readily found by shifting the multipath replica (dashed curve) in shown in graph 703 in the leading direction of the time shift $\epsilon$ to a delay which just causes the value at point $\epsilon_0$ of the actual $Ed(\epsilon_0)$ signal to change substantially in value from zero. By minimizing the value of $\delta_{MIN}$, the chances of a multipath signal disturbing point 710 are reduced. In other words, only those multipath signals with a delay $\delta$ less than $\delta_{MIN}$ would be able to cause a disturbance to point 710. (delays $\delta$ and $\delta_{MIN}$ cannot be negative as such would imply that the multipath signal is received before the direct signal.)

From the point of view of the DLL feedback loop, either of points 710 and 711 may be selected as the point of steady balance through the selection of the orientation of the feedback loop. The left point 710 is selected as the point $\epsilon_0$ of steady balance by causing the DLL feedback loop to advance the generation of the reference code in time when $Ed(\epsilon)$ is positive, and to retard the generation of the reference code when $Ed(\epsilon)$ is negative. When the time shift $\epsilon$ is at a point where $Ed(\epsilon)$ is positive, the DLL moves $\epsilon$ to the left (advancing direction) away from the right zero point 711 and toward the left zero point 710. When the time shift $\epsilon$ is at a point $\epsilon_0$ the left of o where $Ed(\epsilon)$ is negative, the DLL moves $\epsilon$ to the right (lagging direction) toward $\epsilon_0$. These advancing and retarding operations adjust the time shift value $\epsilon$ to move $\epsilon$ to the point $\epsilon_0$ of steady balance and maintain it there, thus achieve the tracking of the input PR-code signal. The search system 32 is usually able to place the starting value of the time shift in one of these two regions, and it preferably initially sets the time shift $\epsilon$ at a point which lags the point $\epsilon_0$ of steady balance before commencing the adjusting of the time shift $\epsilon$ to bring it toward the point $\epsilon_0$. Should the time shift $\epsilon$ be in the region to the right of the right zero point 711, the DLL causes the time shift $\epsilon$ to move further away from both of the zero points 710 and 711 (and the lock of the DLL is lost). In theory, the time shift $\epsilon$ can settle exactly at the right zero point 711, but this point is unstable since a small amount of noise can readily dislodge $\epsilon$ from the right zero point 711. (Point 711 may be chosen as the point of steady balance by reversing the orientation of the feedback loop, in which case the reference code is advanced when $Ed(\epsilon)$ is negative and retarded when $Ed(\epsilon)$ is positive.)

The position of the point $\epsilon_0$ of steady balance (710) in the domain of $\epsilon$ is set by the value of displacement Y in relation to the value of $dI_{MAX}$, or by the relative values of $dI_{NORM}$, K, and Y if the normalization step is preformed. A small magnitude in displacement Y puts point $\epsilon_0$ close to point $\epsilon_A$, whereas a large magnitude near that of $dI_{MAX}$ (or $dI_{NORM}$) puts point $\epsilon_0$ close to point $\epsilon_B$. If the normalization step is not used, Y is selected to have a magnitude of less than 50% of d and preferably between 5%–10% of $dI_{MAX}$. In the un-normalized case, $Y=-dI_1(\epsilon_0)$ since $Ed(\epsilon_0)=0$, and hence $dI_1(\epsilon_0)$ will have the same magnitude as Y, but will have a different polarity. In the figures and the claims, the value of $dI_1(\epsilon_0)$ is abbreviated as $dI_0$. If normalization is used, Y is selected to have a value of less than 50% of $dI_{NORM}$, and preferably between 5%–10% of $dI_{NORM}$. In the normalized case, $Y=-K*dI_1(\epsilon_0)$, so that $dI_1(\epsilon_0)=-Y/K=dI_0$. In each case, the parameters are preferably selected such that $\epsilon_0$ is closer to $\epsilon_A$ than $\epsilon_B$. The point $\epsilon_0$ of steady balance is also preferably chosen to correspond to a region of the correlation signal $dI_1(\epsilon)$ (e.g., as shown in graph 701) where $dI_1(\epsilon)$ has a substantial amount of slope (i.e., where $\partial dI_1(\epsilon)/\partial \epsilon$ is substantially non-zero).

In the particular examples given above, the point $\epsilon_0$ of steady balance is in the advanced direction from (i.e., to the left of) the point $\epsilon=0$, which corresponds to the front of the reference code signal being aligned to the front of the input code signal. The point $\epsilon_0$ of steady balance may be set in the lagging direction from (i.e., to the right of) the point $\epsilon=0$ by setting the magnitude of Y to between about 80% and 100% of $dI_{MAX}$ if normalization is not used, or between about 80% and 100% $dI_{NORM}$ if normalization is used. However, this configuration generally has less of reduction of multipath errors, and is currently not preferred.

In general, better multipath reduction is achieved with $\epsilon_0$ placed in the advancing direction of $\epsilon$, and with the left transition region of $Ed(\epsilon)$ having the largest possible slope. This slope in the left transition region is, of course, set by the slope in the left transition region of the starting correlation signal $dI_1(\epsilon)$. In turn, this slope is set by the pulse width of the reference code $S_A(t)$, with smaller pulse widths $D_A$ providing larger slopes, at least for cases where $D_A$ is greater then the chip front duration F. For cases where $D_A$ is decreased to a level which is less that F, one finds that the slope in the transition region of $dI_1(\epsilon)$ is mainly set by F. However, the signal-to-noise ratio of the correlation signal $dI_1(\epsilon)$ degrades as the pulse width $D_A$ is decreased in value. Thus, there is no benefit in decreasing $D_A$ significantly below the level of F. One of ordinary skill in the art can readily vary the value of $D_A$ for his particular constructed embodiment and observe the resulting changes in the signal-to-noise ratio and the slope in the transition region. One typically finds that the signal-to-noise ratio has a peak value at a particular value of pulse width, and that it decreases away from the peak if the pulse width is increased or decreased from this point. The location of the peak will depend upon the particular construction (e.g., the characteristics of the front-end components), but nonetheless can be readily found by measurements which are within the ordinary skill of the art. A pulse width $D_A$ of between approximately $\Delta/20$ and approximately $\Delta/4$, or of between approximately F and approximately 4*F, represents a good compromise between the above competing effects.

With the magnitude of Y set to 5%–10% of $dI_{MAX}$ (without normalization) or 5%–10% of $dI_{NORM}$ (with normalization), and with the pulse width $D_A$ of the reference code being less than four front lengths ($D_A<4*F$), a reflected multipath signal lagging more than a front length F from the directly-received input signal will not cause a significant shift in the point $\epsilon_0$ of steady balance in the DLL, and therefore will not cause a multi-path error. However, we note that K will usually be generated as a function of a correlation signal which is proportional to the signal strength of the PR-code signal, and that multipath signals can create errors in that signal. In turn, those errors affect the normalization, and thus introduce errors in the control signal. However, by choosing Y to 5%–10% of $dI'_1(\epsilon_B)$, which is $dI_{NORM}$, these errors are made small. These errors may also be reduced by selecting the structure of the correlation strobe, which is illustrated below with reference codes $S'_K(*)$ and $S_N(*)$ The above features are achieved while preserving the wide lock range of nearly a chip duration $\Delta$ in the lagging direction from the point $\epsilon_0$ of steady balance, and of at least one chip duration $\Delta$ in the leading direction from the point $\epsilon_0$. Once the initial search system sets the time shift $\epsilon$ within about one chip duration $\Delta$ of the point $\epsilon_0$ (preferably in the lagging side of point $\epsilon_0$), the DLL locks onto the point $\epsilon_0$ of steady balance and remains there in a substantially failsafe manner (except of course in cases of extremely sharp movements of the antenna or accidental shielding of the antenna). The present invention is in contrast to many multipath-reduction DLL systems which use a two-step lock procedure: the first step locks the DLL using a first correlation signal which spans a wide band in over the domain of time shift $\epsilon$ but which has poor multipath reduction characteristics, and the second step locks the DLL using a second correlation signal which spans a narrow band of $\epsilon$ but which has better multipath reduction characteristics. However, the disadvantage of the second correlation signal is that the DLL system can be easily dislodged from the locked position by a relatively small disturbance. Such is not the case with the present invention as it achieves both a wide locking band and good multipath reduction characteristics.

Normalization in the Y-displacement Embodiments.

As indicated above, the step of signal normalization may be optionally used. In some applications, usually with general PR-code receivers, the input code signal is amplitude limited by the front-end amplifier(s) and/or frequency down-converter(s), and thus taking active steps to normalize the signal is not needed. However, the signal-to-noise ratio in GPS and GLN systems is generally not large enough to provide for such limiting, and in these systems it is most often the case that the strength of the input signal presented at the antenna varies by a substantial degree. This variation is presented to the correlator of the DLL system, and results in corresponding variations in the value of $I_{MAX}$ (graph 701) and in the values of $dI_1(\epsilon)$ in the transition region where the point $\epsilon_0$ of steady balance is located. If displacement Y is fixed, this variation in the values of $dI_1(\epsilon)$ causes the position of point $\epsilon_0$ to shift as a function of the signal strength because the displacement Y is fixed while $dI_1(\epsilon)$ varies (e.g., $\epsilon_0$ would lag with decreasing signal strength for the form of $dI_1(\epsilon)$ shown in graph 701). Since the accuracy of the pseudo-range measurement is increased by maintaining point $\epsilon_0$ in a known and fixed position, the shifting of $\epsilon_0$ is not desirable. Normalization of the correlation signal $dI_1(\epsilon)$ with respect to the signal level is one general approach for minimizing the shifting of $\epsilon_0$ (i.e., normalizing $dI_{MAX}$ to a predetermined value of $dI_{NORM}$). There are many methods of accomplishing this normalization, and exemplary ones are discussed immediately below. One general approach is to include an amplitude limiter in the front-end analog processing section. A second general approach is to include an automatic gain loop in the front-end analog processing section which adjusts the amplification of the input signal to achieve a substantially consistent signal level. A third general approach is to measure the input signal level and scale the correlation signal $dI_1(\epsilon)$ accordingly by generating K as an inverse function of the input signal level. A fourth general normalization approach is to scale the magnitude of displacement Y in relation to the input signal level, which will essentially counterbalance the changes in $dI_1(\epsilon)$ caused by variations in the input signal level.

The first and second normalization methods are currently not very practical for typical GPS measurement applications, and therefore will not be described in any further detail. The third and forth normalization methods are currently the most practical, and will be described in greater detail. In the third and fourth normalization methods, the input signal level may be measured in a number of ways: incoherent measurement, coherent measurement, simplified coherent measurement, and simplified coherent measurement using special reference codes. These methods are discussed in detail with respect to the third general normalization approach, with it being understood that they are equally applicable to the fourth normalization method. Thus, each these general approaches may use any of at least four ways to measure the input signal level, thus enabling more than 8 different implemented methods of normalization.

Third General Normalization Approach.

In the third general normalization approach, the normalization is achieved by directly generating the coefficient K as a function of the input signal level $Z_{IN}$, which is represented as $K(Z_{IN})$, and by having DLL discriminator 28 generate a normalized version of the correlation signal $dI_1(\epsilon)$ using $K(Z_{IN})$, or an approximation thereof. In the third method, $K(Z_{IN})$ is generated as follows:

$$K(Z_{IN}) = [dI_{NORM}/dI_{MAX}(Z_{IN})]$$

where $dI_{NORM}$ is the desired value for the normalized version at point $\epsilon=\epsilon_B$, where signal $dI_1(\epsilon)$ has the value $dI_{MAX}(Z_{IN})$; and DLL discriminator 28 generates Ed as follows:

$$Ed(\epsilon) = K(Z_{IN})*dI_1(\epsilon)*Sgn[I(\epsilon)]+Y_0,$$

where $Sgn[I(\epsilon)]$ accomplishes demodulation of the low-frequency information signal A(t), if present, and where $Y_0$ is a constant Y-displacement chosen at a desired value, as previously described. The above form of $Ed(\epsilon)$ may be used whether or not the low-frequency information signal A(t) is present. If A(t) is not present, then $Ed(\epsilon)$ may be more simply generated as:

$$Ed(\epsilon) = K(Z_{IN})*dI_1(\epsilon)+Y_0.$$

In this approach, the relationship of $dI_{MAX}(Z_{IN})$ to $Z_{IN}$ is approximated as:

$$dI_{MAX}(Z_{IN}) \approx \beta*Z$$

where $\beta$ is a constant of proportionality, and where Z may be generated by a number of different methods. With the coherent receiver topology shown in FIG. 1, the easiest way to generated Z is as follows: $Z=Abs(I(\epsilon))$, where $Abs(*)$ is the absolute value function, or equivalent thereof, and where $I(\epsilon)$ is provided by the output of main correlator 35 using reference code $S_K(t-\epsilon_K)$, which is reproduced at 423 in FIG.

13. Because of the properties of a coherent receiver, the absolute value of the correlation signal $I(\epsilon)$ is proportional to the input signal level when the PLL loop is in its locked state and when the DLL is near the point $\epsilon_0$ of steady balance. When using the receiver topology of FIG. 1 for this implementation, strobe signal $S_A(t)$ (422 in FIG. 13) is used for signal S(t) in FIG. 1, and the output 27 of DLL correlator 22 provides correlation signal $dI_1(*)$. $\beta$ may be measured experimentally by applying a test frequency to the antenna of the receiver under laboratory conditions and then measuring the resulting values of Z and $dI_{MAX}$. If we designate $Z^T$ and $dI^T_{MAX}$ as the measured test values, then $\beta$ may be set to $\beta = dI^T_{MAX}/Z^T$. The same measurement may be effectively done by computer simulation of the receiver channel. In the GPS art, it is common to construct computer simulation models of GPS receiver components. Thus, the above measurements may be performed by computer simulation.

The measurement for $dI^T_{MAX}$ occurs away from the point $\epsilon_0$ of steady balance in the lagging direction at point $\epsilon=\epsilon_B$, and one may set the DLL to this lagging point by temporarily disconnecting the control signal Ed from the DLL filter 31 and by providing a substitute signal whose value moves the DLL slowly in the lagging direction (the substitute value is usually a small negative value close to zero). When the lagging point $\epsilon=\epsilon_B$ is reached, the output of correlator 22 may be measured for the value of $dI^T_{MAX}$. The value of $Z^T$ is measured at the point $\epsilon_0$ of steady balance since the value of Z is usually only reflective of the input signal level in a small neighborhood around the point $\epsilon_0$ of steady balance (however, this is more than sufficient for the present invention). $K(Z_{IN})$ may then be generated as follows:

$$\begin{aligned} K(Z_{IN}) \approx K(Z) &= [dI_{NORM}/(\beta*Z)] \\ &= [dI_{NORM}/(Z*dI^T_{MAX}/Z^T)] \\ &= [(dI_{NORM}/dI^T_{MAX})/(Z/Z^T)] \end{aligned}$$

and $Ed(\epsilon)$ may be generated as:

$$Ed(\epsilon) = [(dI_{NORM}/(\beta*Z)]*dI_1(\epsilon)*Sgn[I(\epsilon)]+Y_0,$$

or in the (optional) simplified form when A(t) is not present:

$$Ed(\epsilon) = [(dI_{NORM}/(\beta*Z)]*dI_1(\epsilon)+Y_0.$$

When Z is generated from the output $I(\epsilon)$ of main correlator 35 as the absolute value of $Z=Abs[I(\epsilon)]$, $Ed(\epsilon)$ may be generated as:

$$Ed(\epsilon) = [(dI_{NORM})/(\beta*Abs[I(\epsilon)])]*dI_1(\epsilon)*Sgn[I(\epsilon)]+Y_0,$$

or in the (optional) simplified form when A(t) is not present:

$$Ed(\epsilon) = [(dI_{NORM})/(\beta*Abs[I(\epsilon)])]*dI_1(\epsilon)+Y_0,$$

where $\beta = dI^T_{MAX}/Z^T$, with $Z^T$ being set to the value of $I(\epsilon)$ measured with the test signal applied to the antenna (or simulation equivalent thereof) and with the DLL at $\epsilon=\epsilon_0$. The ratio of $Sgn[I(\epsilon)]/Abs[I(\epsilon)]$ appears in the non-simplified forms of $Ed(\epsilon)$, which are the generalized forms. The ratio $Sgn[I(\epsilon)]/Abs[I(\epsilon)]$ is equivalent to the quantity $1/I(\epsilon)$, and thus the above general forms for $Ed(\epsilon)$ may be generated as:

$$Ed(\varepsilon) = [(dI_{NORM})/(\beta * I(\varepsilon))] * dI_1(\varepsilon) + Y_0,$$

$$= (dI_{NORM}/\beta) * [dI_1(\varepsilon)/I(\varepsilon)] + Y_0.$$

The generation of $Ed(\epsilon)$ may be carried out solely by DLL discriminator 28, and the receiver topology shown in FIG. 1 may be used.

To prevent numerical overflow and to prevent signal $Ed(\epsilon)$ from going to infinity when Z (or I) goes to zero, the value of Z (or I) may be truncated to a floor value before being used in the above equations. For digital implementations, this may be accomplished by setting Z=Max(Z, Z), where $Z_{MIN}$ is the floor value and where Max(*) is the maximum selection function which selected the maximum of its two inputs. This step may be performed in component 28. The analogous truncation step for I is I=Max(I, $Z_{MIN}$), and may be performed by DLL discriminator 28.

The second correlation signal I has a peak magnitude value $I_{MAX}$ over a range of the time shift $\epsilon$ from $-\Delta$ to $+\Delta$ for a given power level of the input code signal. Signal I also has a value $I_{E0}$ at the point $\epsilon_0$ of steady balance for that given power level. In preferred implementations, the time offset $\epsilon_K$ of the second reference code signal $S_K(t-\epsilon_K)$ is selected such that $I_{E0}$ is at least 90% of $I_{MAX}$. In this implementation, one may set the value $dI_0$ of the first correlation signal $dI_1$ at the point $\epsilon_0$ of steady balance to be between 5% and 10% of the peak magnitude value $dI_{MAX}$ of $dI_1$, as described above.

The above step of generating Z is susceptible to multipath errors due to delayed multipath signals. This is because the chip pulses of reference code $S_K(t-\epsilon_K)$ are relatively long (substantially equal to $\Delta$) and will therefore correlate multipath signals having less than a delay of $\Delta$ from the directly-received input signal. A solution to this problem is to use a strobed version of the reference code signal where the end portion of each chip pulse has been removed to prevent it from correlating with multipath signals. One example of such a reference code is $S'_K(t-\epsilon_K)$ shown at graph 424 in FIG. 13. Another such reference code is indicated as $S_N(t-\epsilon_N)$ and is shown at a graph 444 in FIG. 14. For reference, FIG. 14 also shows the input reference code at graph 401, the reference code $S_A(t)$ for generating $dI_1(\epsilon)$ at graph 422, and the reference code $S_K(t-\epsilon_K)$ for generating $I(\epsilon)$ at graph 423. An exemplary receiver topology for this approach is shown in FIG. 15, wherein an additional correlator 51 has been introduced and configured to correlate the inphase input signal from line 20 with reference code $S_N(t-\epsilon_N)$. Correlator 51 provides a correlation signal $I_N(\epsilon)$ as an output, which replaces $I(\epsilon)$ as an input for DLL discriminator 28. DLL discriminator 28 generates $Ed(\epsilon)$ as follows:

$$Ed(\epsilon)=(dI_{NORM}/\beta_N)*[dI_1(\epsilon)/I_N(\epsilon)]+Y_0,$$

where $\beta_N=dI^T_{MAX}/I^T_{N,E0}$, where $I^T_{MAX}$ and $I^T_{N,E0}$ are measured under test signal conditions, where $dI^T_{MAX}$ has its previously defined meaning, and where $I^T_{N,E0}$ is the value of $I_N(\epsilon)$ measured when the DLL is at the point $\epsilon_0$ of steady balance and with the test signal applied to the antenna. (These measurements may, of course, be done by computer simulations of the receiver channel.) Referring to FIG. 14, a novel feature of reference code $S_N(t-\epsilon_N)$ is that it is offset by a time offset $\epsilon_N$ from the front of reference code $S_A(t)$, which is used to generate $dI_1(\epsilon)$, with the time offset $\epsilon_N$ being greater than the time offset $\epsilon$ for the reference codes $S_K(t-\epsilon_K)$ and $S'_K(t-\epsilon_K)$ shown in graphs 423 and 424 of FIG. 13. The larger offset $\epsilon_N$ provides a larger neighborhood around the point $\epsilon_0$ of steady balance where the value of $I_N(\epsilon)$ has its maximum value $I_{N,MAX}$. This is shown by a set 720 of three graphs 701, 722 and 723 in FIG. 16. The first graph 701 shows the starting correlation signal $dI_1(\epsilon)$ as generated by reference code $S_A(t)$, and was previously shown in FIG. 12. Graph 722 shows correlation signal $I_N(\epsilon)$ with the offset $\epsilon_N$, and graph 723 shows $Ed(\epsilon)$. As can be seen in graph 722, signal $I_N(\epsilon)$ has a neighborhood on either side of point $\epsilon_0$ where it is at its maximum value $I_{N,MAX}$.

Signal $Ed(\epsilon)$ increases in region 733 of graph 723 due to the falling value of signal $I_N(\epsilon)$, which is the divisor. To prevent numerical overflow in region 733 and other places, and to thereby to prevent signal $Ed(\epsilon)$ from going to infinity when $I_N(\epsilon)$ goes to zero, the value of $I_N(\epsilon)$ may be truncated to a floor value before being used in the above equations, as indicated above. For digital implementations, this may be accomplished by setting $I_N(\epsilon)=Max(I_N(\epsilon), I_{N,MIN})$, where $I_{N,MIN}$ is a small value and is typically smaller than the smallest expected value for $I_{N,MAX}$ under normal operating conditions.

Thus, the second correlation signal $I_N$ has a peak magnitude value $I_{N,MAX}$ over a range of the time shift $\epsilon$ from $-\Delta$ to $+\Delta$ for a given power level of the input code signal, and also has a value $I_{N,E0}$ at the point $\epsilon_0$ of steady balance for that given power level. In preferred implementations, the time offset $\epsilon_N$ of the second reference code signal $S_N(t-\epsilon_N)$ is selected such that $I_{N,E0}$ is at least 90% of $I_{N,MAX}$. In this regard, there is a range of values of the time offset $\epsilon$ for which the magnitude of the value $I_{N,E0}$ is at least 90% of $I_{MAX}$, with this range having a minimum value and a maximum value for $\epsilon_N$. In preferred implementations, the value of $\epsilon$ is closer to this minimum value of the range than said maximum value, and is preferably set at the minimum value.

In this and other implementations, the value $dI_0$ of first correlation signal $dI_1$ at the point $\epsilon_0$ of steady balance may be set to be between 5% and 10% of the peak magnitude value $dI_{MAX}$ of $dI_1$, as described above. Also, by making the pulse width $D_N$ of the second reference code signal $S_N(*)$ equal to the pulse width $D_A$ of the first reference code signal $S_A(*)$, $S_N(*)$ may be generated substantially as a scaled replica of $S_A(*)$ (but shifted in time). In such a case, the generation of $S_N(*)$ will still be offset in time with respect to the generation of $S_A(*)$. Whenever we say that one reference code is a scaled replica of another, we mean that it is a replica with different amplitude scaling or an identical replica (scaling=1); a substantially scaled replica is the same except that a small percentage (e.g., less than 5%) of the strobes may not be exactly replicated.

We now describe another way in which a signal representative of the input signal level $Z_{IN}$ may be generated. This method is most useful for incoherent receiver structures, which were previously described.

In this method, the one method, the input signal is incoherently demodulated by forming two quadrature components of the input signal therefrom. Specifically, the input signal is received and multiplied by an independent quadrature reference signal (e.g., $\cos(\omega_0 t)$, $\sin(\omega_0 t)$) using two multipliers to generate two quadrature signals $C_{IN}$ and $S_{IN}$. The output of QADC 13 shown in FIG. 2 provides such signals at lines 20 and 21, respectively; QADC 13 was previously described in the description of FIGS. 1 and 2. (The phase and frequency of the independent quadrature reference signal are not controlled to match the phase and frequency of the carrier of the input signal, and so this demodulation is of the incoherent type.) Next, the quadrature signals $C_{IN}$ and $S_{IN}$ are each separately correlated by respective correlators against a scaled replica of the input PR-code to generate two respective correlation signals $I_O$ and $Q_O$.

The signal level Z is then generated by squaring the values of $I_O$ and $Q_O$, adding the squared values, and then taking the square-root ($Z=[I_O^2+Q_O^2]^{1/2}$). However, other steps may be used to generate Z, such as an approximation formula for $Z=[I_O^2+Q_O^2]^{1/2}$, interpolation look-up table, etc. One approximation of Z is:

$$Z \approx [\text{Max}\{\text{Abs}(I_O)+2\cdot\text{Abs}(Q_O), 2\cdot\text{Abs}(I_O)+\text{Abs}(Q_O)\}]/(2.11803),$$

where Abs(*) function is the absolute value function, and where the Max(A,B) function is the maximum one of its two parameters A and B. The maximum error in this approximation is ±5.6%.

Z is proportional to the input signal level and does not depend upon the phase of the carrier signal. However, Z is dependent upon the DLL system being in a close neighborhood around the point $\epsilon_0$ of steady balance. As the time shift $\epsilon$ moves away from the point $\epsilon_0$ of steady balance, Z decreases monotonically to zero. Thus, $Z(\epsilon)$ is an approximation to the true measure of input signal level $Z_{IN}$, but is very good approximation in a small neighborhood around the point $\epsilon_0$ of steady balance. The measured value of $Z^T$ used above is found by measuring Z at the point $\epsilon_0$ of steady balance.

Fourth General Normalization Approach.

In the fourth general normalization approach, the normalization is achieved by directly generating the displacement Y as a function of the input signal level $Z_{IN}$ (or an approximation thereof), which is represented as $Y(Z_{IN})$, and by having DLL discriminator 28 generate the displacement $Y(Z_{IN})$ and add it to correlation signal $dI_1(\epsilon)$. The form of $Y(Z_{IN})$ may be readily obtained by dividing the form of $Ed(\epsilon)$ generated in the third general approach by $1/K(Z_{IN})$. In the third general approach, $K(Z_{IN})$ was approximated in a neighborhood around the point $\epsilon_0$ of steady balance as follows:

$$K(Z_{IN}) \approx K(Z) = [dI_{NORM}/(\beta^*Z)], \text{ with } \beta = dI^T_{MAX}/Z^T.$$

Carrying out the division, we have that $Ed'(\epsilon)$ of this embodiment may be generated as:

$$Ed'(\varepsilon) = dI_1(\varepsilon) * \text{Sgn}[I(\varepsilon)] + Y_0 * [dI_{\text{MAX}}(Z_{IN})/dI_{NORM}]$$
$$= dI_1(\varepsilon) * \text{Sgn}[I(\varepsilon)] + Y_0 * [(\beta*Z)/dI_{NORM}].$$

The quantity $[(\beta^*Y_0)/dI_{NORM}]$ may be defined as the constant quantity "q", and the above form may be equivalently generated as:

$$Ed'(\epsilon) = dI_1(\epsilon)*\text{Sgn}[I(\epsilon)] + q^*Z.$$

In preferred embodiments, the value of $\beta$ (or equivalently q) and the value of point co are selected such that the magnitude of displacement Y is between 5% and 10% of the peak magnitude $dI_{MAX}$, for a given input signal level. The above form of $Ed'(\epsilon)$ may be used whether or not the low-frequency information signal A(t) is present. If A(t) is not present, then $Ed'(\epsilon)$ may be more simply (and optionally) generated as:

$$Ed'(\epsilon) = dI_1(\epsilon) + Y_0*[(\beta^*Z)/dI_{NORM}] = dI_1(\epsilon) + q^*Z.$$

In this approach, the value of q (meaning its sign and magnitude) sets the location of said point $\epsilon_0$ of steady balance, and thus may select its value for the desired position. The correlation signal $dI_1(\epsilon)$ is not scaled, and therefore the quantity $dI_{NORM}$ is not related to an observable quantity. Nonetheless, the quantity $dI_{NORM}$ provides a meaningful way of relating this approach to the previous approach, and is helpful in selecting the value of $Y_0$ in a normalized context. If $dI_{NORM}$ is not desired, it may be set to a value of 1 in the above equations for the fourth normalization approach. If desired, the above forms for $Ed'(\epsilon)$ may be further scaled by a constant value (by effectively multiplying each side by a constant). The above methods of the fourth general normalization approach may be implemented by any of the receiver topologies shown in FIGS. 1 and 15, where DLL discriminator 28 may be used to generate $Ed'(\epsilon)$ in the above forms.

Z may be generated by any of the other above described methods for generating Z, including generating $Z=\text{Abs}(I(\epsilon))$ when coherent demodulation is used. The latter approach generates $Ed'(\epsilon)$ as follows:

$$Ed'(\epsilon) = dI_1(\epsilon)*\text{Sgn}[I(\epsilon)] + q^*\text{Abs}(I(\epsilon)),$$

and may be implemented by the receiver topology shown in FIG. 1, where discriminator 28 generates $Ed'(\epsilon)$ in the above form, where strobe signal $S_A(t)$ (422 in FIG. 13) is used for signal S(t) in FIG. 1, and where the output 27 of DLL correlator 22 provides correlation signal $dI_1(*)$. (when using the receiver of FIG. 1, one substitutes strobe signal $S_A(t)$ for S(t), and uses the output of DLL correlator 22 to provide correlation signal $dI_1(*)$). In this form, Y is proportionally related to the peak magnitude of the input code signal through the term Abs(I($\epsilon$)). If A(t) is not present, the above form may be used or the following simplified (and optional) form may be used:

$$Ed'(\epsilon) = dI_1(\epsilon) + q^*I(\epsilon), \text{ where } Y=q^*I(\epsilon).$$

The input signal level Z may also be generated on the basis of the correlation signal IN previously described above, and $Ed'(\epsilon)$ may be generated as:

$$Ed'(\varepsilon) = dI_1(\varepsilon) * \text{Sgn}[I(\varepsilon)] + Y_0 * [(\beta_N*\text{Abs}(I_N(\varepsilon)))/dI_{NORM}]$$
$$= dI_1(\varepsilon) * \text{Sgn}[I(\varepsilon)] + q_N * \text{Abs}(I_N(\varepsilon)),$$

where $q_N=Y_0*[\beta_N/dI_{NORM}]$. $\beta_N$ has its previous definition of $\beta_N=dI^T_{MAX}/I^T_{N,E0}$, where $I^T_{MAX}$ and $I^T_{N,E0}$ are measured under test signal conditions (or with computer simulations), where $dI^T_{MAX}$ has its previously defined meaning, and where $I^T_{N,E0}$ is the value of $I_N(\epsilon)$ measured when the DLL is at the point $\epsilon_0$ of steady balance and with the test signal applied to the antenna. As before, the second reference code $S_N(*)$ can be a scaled replica of the first reference code signal (but shifted in time). An exemplary receiver topology for this approach is shown in FIG. 15, wherein correlator 51 has been configured to correlate the inphase input signal from line 20 with reference code $S_N(t-\epsilon_N)$ and thereby generate signal $I_N(\epsilon)$. The dashed line from correlator 35 to DLL discriminator 28 provides I($\epsilon$) to DLL discriminator 28 for the purpose of generating Sgn[I($\epsilon$)], if it is used. The reference codes for generating the correlation signals are shown in FIG. 14 and were previously described. A set 740 of graphs in FIG. 17 shows the form of $Ed'(\epsilon)$ at a graph 743, along with correlation signal $dI_1(\epsilon)$ at graph 701 and correlation signal $I_N(\epsilon)$ at graph 722. The curve of $Y(Z)=Y(\epsilon)=q_N*\text{Abs}(I_N(\epsilon))$ is shown in graph 743. The parameter $Y_0$ has a negative value.

The above form of $Ed'(\epsilon)$ may be used whether or not the low-frequency information signal A(t) is present. If A(t) is not present, then $Ed'(\epsilon)$ may be more simply (and optionally) generated as:

$$Ed'(\epsilon)=dI_1(\epsilon)+q_N{}^*I_N(\epsilon).$$

Combination of General Normalization Approaches.

It may be appreciated that the two above general approaches may be combined to split the scaling function among scaling correlation signal $dI_1(\epsilon)$ and scaling the Y-displacement. To summarize, the previously-described third approach has:

$$Ed(\epsilon)=K(Z)^*dI_1(\epsilon)^*\text{Sgn}[I(\epsilon)]+Y_0,$$

and the previously described fourth approach has:

$$Ed'(\epsilon)=dI_1(\epsilon)^*\text{Sgn}[I(\epsilon)]+Y_0/K(Z).$$

A combined approach may have:

$$Ed''(\epsilon)=[K(Z)]^{1/2}{}^*dI_1(\epsilon)^*\text{Sgn}[I(\epsilon)]+Y_0/[K(Z)]^{1/2}.$$

The use of Different Forms for $dI_1(\epsilon)$.

It may be appreciated that different correlation signals may be used in place of the form of $dI_1(\epsilon)$ shown at graph 701 in FIG. 12. An exemplary different form is shown in FIG. 18 at a graph 741, which is one of three graphs in a set of graphs 740. The different form of $dI_1(\epsilon)$ has a zero point near point $\epsilon=0$, a first portion in the leading direction ($\epsilon<0$) which has a negative value $-dI_{MAX}$ for a time duration of substantially a chip duration $\Delta$, and a second portion in the lagging direction ($\epsilon>0$) which has a positive value $+dI_{MAX}$ for a time duration of substantially a chip duration $\Delta$. The correlation signal is substantially zero on either side of these portions, and has two transition regions where the signal changes from $\pm dI_{MAX}$ to zero: one to the left side of the first portion, and one to the right side of the second portion. Also, the correlation signal has a transition region between the first and second portions where the signal changes from $-dI_{MAX}$ to $+dI_{MAX}$.

The form of $dI_1(\epsilon)$ shown in graph 741 is optionally normalized in graph 742 by any of the above normalization approaches, and a displacement Y is added to generate $Ed(\epsilon)$, which is shown in graph 743. A left zero point 710 and right zero point 711 are created, and left zero point 710 is preferably selected as the point $\epsilon_0$ of steady balance. Each of the zero points is located in one of the above noted transition regions. The selection of point 710 as $\epsilon_0$ is accomplished by having the feedback loop of the DLL retard the generation of the DLL reference code in time when $Ed(\epsilon)$ is positive, and advance the generation of the DLL reference code in time when $Ed(\epsilon)$ is negative.

As one difference with previously-described Y-displacement embodiments, the point $\epsilon_0$ of steady balance is advanced from the point $\epsilon=0$ by a time offset which is on the order of one chip duration $\Delta$. A reference code $S_B(t)$ which may be used to generate the form of $dI_1(\epsilon)$ of graph 741 is shown in shown in FIG. 19 at a graph 462. Graph 462 is one of a set 460 of graphs. Also shown in FIG. 19 are the input reference code at graph 401, and the previously-described reference codes $S_N(t)$ and $S_K(t-\epsilon_K)$ at graphs 444 and 404, respectively. The latter reference codes may be used for the optional normalization step in any of the above described methods. Referring to graph 462, reference code $S_B(\epsilon)$ is similar to reference code $S_A(\epsilon)$ in that it comprises a plurality of pulses spaced at intervals of the chip duration $\Delta$, with each pulse having a polarity which corresponds to the polarity of the respective chip in the satellite reference code that is being tracked. However, $S_A(t)$ is different in that the magnitude of a pulse is zero if the preceding chip has the same polarity. (In this case, a pulse of zero magnitude is equivalent to not generating a pulse.) The correspondence between the pulses of $S_B(t)$ and the chips of the input PR-reference code of graph 401 is indicated by a set of arrows 461 between graphs 462 and 401 in FIG. 19. As a second difference with reference code $S_A(t)$, the point $\epsilon_0$ of steady balance for reference code $S_B(t)$ is moved in the advancing direction by approximately one chip duration $\Delta$ with respect to the point of steady balance for reference code $S_A(t)$.

Reference code $S_B(t)$ may be equivalently defined as follows. Reference code $S_B(t)$ comprises a repeating sequence of pulses, each pulse having a duration $D_B$ (equal to or less than the chip duration $\Delta$), a magnitude $S_B$, and a position and polarity which are related to the underlying preselected series of numbers which is used as the basis for the input PR-code being tracked. The numbers in the preselected series have either a positive value or a negative value; and for GPS and GLN PR-codes the series may be represented by two numbers, +1 and −1, or +M and −M, without loss of generality. A exemplary preselected series may be $\{+1, +1, -1, +1, -1, -1, +1, \ldots\}$. For each number in the preselected series, reference code $S_B(t)$ spans one chip duration $\Delta$. In each of its chip durations $\Delta$, reference code $S_B(t)$ has a non-zero pulse if the corresponding number in the preselected series has a different polarity from the preceding number in the series, and has substantially no pulse (or a pulse of zero magnitude) if the corresponding number has the same polarity as the preceding number. For the first number in the series, the polarity is compared to the polarity of the last number in the preselected series. When a polarity change occurs in the preselected series, the polarity of the non-zero pulse is set to be the same as the polarity of the corresponding number in the preselected series (As another implementation, the polarity of the non-zero pulse may be set to be the opposite polarity of the corresponding number in the preselected series, which would generate $-S_B(t)$.) Thus, reference code $S_B(t)$ has non-zero pulses whose locations correspond to polarity changes in the underlying preselected series of numbers for the code. The pulses are spaced from one another at integral numbers of the chip duration $\Delta$ as determined by polarity changes in the preselected series (although slight variations from strict spacing of an integral number of durations $\Delta$ are permissible).

It may be appreciated that reference codes $S_A(t)$ and $S_B(t)$ may be generally described as comprising a repeating sequence of strobes, with the start of each strobe being spaced in time from the start of the next strobe by an integer number of chip durations $\Delta$. In the case of reference code $S_A(t)$, the integer number is always 1. In the case of reference code $S_B(t)$, a strobe is generated for each polarity change between consecutive chips; if there is no polarity change, no strobe is generated. Thus, for reference code $S_B(t)$, the integer number of chip durations $\Delta$ between two consecutive strobes depends upon the structure of the code, and is equal to one (1) plus the number consecutive chips between the consecutive probes in which the chip polarities do not change. The strobes of reference codes $S_A(t)$ and $S_B(t)$ have a duration equal to or less than the chip duration $\Delta$ and comprise at least one pulse, the values of the pulses being related to the preselected series of numbers, and more specifically to the respective numbers in the pre-selected series.

The use of reference code $S_B(t)$ and its corresponding correlation signal has an advantage over the use of reference code $S_A(t)$ and its corresponding correlation signal. This advantage is that reference code $S_B(t)$ is not influenced as much by noise and other satellite signals since it only has pulses in regions where the satellite reference code changes polarity.

Any of the above-described normalization approaches may be used with reference code $S_B(t)$ and its corresponding correlation signal. Also, no normalization may be used. In addition, the reference code signal $S_2(t)$ for the PLL loop may have a similar form as reference code signal $S_B(t)$.

While the present invention has been particularly described with respect to the illustrated embodiment, it will be appreciated that various alterations, modifications and adaptations may be made based on the present disclosure, and are intended to be within the scope of the present invention. While the invention has been described in connection with what is presently considered to be the most practical and preferred embodiment(s), it is to be understood that the present invention is not limited to the disclosed embodiment(s) but, on the contrary, is intended to cover various modifications and equivalent arrangements included within the scope of the appended claims.

What is claimed is:

1. A method of tracking an input code signal comprising a repeating sequence of chips, each chip having a time duration $\Delta$ and a value determined by a preselected series of numbers, each chip in the sequence corresponding to a respective number in the series, said method comprising the steps of:

(a) generating a reference code signal ($S(t)$) comprising a repeating sequence of strobes, the start of each strobe being spaced in time from the start of the next strobe by an integer number of chip durations $\Delta$, each strobe having a duration of less than $\Delta$ and having a non-zero average value over its duration, the average values of said strobes being related to the preselected series of numbers, said reference code signal being generated such that the start of its strobe sequence may be adjusted in time with an adjustable time shift $\epsilon$ from the start of the sequence of the input code signal, the value of said time shift $\epsilon$ having a first polarity when the sequence start of the reference code signal leads the sequence start of the input code signal and a second polarity opposite to said first polarity when the sequence start of the reference code signal lags the sequence start of the input code signal, said time shift $\epsilon$ moving in a leading direction when the sequence start of the reference code is advanced in time and moving in a lagging direction when the sequence start of the reference code is retarded in time;

(b) generating a correlation signal (dI) related to the correlation of the input code signal and said reference code signal, the value of said correlation signal being a function of said time shift $\epsilon$ and being equal to zero when said time shift $\epsilon$ is at a point $\epsilon_0$, the value of said correlation signal having a first polarity when said time shift $\epsilon$ moves in the leading direction away from said point $\epsilon_0$ and a second polarity opposite to said first polarity when said time shift $\epsilon$ moves in the lagging direction away from said point $e_0$, said correlation signal further having a first peak value ($dI_E$) when said time shift $\epsilon$ moves in the leading direction away from said point $\epsilon_0$ and having a second peak value ($dI_L$) when said time shift $\epsilon$ moves in the lagging direction away from said point $\epsilon_0$, the second peak value ($dI_L$) being greater than the first peak value ($dI_E$); and (c) adjusting said time shift $\epsilon$ in response to the value of said correlation signal to move said time shift $\epsilon$ towards said point $\epsilon_0$, said correlation signal indicating that said time shift $\epsilon$ should be advanced when the value of the correlation signal has its second polarity and indicating that said time shift $\epsilon$ should be retarded when the value of the correlation signal has its first polarity, said point $\epsilon_0$ thereby being a point of steady balance and the generation of said reference code signal thereby tracking the input code signal by being adjusted toward maintaining a constant time shift between the sequence starts of the two code signals.

2. The method of claim 1 wherein the preselected series of numbers comprises a pseudo-random code sequence, and wherein each number in the series is either −1 or +1.

3. The method of claim 1 wherein the magnitude of the second peak value ($dI_L$) is at least five times the magnitude of the first peak value ($dI_E$)($|dI_L| \geq |5dI_E|$).

4. The method of claim 1 wherein the magnitude of the second peak value ($dI_L$) is between five times and ten times the magnitude of the first peak value ($dI_E$).

5. The method of claim 1 wherein each strobe of said reference code signal comprises a first pulse and a second pulse, said second pulse following said first pulse in time;

wherein each said pulse has a value, a time duration, and a time-integrated magnitude (area) which is the integral of the pulse's absolute value during the pulse's time duration;

wherein the second pulse in each strobe has a value which is opposite in polarity to that of the first pulse in the strobe; and wherein the time-integrated magnitudes of the first and second pulses in each said strobe are different.

6. The method of claim 5 further comprising the step of selecting the time-integrated magnitudes of the first and second pulses of said strobes such that the magnitude of the second peak value ($dI_L$) of said correlation signal is at least five times the magnitude of the first peak value of said correlation signal ($dI_E$)($|dI_L| \geq |5dI_E|$).

7. The method of claim 5 further comprising the step of selecting the time-integrated magnitude of one pulse in at least one said strobe to have a magnitude which is at least two times the time-integrated magnitude of the other pulse in said strobe.

8. The method of claim 7 further comprising the step of selecting the time-integrated magnitude of one pulse in at least one said strobe to have a magnitude which is between four times and eight times the time-integrated magnitude of the other pulse in said strobe.

9. The method of claim 1 wherein each number in the preselected series of numbers is either −1 or +1 and wherein the values of corresponding chips of said input code signal have corresponding values of either −M or +M;

wherein the input code signal is generated by the step of receiving a broadcasted satellite signal at an antenna, said broadcast satellite signal comprising a carrier signal which is modulated by code signal which comprises a repeating sequence chips whose values are based upon said preselected series of numbers, and further by the step of demodulating the received satellite signal to produce said input code signal;

wherein the input code signal has a transition period F in which it changes value between adjacent chips having different values, said duration F being equal to or less than one chip duration $\Delta$;

wherein said first peak value ($dI_E$) occurs when the slope of the correlation signal (dI) with respect to the time shift value $\epsilon$ first reaches zero as the time shift value $\epsilon$ moves in the leading direction from point $\epsilon_0$;

wherein said second peak value ($dI_L$) occurs when the slope of the correlation signal (dI) with respect to the time shift value $\epsilon$ first reaches zero as the time shift value $\epsilon$ moves in the lagging direction from point $\epsilon_0$;

wherein said correlation signal changes from said first peak value ($dI_E$) to said second peak value ($dI_L$) in a time shift distance of one duration F to three durations F (3*F).

10. The method of claim 1 wherein said step (a) of generating said reference code signal comprises the step of generating said reference code signal as a discrete-time signal which is provided at periodic intervals spaced from one another in time by a time duration T, and wherein said step (b) of generating said correlation signal comprises the step of digitizing the input code signal at periodic intervals spaced from one another in time by said time duration T.

11. The method of claim 10 wherein each number in the preselected series of numbers is either −1 or +1 and wherein the values of corresponding chips of said input code signal have corresponding values of either −M or +M;

wherein the input code signal is generated by the step of receiving a broadcasted satellite signal at an antenna, said broadcast satellite signal comprising a carrier signal which is modulated by code signal which comprises a repeating sequence chips whose values are based upon said preselected series of numbers, and further by the step of demodulating the received satellite signal to produce said input code signal;

wherein the input code signal has a transition period F in which it changes value between adjacent chips having different values, said duration F being less than one chip duration $\Delta$;

wherein said first peak value ($dI_E$) occurs when the slope of the correlation signal (dI) with respect to the time shift value $\epsilon$ first reaches zero as the time shift value $\epsilon$ moves in the leading direction from point $\epsilon_0$;

wherein said second peak value ($dI_L$) occurs when the slope of the correlation signal (dI) with respect to the time shift value $\epsilon$ first reaches zero as the time shift value $\epsilon$ moves in the lagging direction from point $\epsilon_0$;

wherein said correlation signal changes from said first peak value ($dI_E$) to said second peak value ($dI_L$) in a time shift distance of one front duration F to three front durations F (3*F).

12. The method of claim 1 wherein each number in the preselected series of numbers is either −1 or +1 and wherein the values of corresponding chips of said input code signal have corresponding values of either −M or +M, wherein the input code signal is generated by the step of receiving a broadcasted satellite signal at an antenna, said broadcast satellite signal comprising a carrier signal which is modulate by code signal which comprises a repeating sequence chips whose values are based upon said preselected series of numbers, and further by the step of demodulating the received satellite signal to produce said input code signal;

wherein the input code signal has a transition period F in which it changes value between adjacent chips having different values, said duration F being less than one chip duration $\Delta$; and wherein the time-shift distance from $\epsilon=0$ to said point $\epsilon_0$ is not more than twice the value of said duration F.

13. The method of claim 10 wherein each number in the preselected series of numbers is either −1 or +1 and wherein the values of corresponding chips of said input code signal have corresponding values of either −M or +M;

wherein the input code signal is generated by the step of receiving a broadcasted satellite signal at an antenna, said broadcast satellite signal comprising a carrier signal which is modulated by code signal which comprises a repeating sequence chips whose values are based upon said preselected series of numbers, and further by the step of demodulating the received satellite signal to produce said input code signal;

wherein the input code signal has a transition period F in which it changes value between adjacent chips having different values, said duration F being less than one chip duration $\Delta$; and wherein the time-shift distance from $\epsilon=0$ to said point $\epsilon_0$ is not more than twice the value of said duration F.

14. The method of claim 1 wherein, when the sequence start of the first reference code signal is aligned to the sequence start of the input code signal, the reference code signal ($S(t)=S_{P1}(t)$) has a strobe corresponding to each chip of the input code signal for which that chip has changed in value from the previous chip's value.

15. The method of claim 1 wherein, when the sequence start of the first reference code signal is aligned to the sequence start of the input code signal, the reference code signal ($S(t)=S_D(t)$) has a strobe corresponding to each chip of the input code signal, each said strobe comprising a pulse in which the time-integrated magnitude of the pulse depends upon whether the corresponding chip in the input code signal has changed in value from the previous chip's value.

16. The method of claim 1 comprising the step of initially setting the time shift $\epsilon$ at a point which lags the point $\epsilon_0$ of steady balance before commencing the performance of step (c) of adjusting the time shift $\epsilon$.

17. A method of tracking an input code signal comprising a repeating sequence of chips, each chip having a time duration $\Delta$ and a value determined by a preselected series of numbers, each chip in the sequence corresponding to a respective number in the series, said method comprising the steps of:

(a) generating a reference code signal (S(t)) comprising a repeating sequence of strobes, the start of each strobe being spaced in time from the start of the next strobe by an integer number of chip durations $\Delta$, each strobe having a duration of less than $\Delta$ and having a non-zero average value over its duration, the average values of said strobes being related to the preselected series of numbers, said reference code signal being generated such that the start of its strobe sequence may be adjusted in time with an adjustable time shift $\epsilon$ from the start of the sequence of the input code signal, the value of said time shift $\epsilon$ having a first polarity when the sequence start of the reference code signal leads the sequence start of the input code signal and a second polarity opposite to said first polarity when the sequence start of the reference code signal lags the sequence start of the input code signal, said time shift $\epsilon$ moving in a leading direction when the sequence start of the reference code is advanced in time and moving in a lagging direction when the sequence start of the reference code is retarded in time;

(b) generating a correlation signal (dI) related to the correlation of the input code signal and said reference code signal, the value of said correlation signal being a function of said time shift $\epsilon$ and being equal to zero when said time shift $\epsilon$ is at a point $\epsilon_0$, said correlation signal having a first portion when said time shift $\epsilon$ moves away from said point $\epsilon_0$ in the leading direction and a second portion when said time shift $\epsilon$ moves away from said point $\epsilon_0$ in the lagging direction, the value of said correlation signal having a first polarity in said first portion and a second polarity in the second portion which is opposite to said first polarity, the value of said correlation signal further having a first peak value ($dI_E$) in said first portion and a first range ($L_E$) which includes values of the correlation signal which have said first polarity and whose magnitudes are at least 5% of the magnitude of the first peak value ($dI_E$), and further having a second peak value ($dI_L$) in said second portion and a second range ($L_L$) which includes values of the correlation signal which have said second polarity and whose magnitudes are at least 5% of the magnitude of the second peak value ($dI_L$), said second range ($L_L$) being greater than said first range ($L_E$); and (c) adjusting said time shift $\epsilon$ in response to the value of said correlation signal to move said time shift $\epsilon$ towards said point $\epsilon_0$, said correlation signal indicating that said time shift $\epsilon$ should be advanced when the value of the correlation signal has its second polarity and indicating that said time shift $\epsilon$ should be retarded when the value of the correlation signal has its first polarity, said point $\epsilon_0$ thereby being a point of steady balance and the generation of said reference code signal thereby tracking the input code signal by being adjusted toward maintaining a constant time shift between the sequence starts of the two code signals.

18. The method of claim 17 wherein said second range ($L_L$) is at least four times greater than said first range ($L_E$).

19. The method of claim 17 wherein said first range ($L_E$) is less than 20% of a chip time duration $\Delta$.

20. The method of claim 17 wherein said second range ($L_E$) is greater than 50% of a chip time duration $\Delta$.

21. The method of claim 17 wherein said step (a) of generating said reference code signal comprises the step of generating said reference code signal as a discrete-time signal which is provided at periodic intervals spaced from one another in time by a time duration T, and wherein said step (b) of generating said correlation signal comprises the step of digitizing the input code signal at periodic intervals spaced from one another in time by said time duration T.

22. The method of claim 21 wherein said first range ($L_E$) is not more than four front durations F (4*F) in time shift distance.

23. The method of claim 21 wherein each number in the preselected series of numbers is either –1 or +1 and wherein the values of corresponding chips of said input code signal have corresponding values of either –M or +M;

wherein the input code signal is generated by the step of receiving a broadcasted satellite signal at an antenna, said broadcast satellite signal comprising a carrier signal which is modulated by code signal which comprises a repeating sequence chips whose values are based upon said preselected series of numbers, and further by the step of demodulating the received satellite signal to produce said input code signal;

wherein the input code signal has a transition period F in which it changes value between adjacent chips having different values, said duration F being less than one chip duration $\Delta$;

wherein said first peak value ($dI_E$) occurs when the slope of the correlation signal (dI) with respect to the time shift value $\epsilon$ first reaches zero as the time shift value $\epsilon$ moves in the leading direction from point $\epsilon_0$;

wherein said second peak value ($dI_L$) occurs when the slope of the correlation signal (dI) with respect to the time shift value $\epsilon$ first reaches zero as the time shift value $\epsilon$ moves in the lagging direction from point $\epsilon_0$;

wherein said correlation signal changes from said first peak value ($dI_E$) to said second peak value ($dI_L$) in a time shift distance of not more than five front duration F (5*F).

24. The method of claim 17 wherein each number in the preselected series of numbers is either –1 or +1 and wherein the values of corresponding chips of said input code signal have corresponding values of either –M or +M;

wherein the input code signal is generated by the step of receiving a broadcasted satellite signal at an antenna, said broadcast satellite signal comprising a carrier signal which is modulated by code signal which comprises a repeating sequence chips whose values are based upon said preselected series of numbers, and further by the step of demodulating the received satellite signal to produce said input code signal;

wherein the input code signal has a transition period F in which it changes value between adjacent chips having different values, said duration F being less than one chip duration $\Delta$;

wherein said first peak value ($dI_E$) occurs when the slope of the correlation signal (dI) with respect to the time shift value $\epsilon$ first reaches zero as the time shift value $\epsilon$ moves in the leading direction from point $\epsilon_0$;

wherein said second peak value ($dI_L$) occurs when the slope of the correlation signal (dI) with respect to the time shift value $\epsilon$ first reaches zero as the time shift value $\epsilon$ moves in the lagging direction from point $\epsilon_0$;

wherein said correlation signal changes from said first peak value ($dI_E$) to said second peak value ($dI_L$) in a time shift distance of not more than five front duration F (5*F).

25. A method of tracking an input code signal comprising a repeating sequence of chips, each chip having a time duration $\Delta$ and a value determined by a preselected series of numbers, each chip in the sequence corresponding to a respective number in the series, said method comprising the steps of:

(a) generating a reference code signal (S(t)) comprising a repeating sequence of strobes, the start of each strobe being spaced in time from the start of the next strobe by an integer number of chip durations $\Delta$, each strobe having a duration of less than $\Delta$ and having an average value over its duration, the average values of said strobes being related to the preselected series of numbers, a plurality of said strobes having an asymmetric shape, each said asymmetric strobe comprising a first pulse and a second pulse which follows said first pulse in time, each said pulse having a value, a time duration, and a time-integrated magnitude (area) which is the integral of the pulse's absolute value during the pulse's time duration, said first and second pulses of each asymmetric strobe having opposite polarities and different time-integrated magnitudes, said reference code signal being generated such that the start of its strobe sequence may be adjusted in time with an adjustable time shift $\epsilon$ from the start of the sequence of the input code signal, the value of said time shift $\epsilon$ having a first polarity when the sequence start of the reference code signal leads the sequence start of the input code signal and a second polarity opposite to said first polarity when the sequence start of the reference code signal lags the sequence start of the input code signal, said time shift $\epsilon$ moving in a leading direction when the sequence start of the reference code is advanced in time and moving in a lagging direction when the sequence start of the reference code is retarded in time;

(b) correlating the input code signal and said reference code signal to generate a correlation signal (dI), the value of said correlation signal being a function of said time shift $\epsilon$ and being equal to zero when said time shift $\epsilon$ is at a point $\epsilon_0$, the value of said correlation signal having a first polarity when the sequence start of the reference code signal moves in the leading direction away from the time shift value $\epsilon_0$ and a second polarity opposite to said first polarity when said sequence start moves in the lagging direction away from the time shift value $\epsilon_0$; and (c) adjusting said time shift $\epsilon$ in response to the value of said correlation signal to move said time shift $\epsilon$ towards said point $\epsilon_0$, said correlation signal indicating that said time shift $\epsilon$ should be advanced when the value of the correlation signal has its second polarity and indicating that said time shift $\epsilon$ should be retarded when the value of the correlation signal has its first polarity, said point $\epsilon_0$ thereby being a point of steady balance and the generation of said reference code signal thereby tracking the input code signal by being adjusted toward maintaining a constant time shift between the sequence starts of the two code signals.

26. The method of claim 25 wherein the preselected series of numbers comprises a pseudo-random sequence of numeric values, the numeric values being selected from the group of –1 and +1.

27. The method of claim 25 further comprising the step of selecting the time-integrated magnitude of one pulse in at least one of said asymmetric strobes to have a magnitude which is at least two times the time-integrated magnitude of the other pulse in said asymmetric strobe.

28. The method of claim 25 further comprising the step of selecting the time-integrated magnitude of one pulse in at least one of said asymmetric strobes to have a magnitude which is between two times and four times the time-integrated magnitude of the other pulse in said asymmetric strobe.

29. The method of claim 25 further comprising the step of selecting the time duration of one pulse in at least one of said asymmetric strobes to be at least twice as long as the time duration of the other pulse in said asymmetric strobe.

30. The method of claim 25 further comprising the step of selecting the time duration of the first pulse in at least one of said asymmetric strobes to be at least twice as long as the time duration of the second pulse in said asymmetric strobe.

31. The method of claim 25 further comprising the step of selecting the value of one pulse in at least one of said asymmetric strobes has a magnitude which is at least twice as large as the magnitude of the other pulse in said asymmetric strobe.

32. The method of claim 25 further comprising the step of selecting the value of the first pulse in at least one of said asymmetric strobes has a magnitude which is at least twice as large as the magnitude of the second pulse in said asymmetric strobe.

33. The method of claim 25 wherein said step (a) of generating said reference code signal comprises the step of generating said reference code signal as a discrete-time signal which is provided at periodic intervals spaced from one another in time by a time duration T, and wherein said step (b) of correlating the input code signal and said reference code signal comprises the step of digitizing the input code signal at periodic intervals spaced from one another in time by said time duration T.

34. The method of claim 33 wherein each number in the preselected series of numbers is either –1 or +1 and wherein the values of corresponding chips of said input code signal have corresponding values of either –M or +M;

wherein the input code signal is generated by the step of receiving a broadcasted satellite signal at an antenna, said broadcast satellite signal comprising a carrier signal which is modulated by code signal which comprises a repeating sequence chips whose values are based upon said preselected series of numbers, and further by the step of demodulating the received satellite signal to produce said input code signal;

wherein the input code signal has a transition period F in which it changes value between adjacent chips having different values, said duration F being less than one chip duration $\Delta$;

wherein the duration of each of said first and second pulses in said asymmetric strobes is not more than three front durations F.

35. The method of claim 33 wherein a plurality of said asymmetric strobes have a first pulse which has a time duration of not more than three front durations and a second pulse which has a time duration of not more than two front durations F.

36. A method of tracking an input carrier signal which is modulated by an input code signal, said input code signal comprising a repeating sequence of chips, each chip having a time duration $\Delta$ and a value determined by a preselected series of numbers, each chip in the sequence corresponding to a respective number in the series, said method comprising the steps of:

(a) generating a reference carrier signal such that its phase may be adjusted, the difference in the phases between the input carrier signal and said reference carrier signal being indicated by a difference $\phi_P$;

(b) frequency down-converting the modulated input carrier signal using said reference carrier signal to generate an in-phase baseband code signal representative of the input code signal and a quadrature baseband code signal representative of the input code signal;

(c) generating a first reference code signal (S(t)) comprising a repeating sequence of strobes, the start of each strobe being spaced in time from the start of the next strobe by an integer number of chip durations $\Delta$, each strobe having a duration of less than the chip duration $\Delta$ and comprising at least a first pulse, the values of said first pulses being related to the preselected series of numbers, said first reference code signal being generated such that the start of its strobe sequence may be adjusted in time with an adjustable time shift $\epsilon$ from the start of the sequence of the input code signal;

(d) generating a second reference code signal ($S_2(t-\epsilon_S)$) comprising a repeating sequence of strobes, the start of each strobe being spaced in time from the start of the next strobe by an integer number of chip durations $\Delta$, each strobe having a duration of less than the chip duration $\Delta$ and comprising at least a pulse, the values of said pulses being related to the preselected series of numbers, said second reference code signal being generated such that its sequence start is displaced from the sequence start of the first reference code signal by a time offset $\epsilon$, the magnitude of said time offset $\epsilon_S$ being between zero and one chip duration $\Delta$;

(e) generating a first correlation signal (dI) related to the correlation of the in-phase baseband code signal and said first reference code signal, the value of said first correlation signal being a function of said time shift $\epsilon$;

(f) adjusting said time shift $\epsilon$ to move it toward a predetermined point $\epsilon_0$ of steady balance by advancing or retarding the generation of the first and second reference code signals in time based on the value of said first correlation signal;

(g) generating a second correlation signal (dQ) related to the correlation of the quadrature baseband code signal and said second reference code signal, the value of said second correlation signal being a function of said time shift $\epsilon$ and said phase difference $\phi_P$, said second correlation signal having a value which varies in relation to the quantity $\sin(\phi_P)$, said second correlation signal further having a non-zero value $dQ_0$ when said time shift $\epsilon$ is at said predetermined point $\epsilon_0$ and said phase difference $\phi_P$ is at a value of $(K+\frac{1}{2})\pi$ for any integer K, the magnitude of said second correlation signal decreasing from the magnitude of $dQ_0$ by a first incremental amount when said time shift $\epsilon$ is advanced from said predetermined point $\epsilon_0$ by an amount of $0.1\Delta$ and changing by a second incremental amount when said time shift $\epsilon$ is retarded from said point $\epsilon_0$ by an amount of $0.1\Delta$, said first incremental amount being larger than said second incremental amount; and (h) adjusting the phase of said reference carrier signal based on the value of said second correlation signal to cause said phase difference $\phi_P$ to move toward a value of zero.

37. The method of claim 36 wherein each number in the preselected series of numbers is either −1 or +1 and wherein the values of corresponding chips of said input code signal have corresponding values of either −M or +M;

wherein the input code signal is generated by the step of receiving a broadcasted satellite signal at an antenna, said broadcast satellite signal comprising a carrier signal which is modulated by code signal which comprises a repeating sequence chips whose values are based upon said preselected series of numbers, and further by the step of demodulating the received satellite signal to produce said input code signal;

wherein the input code signal has a transition period F in which it changes value between adjacent chips having different values, said duration F being less than one chip duration $\Delta$;

wherein said second correlation signal (dQ) has, when said phase difference $\phi_P$ is at a value of $(K+\frac{1}{2})\pi$, a peak value $dQ_{MAX}$ at time shift $\epsilon$ value different from said point $\epsilon_0$, wherein the magnitude of $dQ_0$ is at least 70% of the magnitude of $dQ_{MAX}$, and wherein the magnitude of said second correlation signal decreases from the magnitude of $dQ_0$ to less than 10% of the magnitude of $dQ_{MAX}$ when said time shift $\epsilon$ is advanced from said point $\epsilon_0$ by an amount of duration F.

38. The method of claim 37 wherein the magnitude of $dQ_0$ is not more than 90% of the magnitude of $dQ_{MAX}$.

39. The method of claim 36 wherein said step (d) of generating said second reference code signal comprises the step of generating said second reference code signal as a discrete-time signal which is provided at periodic intervals spaced from one another in time by a time duration T, wherein said step (g) of generating said correlation signal comprises the step of digitizing the input code signal at periodic intervals spaced from one another in time by said time duration T.

40. The method of claim 39 wherein each number in the preselected series of numbers is either −1 or +1 and wherein the values of corresponding chips of said input code signal have corresponding values of either −M or +M;

wherein the input code signal is generated by the step of receiving a broadcasted satellite signal at an antenna, said broadcast satellite signal comprising a carrier signal which is modulated by code signal which comprises a repeating sequence chips whose values are based upon said preselected series of numbers, and further by the step of demodulating the received satellite signal to produce said input code signal;

wherein the input code signal has a transition period F in which it changes value between adjacent chips having different values, said duration F being less than one chip duration $\Delta$;

wherein said second correlation signal (dQ) has a peak value $dQ_{MAX}$ which occurs when the slope of the second correlation signal (dQ) with respect to the time shift value $\epsilon$ first reaches zero as the time shift value $\epsilon$ moves in the lagging direction from point $\epsilon_0$;

wherein the magnitude of $dQ_0$ is at least 70% of the magnitude of $dQ_{MAX}$; and wherein the magnitude of said second correlation signal decreases from the magnitude of $dQ_0$ to less than 10% of the magnitude of $dQ_{MAX}$ when said time shift $\epsilon$ is advanced from said point $\epsilon_0$ by an amount of not more than five front durations F (5F).

41. The method of claim 36 wherein each of the pulses of said second reference code signal comprises a rectangular shape and has a duration "d" of less than the chip duration $\Delta$, and wherein said second reference code signal is generated such that the start of each of its pulses is displaced in time from a respective strobe of said first reference code signal by said time offset $\epsilon_S$; and wherein said time offset $\epsilon_S$ is constant.

42. The method of claim 41 where the step (g) of generating said second correlation signal comprises the step of selecting the values of $\epsilon_S$ and d to provide the values of $dQ_0$, the first incremental amount, and the second incremental amount.

43. The method of claim 41 wherein each number in the preselected series of numbers is either −1 or +1 and wherein the values of corresponding chips of said input code signal have values of either −M or +M;

wherein the input code signal is generated by the step of receiving a broadcasted satellite signal at an antenna, said broadcast satellite signal comprising a carrier signal which is modulated by code signal which comprises a repeating sequence chips whose values are based upon said preselected series of numbers, and further by the step of demodulating the received satellite signal to produce said input code signal;

wherein the input code signal has a transition period F in which it changes value between adjacent chips having different values, said duration F being less than one chip duration $\Delta$; and wherein the value of d is between F/2 and 2F.

44. The method of claim 36 wherein, when the sequence start of the second reference code signal ($S_2(t)$) is aligned to the sequence start of the input code signal, the reference code signal has a strobe corresponding to each chip of the input code signal for which that chip has changed in value from the previous chip's value.

45. A method of tracking an input code signal, said input code signal comprising a repeating sequence of chips, each chip having a time duration $\Delta$ and a value determined by a preselected series of numbers, each chip in the sequence corresponding to a respective number in the series, said method comprising the steps of:

(a) generating a reference code signal ($S_A(t)$ or $S_B(t)$) comprising a repeating sequence of strobes, the start of each strobe being spaced in time from the start of the next strobe by an integer number of chip durations $\Delta$, each strobe having a duration equal to or less than the chip duration $\Delta$ and comprising at least a first pulse, the values of said first pulses being related to the preselected series of numbers, said first reference code signal being generated such that the start of its strobe sequence may be adjusted in time with an adjustable time shift $\epsilon$ from the start of the sequence of the input code signal, the value of said time shift $\epsilon$ having a first polarity when the sequence start of the first reference code signal leads the sequence start of the input code signal and a second polarity opposite to said first polarity when the sequence start of the first reference code signal lags the sequence start of the input code signal, said time shift $\epsilon$ moving in a leading direction when the sequence start of the first reference code signal is advanced in time and moving in a lagging direction when the sequence start of the first reference code signal is retarded in time;

(b) generating a first correlation signal ($dI_1$) related to the correlation of the input code signal and said first reference code signal, said first correlation signal having a value which is a function of said time shift $\epsilon$, said first correlation signal further having a first range of values in said time shift $\epsilon$ between a first point $\epsilon_A$ and a second point $\epsilon_B$ where the signal's value is non-zero and a second range of values in said time shift $\epsilon$ between said first point $\epsilon_A$ and a third point $\epsilon_C$ where the signal's value is zero, said first correlation signal further having a point $\epsilon_0$ within said first range where the signal's value is non-zero and has a non-zero rate of change with respect to a change in said time shift $\epsilon$ away from said point $\epsilon_0$ in each of the leading and lagging directions, said second range being adjacent to said first range such that said time shift $\epsilon$ is advanced to move from said point $\epsilon_0$ to a point within the second range;

(c) generating a control signal (Ed or Ed') from said first correlation signal, said control signal having a value which is a function of said time shift $\epsilon$, said value being zero at said point $\epsilon_0$ and having a non-zero rate of change at said point $\epsilon_0$ with respect to a change in said time shift $\epsilon$ away from said point $\epsilon_0$ in each of the leading and lagging directions, the value of said control signal having a first polarity when said time shift $\epsilon$ moves in the leading direction away from said point $\epsilon_0$ and a second polarity opposite to said first polarity when said time shift $\epsilon$ moves in the lagging direction away from said point $\epsilon_0$; and (d) adjusting said time shift $\epsilon$ to move it toward said point $\epsilon_0$ by advancing the generation of the first reference code signal in time when the value of the control signal has its second polarity and retarding the generation of the first reference code signal in time when the value of the control signal has its first polarity, said point $\epsilon_0$ thereby being a point of steady balance and the generation of said first reference code signal thereby tracking the input code signal by being adjusted toward maintaining a constant time shift between the sequence starts of the two code signals.

46. The method of claim 45 wherein first correlation signal ($dL_1$) has a non-zero rate of change with respect to said time shift $\epsilon$ in the range between said first point $\epsilon_A$ and said second point $\epsilon_A$, and has a zero rate of change at said second point $\epsilon_B$ where it reaches a peak magnitude value of $dI_{MAX}$, and wherein said step (c) of generating said control signal (Ed) comprises the steps of:

(d) generating a normalized version (e.g., $K*dI_1$) of said first correlation signal which has a normalized peak magnitude value of $dI_{NORM}$ when said first correlation signal ($dI_1$) has said peak magnitude value $dI_{MAX}$ at said second point $\epsilon_B$; and (e) adding a constant displacement Y to said normalized version of said first correlation signal, the value of displacement Y being such that the value of said control signal at said point $\epsilon_0$ of steady balance is zero.

47. The method of claim 46 wherein said step (c) of generating said control signal (Ed) further comprises the steps of:

(f) generating a second reference code signal comprising a repeating sequence of pulses, the start of each pulse being spaced in time from the start of the next pulse by an integer number of chip durations $\Delta$, each said pulse having a duration equal to or less than the chip duration $\Delta$, the values of said pulses being related to the preselected series of numbers, said second reference code signal being generated such that its sequence start is displaced from the sequence start of the first reference code signal by a time offset $\epsilon_K$ (or $\epsilon_N$);

(g) generating a second correlation signal (I or $I_N$) related to the correlation of the input code signal and said second reference code signal, said second correlation signal having a value which is a function of said time shift $\epsilon$ and said time offset $\epsilon_K$ (or $\epsilon_N$); and wherein said step (d) of generating said normalized version of said first correlation signal ($dI_1$) comprises the step of dividing said first correlation signal ($dI_1$) by said second correlation signal (I or $I_N$) to form said normalized version.

48. The method of claim 47 wherein said second correlation signal (I or $I_N$) has a peak magnitude value $I_{MAX}$ (or $I_{N,MAX}$) over a range of said time shift $\epsilon$ from $-\Delta$ to $+\Delta$ for a given power level of the input code signal, said second correlation signal further having a value $I_{E0}$ (or $I_{N,E0}$) at said point $\epsilon_0$ of steady balance for said given power level, and wherein said time offset $\epsilon_K$ (or $\epsilon_N$) of said second reference code signal is selected such that the magnitude of said value $I_{E0}$ (or $I_{N,E0}$) is at least 90% of its peak magnitude value $I_{MAX}$ (or $I_{N,MAX}$).

49. The method of claim 48 wherein said first correlation signal ($dI_1$) has a value $dI_0$ at said point $\epsilon_0$ of steady balance, and wherein the magnitude of said value $dI_0$ is between 5% and 10% of said peak magnitude value of $dI_{MAX}$.

50. The method of claim 49 further comprising the step of selecting said displacement Y and said point $\epsilon_0$ such that said value $dI_0$ is between 5% and 10% of said peak magnitude value of $dI_{MAX}$.

51. The method of claim 46 wherein said step (d) of generating said normalized version of said first correlation signal $dI_1$ comprises the steps of:

(f) generating a second reference code signal comprising a repeating sequence of strobes, said sequence of strobes comprising a scaled replica of said first reference code signal but shifted in time, said second reference code signal being generated such that its sequence start is displaced from the sequence start of the first reference code signal by a time offset $\epsilon_K$ (or $\epsilon_N$);

(g) generating a second correlation signal I (or $I_N$) related to the correlation of the input code signal and said second reference code signal, said second correlation signal having a value which is a function of said time shift $\epsilon$ and said time offset $\epsilon_K$ (or $\epsilon_N$); and (h) dividing said first correlation signal $dI_1$ by said second correlation signal I (or $I_N$) to form said normalized version.

52. The method of claim 51 wherein said second correlation signal I (or N) has a peak magnitude value $I_{MAX}$ (or $I_{N,MAX}$) over a range of said time shift $\epsilon$ from $-\Delta$ to $+\Delta$ for a given power level of the input code signal;

wherein said second correlation signal further has, at said given power level, a value $I_{E0}$ (or $I_{N,E0}$) when said time shift $\epsilon$ is at said point $\epsilon_0$ of steady balance; and wherein said time offset $\epsilon_K$ (or $\epsilon_N$) of said second reference code signal is selected such that the magnitude of said value $I_{E0}$ (or $I_{N,E0}$) is at least 90% of its peak magnitude value of $I_{MAX}$ (or $I_{N,MAX}$).

53. The method of claim 52 wherein said time offset $\epsilon_K$ (or $\epsilon_N$) has a range of values for which the magnitude of said value $I_{E0}$ (or $I_{N,E0}$) is at least 90% of $I_{MAX}$ (or $I_{N,MAX}$), said range having a minimum value and a maximum value, and wherein the value of said time offset $\epsilon_K$ (or $\epsilon_N$) is closer to said minimum value of said range than said maximum value.

54. The method of claim 53 wherein the value of said time offset $\epsilon_K$ (or $\epsilon_N$) is equal to said minimum value.

55. The method of claim 54 wherein said first correlation signal $dI_1$ has a value $dI_0$ at said point $\epsilon_0$ of steady balance, and wherein the magnitude of said value $dI_0$ is between 5% and 10% of said peak magnitude value of $dI_{MAX}$.

56. The method of claim 55 further comprising the step of selecting said displacement Y and said point $\epsilon_0$ such that said value $dI_0$ is between 5% and 10% of said peak magnitude value of $dI_{MAX}$.

57. The method of claim 45 wherein said step of generating said control signal (Ed) comprises the step of:

(d) adding a displacement Y to said first correlation signal ($dI_1$), the value of displacement Y being related to the peak magnitude of said input code signal.

58. The method of claim 57 wherein said displacement Y is proportionally related to the peak magnitude of the input code signal by a coefficient q, the sign and value of said coefficient q being selected to set the location of said point CO of steady balance.

59. The method of claim 58 wherein said step (d) of adding said displacement Y comprises the steps of:

(e) generating a second reference code signal comprising a repeating sequence of strobes, the start of each strobe being spaced in time from the start of the next strobe by an integer number of chip durations $\Delta$, each strobe having a duration equal to or less than the chip duration $\Delta$ and comprising at least a pulse, the values of said pulses being related to the preselected series of numbers, said second reference code signal being generated such that its sequence start is displaced from the sequence start of said first reference code signal by a time offset $\epsilon_K$;

(f) generating a second correlation signal (I or $I_N$) related to the correlation of the input code signal and said second reference code signal, said second correlation signal having a value which is a function of said time shift $\epsilon$ and said time offset $\epsilon_K$ (or $\epsilon_N$); said second correlation signal (I or $I_N$) being related to the peak magnitude of the input code signal; and (g) generating said displacement Y in proportion to said second correlation signal.

60. The method of claim 59 wherein said second correlation signal (I or $I_N$) has a peak magnitude value $I_{MAX}$ (or $I_{N,MAX}$) over a range of said time shift $\epsilon$ from $-\Delta$ to $+\Delta$ for a given power level of the input code signal;

wherein said second correlation signal further has, at said given power level, a value $I_{E0}$ (or $I_{N,E0}$) when said time shift $\epsilon$ is at said point $\epsilon_0$ of steady balance; and wherein said time offset $\epsilon_K$ (or $\epsilon_N$) of said second reference code signal is selected such that the magnitude of said value $I_{E0}$ (or $I_{N,E0}$) is at least 90% of its peak magnitude value $I_{MAX}$ (or $I_{N,MAX}$).

61. The method of claim 60 wherein said time offset $\epsilon_K$ (or $\epsilon_N$) has a range of values for which the magnitude of said value $I_{E0}$ (or $I_{N,E0}$) is at least 90% of $I_{MAX}$ (or $I_{N,MAX}$), said range having a minimum value and a maximum value, and wherein the value of said time offset $\epsilon_K$ (or $\epsilon_N$) is closer to said minimum value of said range than said maximum value.

62. The method of claim 59 wherein said first correlation signal ($dI_1$) has a peak magnitude $dI_{MAX}$ over a range of said time shift $\epsilon$ from $-\Delta$ to $+\Delta$ for a given power level of the input code signal;

wherein said step (g) generates said displacement Y as said second correlation signal multiplied by a constant of proportionality; and wherein the values of said coefficient $\beta$ and said point $\epsilon_0$ are selected such that the magnitude of said displacement Y is between 5% and 10% of said peak magnitude $dI_{MAX}$.

63. The method of claim 58 wherein said first correlation signal ($dI_1$) has a peak magnitude $dI_{MAX}$ over a range of said time shift $\epsilon$ from $-\Delta$ to $+\Delta$ for a given power level of the input code signal; and wherein the values of said coefficient q and said point $\epsilon_0$ are selected such that the magnitude of said displacement Y is between 5% and 10% of said peak magnitude $dI_{MAX}$.

64. The method of claim 59 wherein each of said pulses of said second reference code signal has a duration equal to said chip duration $\Delta$.

65. The method of claim 57 wherein said step (d) of adding a displacement Y to said first correlation signal ($dI_1$) comprises the steps of:

(e) generating a second reference code signal comprising a repeating sequence of strobes, said sequence of strobe substantially being a scaled replica of said first reference code signal, said second reference code signal being generated such that its sequence start is displaced from the sequence start of the first reference code signal by a time offset $\epsilon_N$; and (g) generating a second correlation signal ($I_N$) related to the correlation of the input code signal and said second reference code signal, said second correlation signal having a value which is a function of said time shift $\epsilon$ and said time offset $\epsilon_N$, said second correlation signal ($I_N$) being related to the peak magnitude of the input code signal; and (h) generating said displacement Y in proportion to said second correlation signal.

66. The method of claim 65 wherein said second correlation signal ($I_N$) has a peak magnitude value $I_{N,MAX}$ over a range of said time shift $\epsilon$ from $-\Delta$ to $+\Delta$ for a given power level of the input code signal;

wherein said second correlation signal further has, at said given power level, a value $I_{N,E0}$ when said time shift $\epsilon$ is at said point $\epsilon_0$ of steady balance; and wherein said time offset $\epsilon_N$ of said second reference code signal is selected such that the magnitude of said value $I_{N,E0}$ is at least 90% of $I_{MAX}$.

67. The method of claim 65 wherein said time offset $\epsilon_N$ has a range of values for which the magnitude of said value $I_{N,E0}$ is at least 90% of $I_{N,MAX}$, said range having a minimum value and a maximum value, and wherein the value of said time offset $\epsilon_N$ is closer to said minimum value of said range than said maximum value.

68. The method of claim 65 wherein said first correlation signal ($dI_1$) has a peak magnitude $dI_{MAX}$ over a range of said time shift $\epsilon$ from $-\Delta$ to $+\Delta$ for a given power level of the input code signal;

wherein said step (g) generates said displacement Y as said second correlation signal multiplied by a constant $\beta$ of proportionality; and wherein the values of said coefficient $\beta$ and said point $\epsilon_0$ are selected such that the magnitude of said displacement Y is between 5% and 10% of said peak magnitude $dI_{MAX}$.

69. The method of claim 45 wherein, when the sequence start of the reference code signal is aligned to the sequence start of the input code signal, the reference code signal ($S_B(t)$) has a strobe corresponding to each chip of the input code signal for which that chip has changed in value from the previous chip's value.

70. The method of claim 45 comprising the step of initially setting the time shift $\epsilon$ at a point which lags the point $\epsilon_0$ of steady balance before commencing the performance of step (d) of adjusting the time shift $\epsilon$.

* * * * *

UNITED STATES PATENT AND TRADEMARK OFFICE
CERTIFICATE OF CORRECTION

PATENT NO. : 6,493,378 B1
DATED : December 10, 2002
INVENTOR(S) : Zhodzishsky et al.

It is certified that error appears in the above-identified patent and that said Letters Patent is hereby corrected as shown below:

Column 49,
Line 55, delete "eo" and insert therefor -- $\varepsilon_O$ --.

Column 50,
Line 51, after "by" insert -- a --.
Line 52, after "sequence" insert -- of --.

Column 51,
Lines 21 and 49, after "by" insert -- a --.
Lines 22 and 50, after "sequence" insert -- of --.
Line 49, delete "modulate" and insert therefor -- modulated --.

Column 52,
Line 2, after "by" insert -- a --.
Line 3, after "sequence" insert -- of --.

Column 53,
Line 31, delete "($L_E$)" and insert therefor -- ($L_L$) --.
Line 51, after "by" insert -- a --.
Line 52, after "sequence" insert -- of --.

Column 54,
Lines 3 and 31, delete "duration" and insert therefor -- durations --.
Line 12, after "by" insert -- a --.
Line 13, after "sequence" insert -- of --.

Column 55,
Lines 51 and 56, delete "has" and insert therefor -- to have --.

Column 56,
Line 8, after "by" insert -- a --.
Line 9, after "sequence" insert -- of --.
Line 62, delete the first instance of "$\varepsilon$," and insert therefor -- $\varepsilon_S$, --.

Column 57,
Line 35, after "by" insert -- a --.
Line 36, after "sequence" insert -- of --

UNITED STATES PATENT AND TRADEMARK OFFICE
CERTIFICATE OF CORRECTION

PATENT NO. : 6,493,378 B1
DATED : December 10, 2002
INVENTOR(S) : Zhodzishsky et al.

It is certified that error appears in the above-identified patent and that said Letters Patent is hereby corrected as shown below:

Column 58,
Lines 4 and 46, after "by" insert -- a --.
Lines 5 and 47, after "sequence" insert --of-- .

Column 59,
Line 65, delete "($dL_1$)" and insert therefor -- ($dI_1$) --.
Line 67, delete "Ea," and insert therefor -- $\varepsilon_B$ --.

Column 61,
Line 8, delete "(or N)" and insert therefor -- (or $I_N$) --.
Line 43, delete "CO" and insert therefor insert -- $\varepsilon_O$ --.

Column 62,
Line 23, after "constant" insert -- $\beta$ --.
Line 44, delete "stobe" and insert therefor -- strobes --.

Column 64,
Line 13, after "performance of" insert -- the --.
Line 14, delete "(d)."
Line 14, after "$\varepsilon$" insert -- to move it toward said point $\varepsilon_O$. -- .

Signed and Sealed this

Fifth Day of October, 2004

JON W. DUDAS
*Director of the United States Patent and Trademark Office*